(12) United States Patent
Okubo et al.

(10) Patent No.: US 7,714,890 B2
(45) Date of Patent: May 11, 2010

(54) IMAGE PICKUP APPARATUS AND METHOD FOR CONTROLLING PIXEL READING USING A SHAKE DETERMINATION

(75) Inventors: Mitsumasa Okubo, Hino (JP); Yuji Imai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 996 days.

(21) Appl. No.: 11/412,190

(22) Filed: Apr. 26, 2006

(65) Prior Publication Data

US 2006/0238621 A1    Oct. 26, 2006

(30) Foreign Application Priority Data

Apr. 26, 2005  (JP)  ............................. 2005-128269
Sep. 5, 2005   (JP)  ............................. 2005-256486

(51) Int. Cl.
H04N 5/228 (2006.01)
H04N 3/14 (2006.01)

(52) U.S. Cl. .............................. 348/208.16; 348/208.6; 348/294

(58) Field of Classification Search . 348/208.99–208.2, 348/208.4, 208.6, 208.12, 208.16, 294, 296, 348/297
See application file for complete search history.

(56) References Cited

U.S. PATENT DOCUMENTS

| 6,778,210 B1 * | 8/2004 | Sugahara et al. | 348/208.4 |
| 6,947,089 B1 | 9/2005 | Hori | |
| 6,963,361 B1 * | 11/2005 | Kawahara et al. | 348/208.99 |
| 6,982,751 B1 | 1/2006 | Tanaka | |
| 7,057,645 B1 * | 6/2006 | Hara et al. | 348/208.6 |
| 7,421,091 B2 * | 9/2008 | Satoh | 382/103 |
| 7,509,039 B2 * | 3/2009 | Suda | 396/54 |

2001/0038064 A1   11/2001  Mori et al.

(Continued)

FOREIGN PATENT DOCUMENTS

CN    1405616    3/2003

(Continued)

OTHER PUBLICATIONS

Notification of the First Office Action for Chinese Patent Application No. 200610078620.2, dated Oct. 19, 2007 (5 pgs.) with translation (10 pgs.).

(Continued)

*Primary Examiner*—Timothy J Henn
(74) *Attorney, Agent, or Firm*—Straub & Pokotylo; John C. Pokotylo

(57) ABSTRACT

An image pickup apparatus configured to pick up a still image includes an image pickup device having a plurality of pixels to convert an object image formed by an optical system to an electric charge. A pixel reading circuit operates in either a first reading mode for reading electric charges obtained from the respective pixels of the image pickup device on a pixel by pixel basis or a second reading mode for adding and reading the electric charges obtained from the respective pixels of the image pickup device. A controller evaluates camera shake during exposure. When an evaluation level of the shake is greater than a predetermined level, this controller controls the pixel reading circuit to operate in the second reading mode. when the evaluation level is smaller than the predetermined level, the controller controls the pixel reading circuit to operate in the first reading mode.

30 Claims, 39 Drawing Sheets

U.S. PATENT DOCUMENTS

| | | | |
|---|---|---|---|
| 2003/0025800 A1* | 2/2003 | Hunter et al. | 348/208.13 |
| 2003/0151687 A1* | 8/2003 | Yoshida | 348/333.03 |
| 2004/0046884 A1* | 3/2004 | Nakano et al. | 348/333.01 |
| 2004/0056963 A1* | 3/2004 | Ishikawa | 348/208.1 |
| 2006/0285007 A1* | 12/2006 | Yuyama et al. | 348/362 |

FOREIGN PATENT DOCUMENTS

| | | |
|---|---|---|
| CN | 1547074 | 11/2004 |
| JP | 8-15316 | 1/1996 |
| JP | 8-223471 | 8/1996 |
| JP | 9-233395 | 9/1997 |
| JP | 2004-222130 | 8/2004 |
| JP | 2005-109993 | 4/2005 |

OTHER PUBLICATIONS

Notice of Reasons for Rejection for Japanese Patent Application No. 2005-128269, mailed Feb. 16, 2010 (2 pgs.) with translation (3 pgs.).

* cited by examiner

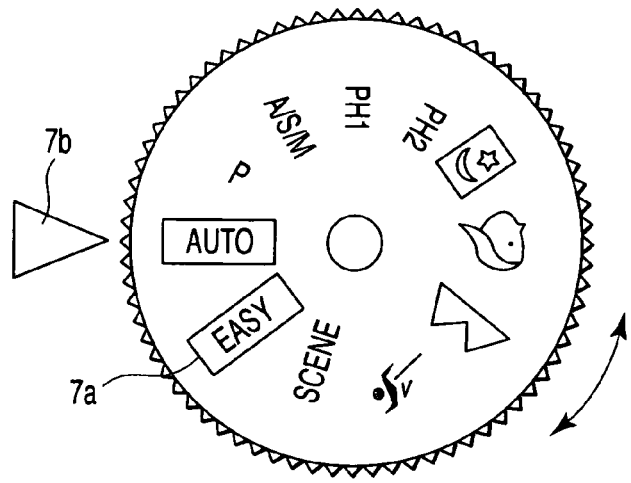
F I G. 2
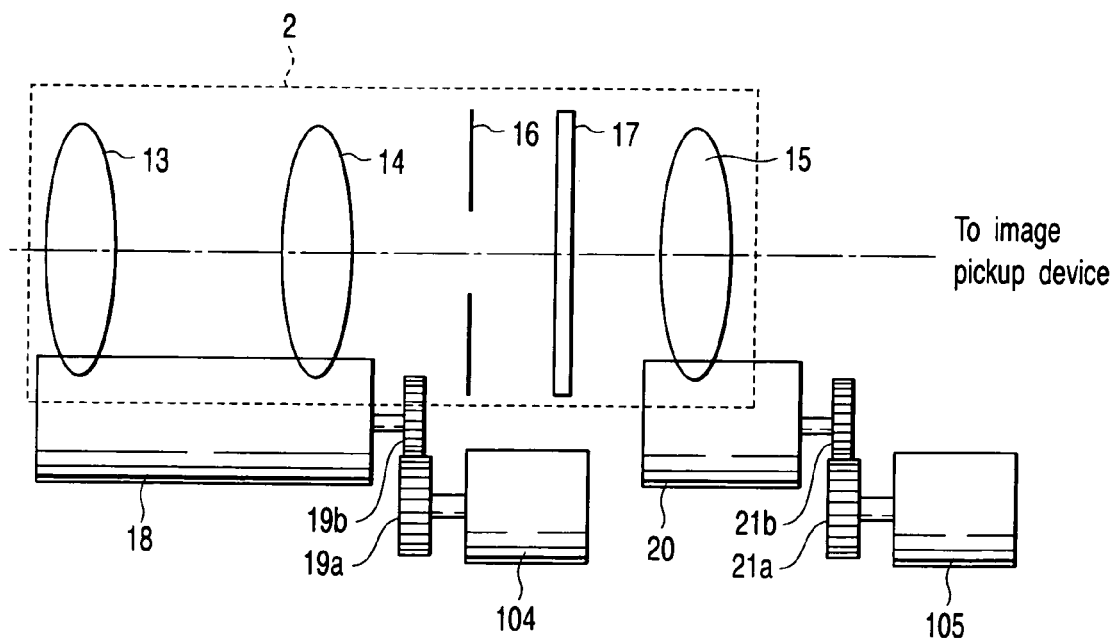
F I G. 3

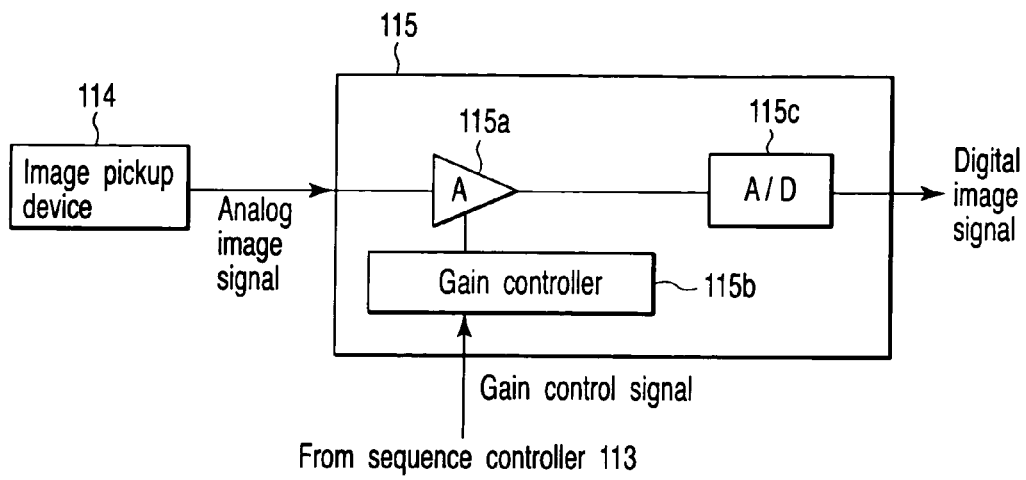
FIG. 7
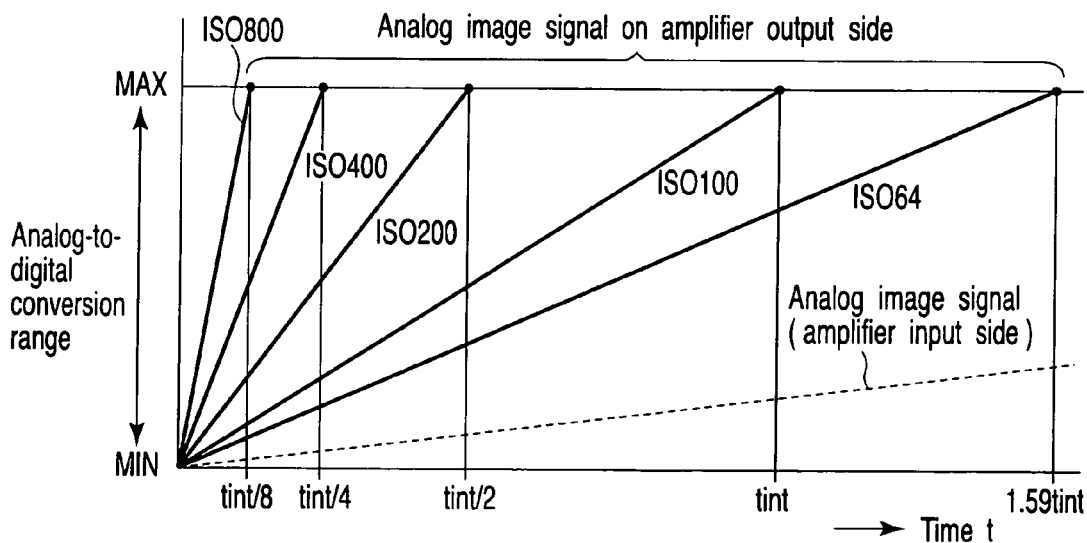
FIG. 8A
FIG. 8B

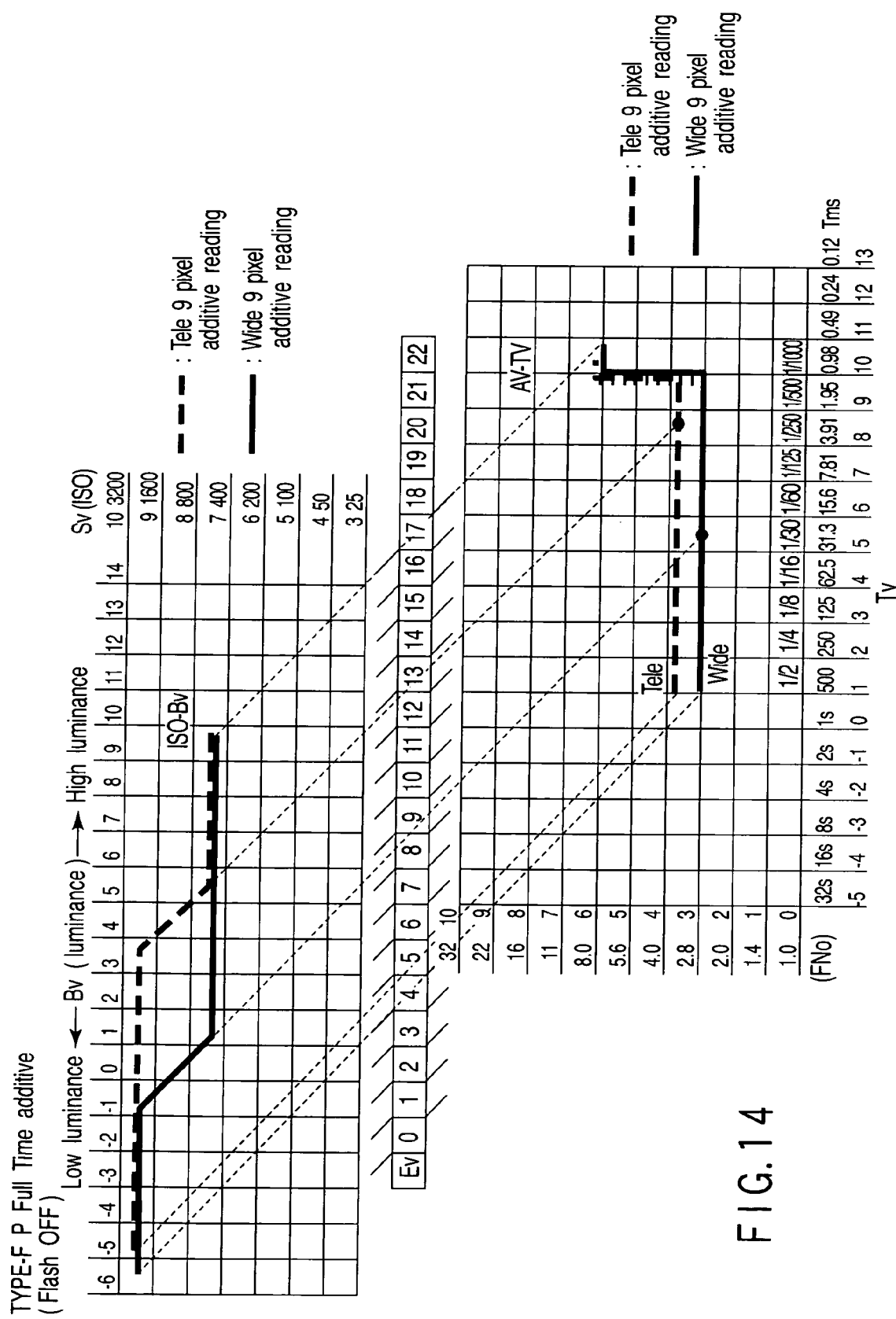
F I G. 14

| Name | Pixel addition | MAX sensitivity (ISO) | | |
|---|---|---|---|---|
| A: Non-additive, normal | Unavailable | 400 | | |
| B: Non-additive, high speed | Unavailable | 400 | | |
| C: Automatic addition, fineness priority | Available (switch) | Non-additive 400 Additive 2400 | | |
| D: Automatic addition, speed priority | Available (switch) | Non-additive 250 Additive 2400 | | |
| E: Automatic addition, low noise priority | Available (switch) | Non-additive 200 Additive 1200 | | |
| F: Full time addition | Available (full time) | Additive 2400 | | |

FIG. 15A

| Mode name | Maximum recording pixel | Pixel addition | Program line | Display of LCD display 5a | |
|---|---|---|---|---|---|
| AUTO | 5M | Fixed non-additive | A | Non-additive | |
| EASY | 3M | Automatic switching | D | AUTO | |
| | | | | | |
| Sports | 5M | Automatic switching | D | AUTO | |
| Landscape | 5M | Automatic switching | C | AUTO | |
| Portrait | 5M | Automatic switching | E | AUTO | |
| Nightscape | 5M | Automatic switching | E | AUTO | |
| | | | | | |
| P | 5M | Fixed / optional | A/F | Non-additive or additive | |
| A/S/M | 5M | Fixed / optional | A/F | Non-additive or additive | |
| P H1 | 5M | Fixed non-additive | B | Non-additive | |
| P H2 | 3M | Fixed additive | F | Additive | |
| | | | | | |
| SCENE / AUTO-UV | 3M | Automatic selection by camera program | A/F | AUTO | Automatic selection by camera shake quantity |

FIG. 15B

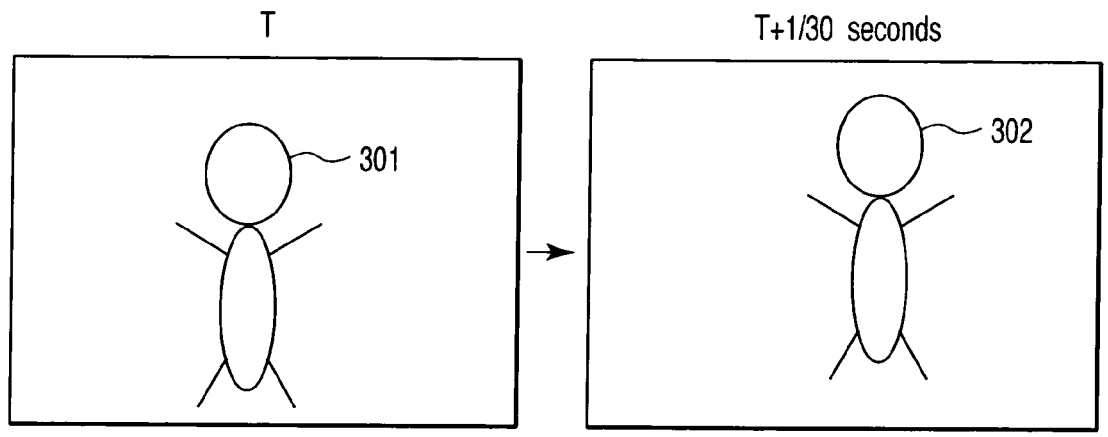
F I G. 2 1 A
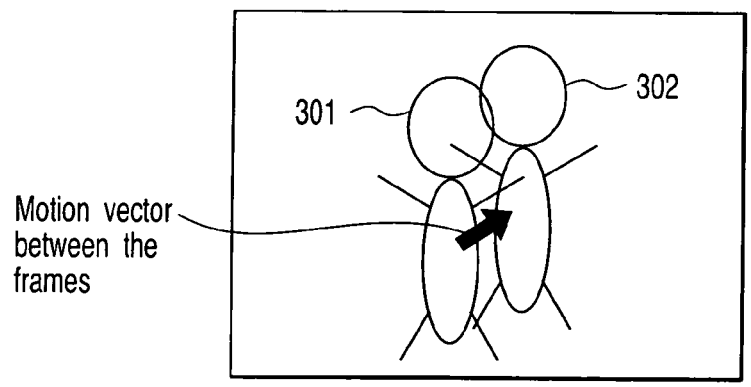
F I G. 2 1 B

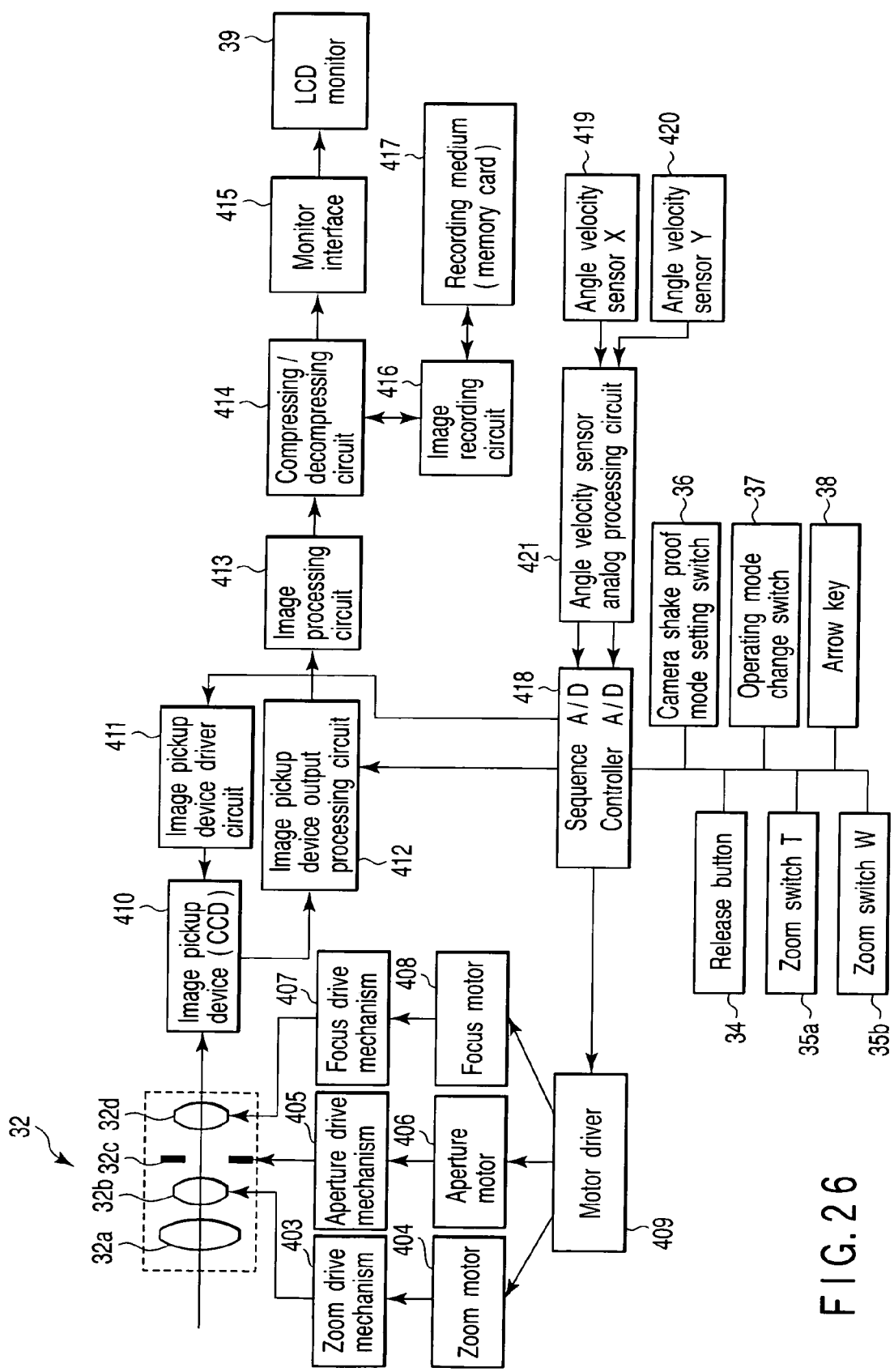
F I G. 26

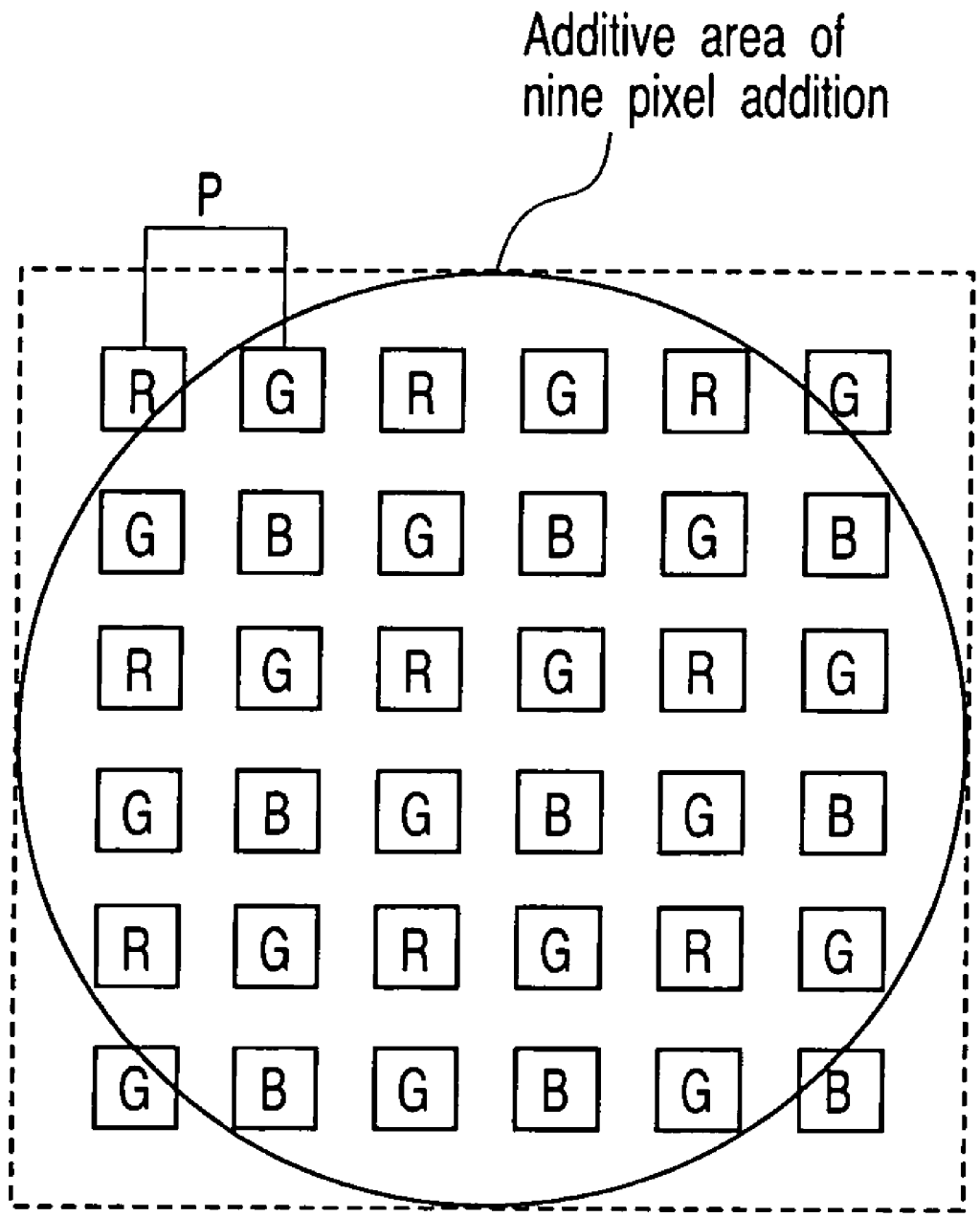
F I G. 43

IMAGE PICKUP APPARATUS AND METHOD FOR CONTROLLING PIXEL READING USING A SHAKE DETERMINATION

CROSS-REFERENCE TO RELATED APPLICATIONS

This application is based upon and claims the benefit of priority from prior Japanese Patent Applications No. 2005-128269, filed Apr. 26, 2005; and No. 2005-256486, filed Sep. 5, 2005, the entire contents of both of which are incorporated herein by reference.

BACKGROUND OF THE INVENTION

1. Field of the Invention

The present invention relates to an image pickup apparatus comprising an image pickup device that corresponds to an additive reading function for a pixel output, wherein normal reading and additive reading can be used in accordance with a situation.

2. Description of the Related Art

In an image pickup apparatus such as a camera, there is a problem that an image is shaken due to camera shake or object shake during exposure, and a blurred image is generated. As countermeasures against shake of such an image, in Jpn. Pat. Appln. KOKAI Publication No. 8-223471 or Jpn. Pat. Appln. KOKOKU Publication No. 8-15316, there is proposed a technique of moving an optical system or an image pickup device so as to eliminate motion of an image caused by camera shake, thereby preventing a blurred image. In addition, there is known a technique of increasing a shutter speed and reducing an effect of shake while amplifying an output of the image pickup device by means of an amplifier circuit or the like to increase imaging sensitivity. Further, in the case where a high definition image pickup device for still image pickup is applied to motion image pickup, for example, in Jpn. Pat. Appln. KOKAI Publication No. 2004-222130 or the like, there is known a technique of adding (mixing) pixels of the same color in an analog manner by predetermined number in the image pickup device, and then, reading an output after adding, for the purpose of increasing imaging sensitivity and reducing a read time.

BRIEF SUMMARY OF THE INVENTION

According to a first aspect of the present invention, there is provided an image pickup apparatus configured to pick up a still image, the apparatus comprising: an image pickup device which has a plurality of pixels to convert an object image formed by an optical system to an electric charge; a pixel reading circuit which operates in either a first reading mode for reading electric charges obtained from respective pixels of the image pickup device on a pixel by pixel basis or a second reading mode for adding and reading the electric charges obtained from respective pixels of the image pickup device; and a controller which evaluates a camera shake of the apparatus during exposure, which operates the pixel reading circuit in the second reading mode when an evaluation level of the camera shake is greater than a predetermined level, and which operates the pixel reading circuit in the first reading mode when the evaluation level is smaller than the predetermined level.

According to a second aspect of the present invention, there is provided an image pickup apparatus configured to pick up a still image, the apparatus comprising: an image pickup device which has a plurality of pixels to convert an object image formed by an optical system to an electric charge; a pixel reading circuit which operates in either a first reading mode for reading electric charges obtained from the respective pixels of the image pickup device on a pixel by pixel basis or a second reading mode for adding and reading the electric charges obtained from the respective pixels of the image pickup device; an object shake detecting section which detects an object shake quantity generated by a motion of an object; and a controller which operates the pixel reading circuit in the second reading mode when an object shake quantity during exposure of the image pickup device is greater than a predetermined level, and which operates the pixel reading circuit in the first reading mode when the object shake quantity is smaller than the predetermined level.

According to a third aspect of the present invention, there is provided an image pickup apparatus configure to pick up a still image, the apparatus comprising: an image pickup device which has a plurality of pixels to convert an object image formed by an optical system to an electric charge; a pixel reading circuit which operates in either a first reading mode for reading electric charges obtained from the respective pixels of the image pickup device on a pixel by pixel basis or a second reading mode for adding and reading the electric charges obtained from the respective pixels of the image pickup device; and a controller which makes control to automatically switch the pixel reading circuit between at least the first reading mode and the second reading mode, depending on a photographing condition.

According to a fourth aspect of the present invention, there is provided an image pickup apparatus comprising: an image pickup device which has a plurality of pixels to convert an object image formed by an optical system to an electric charge; a pixel reading circuit which operates in either a first reading mode for reading electric charges obtained from the respective the pixels of the image pickup device on a pixel by pixel basis or a second reading mode for adding and reading, for each predetermined number of pixels, the electric charges obtained from the respective pixels of the image pickup device; a photographing mode selecting section which selects one photographing mode from among a plurality of photographing modes; a reading mode selecting section which selects either the first reading mode or the second reading mode; and a controller which makes control to permit selection by the reading mode selecting section, or set the reading mode in either the first reading mode or the second reading mode by prohibiting the selection by the reading mode selecting section in accordance with the photographing mode selected by the photographing mode selecting section.

According to a fifth aspect of the present invention, there is provided a method for picking up a still image, comprising: evaluating a level of a camera shake during exposure prior to picking up a still image; starting exposure for acquiring the still image; terminating the exposure; and adding and reading electric charges of each pixel obtained by the exposure when the evaluation level of the camera shake obtained by the evaluation is greater than a predetermined level, and reading electric charges of each pixel obtained by the exposure on a pixel by pixel basis when the evaluation level is smaller than the predetermined level.

According to a sixth aspect of the present invention, there is provided an image pickup apparatus configured to pick up a still image, the apparatus comprising: an image pickup device having a plurality of pixels to convert an object image formed by an optical system to an electric charge; an amplifier circuit which amplifies an electrical signal based on the electric charge read from the image pickup device at a variable amplification rate; an analog-to-digital converter circuit which converts an output signal of the amplifier circuit to a digital signal; a camera shake detecting section which detects a camera shake of the image pickup device; and a controller which, in the case where an evaluation level of an integral value of camera shake obtained by the camera shake detecting section has reached a predetermined threshold level from a time point of exposure start of the image pickup device, terminates exposure of the image pickup device at that time point when the evaluation level reaches the threshold level, reads electric charges from each pixel of the image pickup device, and sets the amplification rate of the amplifier circuit in accordance with the time interval from a time point of exposure start of the image pickup device to a time point of exposure termination.

According to a seventh aspect of the present invention, there is provided an image pickup apparatus configured to pick up a still image, the apparatus comprising: an image pickup device having a plurality of pixels to convert an object image formed by an optical system to an electric charge; an electric charge adder circuit which adds electric charges obtained from respective pixels of the image pickup device on a predetermined pixel size by pixel size basis; a controller which selects either an individual pixel reading mode for reading the electric charges obtained from the respective pixels of the image pickup device on a pixel by pixel basis, or a pixel additive reading mode for operating the electric charge adder circuit and adding and reading the electric charges obtained from the respective pixels of the image pickup device on the predetermined pixel size by pixel size basis based on a shake of the apparatus occurring during a exposure of the image pickup device.

According to an eighth aspect of the present invention, there is provided a method for picking up a still image, comprising: starting exposure for acquiring a still image; evaluation a magnitude of a camera shake during the exposure; terminating the exposure; and when an evaluation level of the camera shake obtained by the evaluation is greater than a predetermined level, adding and reading electric charges for each pixel obtained by the exposure, and when the evaluation level is smaller than the predetermined level, reading the electric charges for each pixel obtained by the exposure on a pixel by pixel basis.

According to a ninth aspect of the present invention, there is provided a method for picking up a still image, comprising: starting exposure for acquiring a still image; evaluating a magnitude of a camera shake during the exposure; and when an evaluation level of the camera shake obtained by the evaluation is equal to or greater than a predetermined level, terminating the exposure at that time point, and reading electric charges.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIG. 2 is a view showing a photographing mode dial;

FIG. 3 is a schematic view showing a lens unit;

FIG. 7 is a view showing an internal configuration of an image pickup device output processing circuit;

FIG. 8A is a view showing a relationship between ISO sensitivity and an amplifier gain.

FIG. 8B is a view showing a relationship between an integral time of the image pickup device and an A/D conversion range in an analog-to-digital converter;

FIG. 14 is a program diagram in an exposure control program of TYPE-F;

FIG. 15A is a view summarizing the contents of six types of exposure control programs;

FIG. 15B is a view showing a combination of an photographing mode and an exposure control program selected in response to the photographing mode;

FIGS. 21A and 21B are conceptual views for explaining an operation of an image shift vector computing circuit;

FIG. 26 is a block diagram depicting a detailed internal configuration of the electronic camera;

FIG. 43 is a view showing a relationship between a pixel addition range and a blurring circle in a 9-pixel additive reading mode;

DETAILED DESCRIPTION OF THE INVENTION

Hereinafter, embodiments of the present invention will be described with reference to the accompanying drawings.

First Embodiment

Figure 1A:
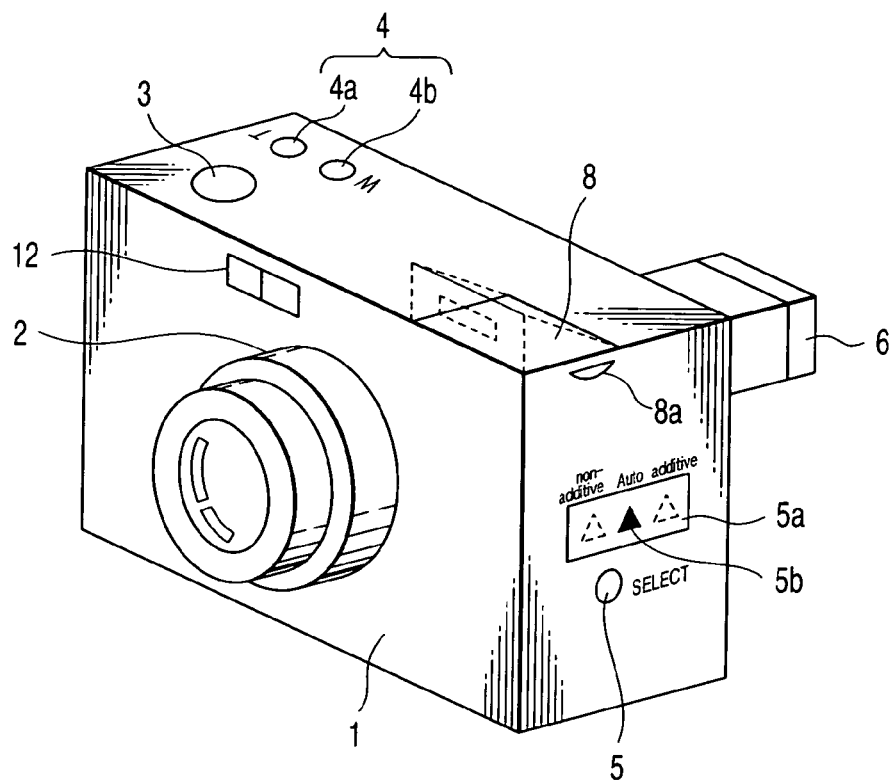
FIGS. 1A and 1B are external perspective views each showing a digital camera as an example of an image pickup apparatus according to a first embodiment of the present invention.
Figure 1B:
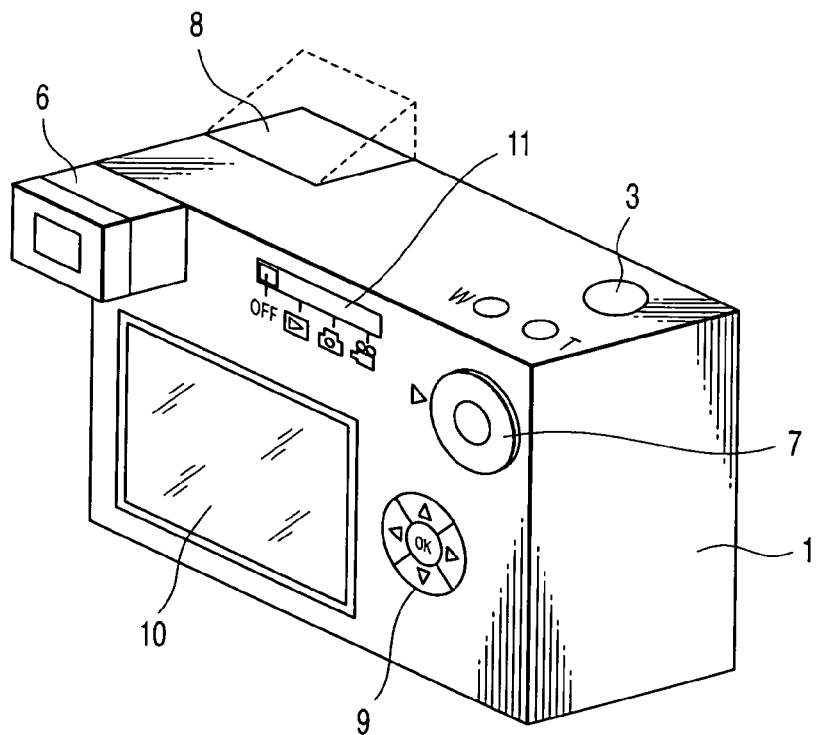

FIGS. 1A and 1B are external perspective views each showing a digital camera (hereinafter, simply referred to as a camera) as an example of an image pickup apparatus according to a first embodiment of the present invention. Here, FIG. 1A is a front perspective view of the camera; and FIG. 1B is a rear perspective view of the camera.

As shown in FIG. 1A, a lens unit 2 is mounted on a front face of a camera body 1. In addition, a release button 3 and a zoom switch 4 are provided on an upper face of the camera body 1. The release button 3 is provided as a two-stepped switch, i.e., a semi-push and a full push. A user semi-pushes the release button 3 (makes a first release operation), whereby an operation ready for imaging is started, and fully pushes (makes a second release operation), whereby an imaging operation is started. The zoom switch 4 is composed of a T (Tele) switch 4a and a W (Wide) switch 4b. When the user presses the T switch 4a, a magnification change operation on a telephoto side (hereinafter, referred to as a Tele side) is made. When the W switch 4b is pressed, a magnification change operation on a wideangle side (hereinafter, referred to as a Wide side) is made.

In addition, as shown in FIG. 1A, a reading mode selection button 5 is provided on a side face of the camera body 1. The reading mode selection button 5 is provided as a manual selection member for selecting a reading mode for a pixel output from an image pickup device provided in the camera body. This pixel output reading mode includes three types of a non-additive reading fixing mode; an automatic selection mode; and an additive reading fixed mode. These modes will be described later in detail. The reading mode set in the camera can be viewed by an indicator 5b displayed on an LCD display unit 5a arranged in the vicinity of the reading mode selection button 5.

In addition, as shown in FIG. 1B, a finder 6 is integrally assembled on a rear face of the camera body 1. Here, the finder 6 assumes an electronic view finder. The electronic view finder is composed of, for example, a small-sized LCD and a loupe for expanding an image displayed on the small-sized LCD. With such a configuration, a so called live view image (also called a "live view") of displaying an image from an image pickup device in real time can be displayed.

In addition, a photographing mode dial 7 that is an photographing mode selecting section is provided on a rear face of the camera body 1. FIG. 2 is a view showing the photographing mode dial 7. Here, as shown in FIG. 2, for the photographing mode dial 7, there is made a display 7a indicating a variety of photographing modes such as an easy mode (EASY), an auto mode (AUTO), a program mode (P), an aperture priority/shutter priority/manual mode (A/S/M), a high speed program 1 mode (PH1), a high speed program 2 mode (PH2), a nightscape mode, a portrait mode, a landscape mode, a sports mode, and a scene mode (SCENE). Then, the user rotationally operates the photographing mode dial 7 so as to adjust the display 7a to an indicator 7b, whereby a variety of photographing mode are selected.

In addition, a flash 8 provided on an upper face of the camera body 1 is a popup type flash. Here, a state indicated by the solid line in FIGS. 1A and 1B indicates a case in which the flash 8 is housed. In this housed state, light emission of the flash 8 is inhibited. In the housed state, if triggering is carried out with a finger being applied to a protrusion 8a on a side face, the flash 8 moves to a position indicated by the dotted line. In this manner, the flash 8 can emit light.

An arrow key 9 provided on a rear face of the camera body 1 is provided as an operating member for the user to set a variety of modes on a menu screen displayed on a rear LCD panel 10. This arrow key 9 is configured so that four buttons are allocated at the periphery of a center determination button. The arrow key 9 can select, for example, on/off settings such as macro-imaging, self timer, and flash or can select a variety of photographing modes in the case where a scene mode has been selected by the photographing mode dial 7. In addition, the arrow key 9 can provide a variety of detailed settings.

A variety of images such as an image picked up by the user, a live view image, and a menu screen are displayed on the rear LCD panel 10 provided on the rear face of the camera body 1. In addition, a power switch 11 is provided on the rear face of the camera body 1. When the user slides the power switch 11, four states such as an off-state, a reproduction mode on-state, a still image pickup mode on-state, and a motion image pickup mode on-state can be selected. In addition, an AF window 12a provided on a front face of the camera body 1 is a window for an AF sensor module provided inside of the camera body 1.

Now, the lens unit 2 that is an optical system will be described with reference to FIG. 3. FIG. 3 is a schematic view showing the lens unit 2. Three lenses 13, 14, and 15, for example, are provided at the lens unit 2 shown in FIG. 3. Among these three lenses, the lens 13 and the lens 14 are provided magnification change lenses (zoom lens) for changing a focal distance of the lens by changing a mutual position relationship. At the time of zoom driving, a driving force of a zoom motor 104 is transmitted to a zoom lens drive cam mechanism 18 via gears 19a and 19b. By means of this zoom lens drive cam mechanism 18, the lens 13 and the lens 14 are driven along an optical axis direction (in single-dotted chain line direction of FIG. 3).

In addition, the lens 15 is provided as a focus lens for making focus adjustment by moving it forwardly and backwardly along an optical axis. At the time of focus adjustment, a driving force of a focus motor 105 is transmitted to a focus lens drive cam mechanism 20 via gears 21a and 21b. The lens 15 is driven by means of this focus lens driving cam mechanism 20.

In addition, an aperture 16 and a shutter 17 is allocated rearward of the lenses 13 and 14. The aperture 16 and shutter 17 are driven by means of an aperture motor and a shutter motor, respectively. A light quantity (exposure quantity) of an object luminous flux incident to an image pickup device is controlled by means of the aperture 16 and shutter 17. Here, as the shutter 17, a device shutter (electronic shutter) of the image pickup device may be used instead of a mechanical shutter.

Figure 4:
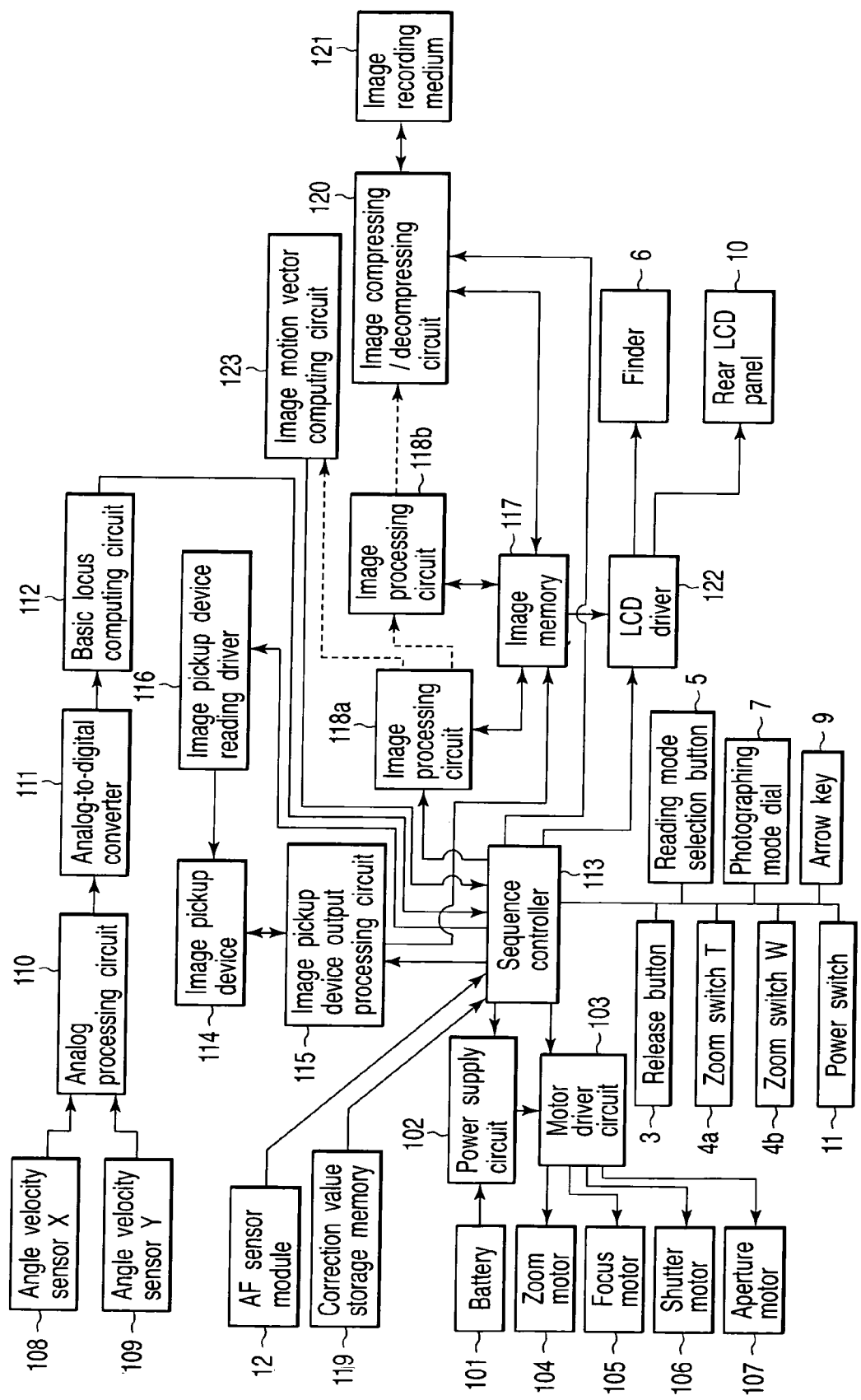
FIG. 4 is a block diagram depicting a detailed internal configuration of a camera in accordance with the first embodiment.

FIG. 4 is a block diagram depicting a detailed internal configuration of a camera in accordance with the first embodiment. In FIG. 4, constituent elements described in FIGS. 1 and 3 are designated by the same reference numerals shown in FIGS. 1 and 3.

A battery 101 is provided as a power source of the camera composed of rechargeable batteries such as lithium ion rechargeable batteries, for example. A power circuit 102 is composed of a voltage rise circuit or a voltage fall circuit and the like, and a voltage of the battery 101 is supplied after converted into a voltage required by each processing circuit in the camera.

A motor driver circuit 103 is composed of an electric circuit including a switching transistor, and controls a zoom motor 104, a focus motor 105, a shutter motor 106, and an aperture motor 107.

An angle velocity sensor X108 detects vibration (camera shake) in a transverse direction of the camera body 1. In addition, an angle velocity sensor Y109 detects camera shake in a vertical direction of the camera body 1. Here, a camera shake detecting sensor is composed of the angle velocity sensor X108 and the angle velocity sensor Y109. In addition, an analog processing circuit 110 carries out an analog processing operation for canceling an offset in each output of the angle velocity sensor X108 and the angle velocity sensor Y109 or amplifying each output. An analog-to-digital converter 111 converts an output of the analog processing circuit 110 into a digital signal. A basic locus computing circuit 112 integrates inputs from the analog-to-digital converter 111 from time to time, and calculates a displacement angle of each time interval. Then, from the calculated displacement angle and focal distance information on the lens unit 2, the shake locus in a transverse direction (X direction) in the vicinity of an optical axis of an image acquired in an image pickup device 114 and the shake locus in a vertical direction (Y direction) are computed, and the computed shake locus is output to a sequence controller 113 in real time.

Here, camera shake detecting sensor for detection of camera shake is not limited to the angle velocity sensor X108 and the angle velocity sensor Y109. For example, if a computing process is changed, camera shake detection and shake locus computation can be carried out by means of an angle acceleration sensor and a pair of acceleration sensors, i.e., two acceleration sensors as well.

The sequence controller 113 serving as a controller and an exposure time setting section is provided as a circuit for making control of each circuit of the image pickup apparatus. In addition, a variety of operating members are connected to the sequence controller 113, thereby executing a processing operation of detecting these operations and responding to an operating function of the operating member. Here, the operating members include: the release button 3, the zoom switch 4 (zoom switch T4a and zoom switch W4b), the power switch 11, the reading mode selection button 5, the photographing mode dial 7, and the arrow key 9 or the like, as described above.

In addition, the sequence controller 113 has a function serving as an object luminance detecting section as well, and carries out a photometry process for computing object luminance based on an image input via the image pickup device 114. Alternatively, a dedicated photometry sensor for detecting the object luminance may be provided.

The image pickup device 114 is provided rearward of the lens unit 2 described in FIG. 3. The image pickup device 114 is composed of a number of pixels and a CCD or the like for transferring an electric charge obtained in each pixel. In addition, an object image incident to each pixel via the lens unit 2 is converted into an electric charge by means of photoelectric conversion. An image pickup device output processing circuit 115 processes the electric charges output from the image pickup device 114, and obtains image data.

Here, the image pickup device 114 is driven and controlled by means of an image pickup device reading driver 116 serving as a pixel reading circuit having received a control signal from the sequence controller 113. The image pickup device reading driver 116 has two reading modes, i.e., a non-additive reading mode serving as a first reading mode for forwarding an output of each pixel of the image pickup device 114 to the image pickup device output processing circuit 115 on a one by one pixel basis; and an additive reading mode serving as a second reading mode for adding pixels of the same color in an analog manner on a 9×9 pixel basis, and then, outputting the added pixels to the image pickup device output processing circuit 115. Then, in any of these reading modes, electric charges of the image pickup device 114 can be output to the image pickup device output processing circuit 115.

Figure 5:
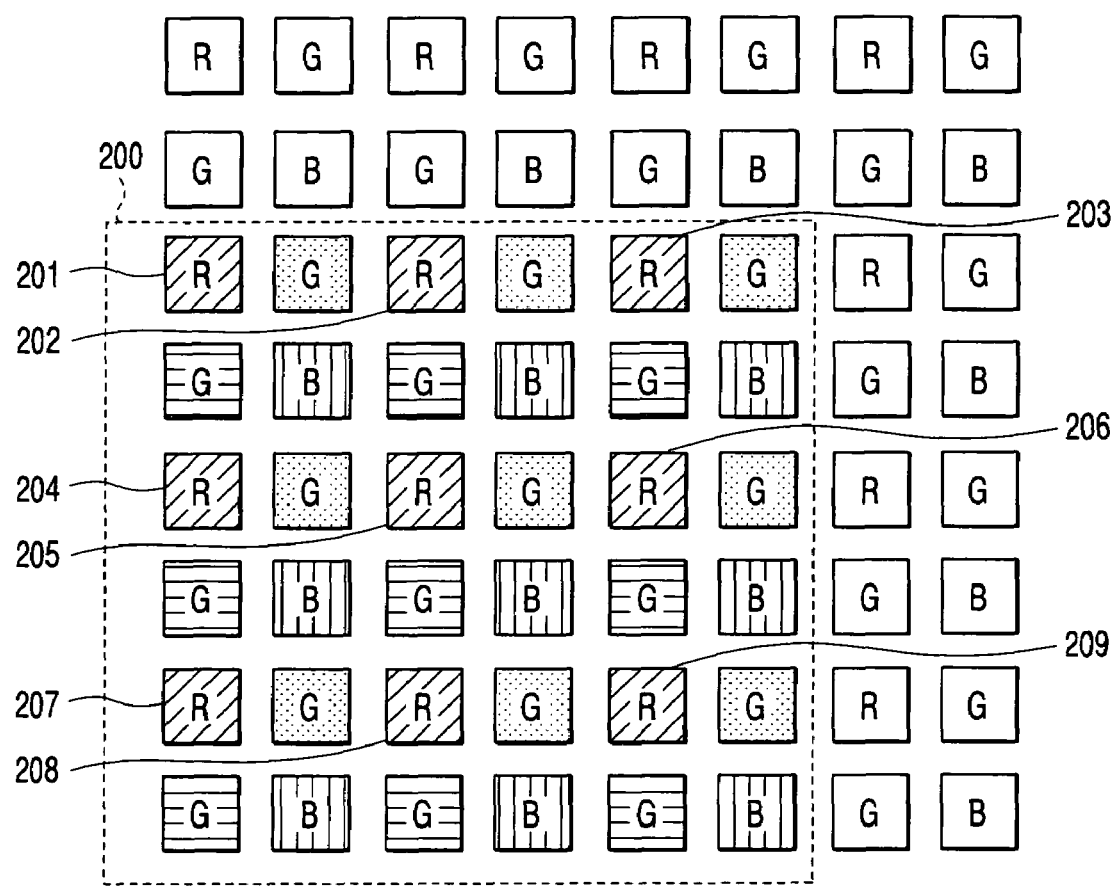
FIG. 5 is a conceptual view showing additive reading.

Now, the two reading modes will be described here. The image pickup device 114 enables additive reading of outputs of pixels of the same color in 9 pixels included in a square area under the control of the image pickup device reading driver 116. FIG. 5 is a conceptual view showing additive reading. Here, the pixel array of the image pickup device 114 shown in FIG. 5 is provided as an example of a Bayer array. Color filters are provided corresponding to pixels that indicate R, G, and B shown in FIG. 5. Among them, at the time of additive reading, the electric charges from the pixels having the same color shown in FIG. 5 are added and reading in an analogue manner. For example, by way of example of R pixels, 9 pixels of R201 to R209 are added and reading in a square area 200 shown in FIG. 5. Similarly, B pixels and G pixels each are added and reading on a 9 by 9 pixel basis. However, with respect to the Bayer array, 18 G pixels exist in the square area 200, and thus, with respect to G pixels, addition of pixel outputs are carried out in each of the odd numbered lines and even numbered lines in the square area 200.

Figure 6A:
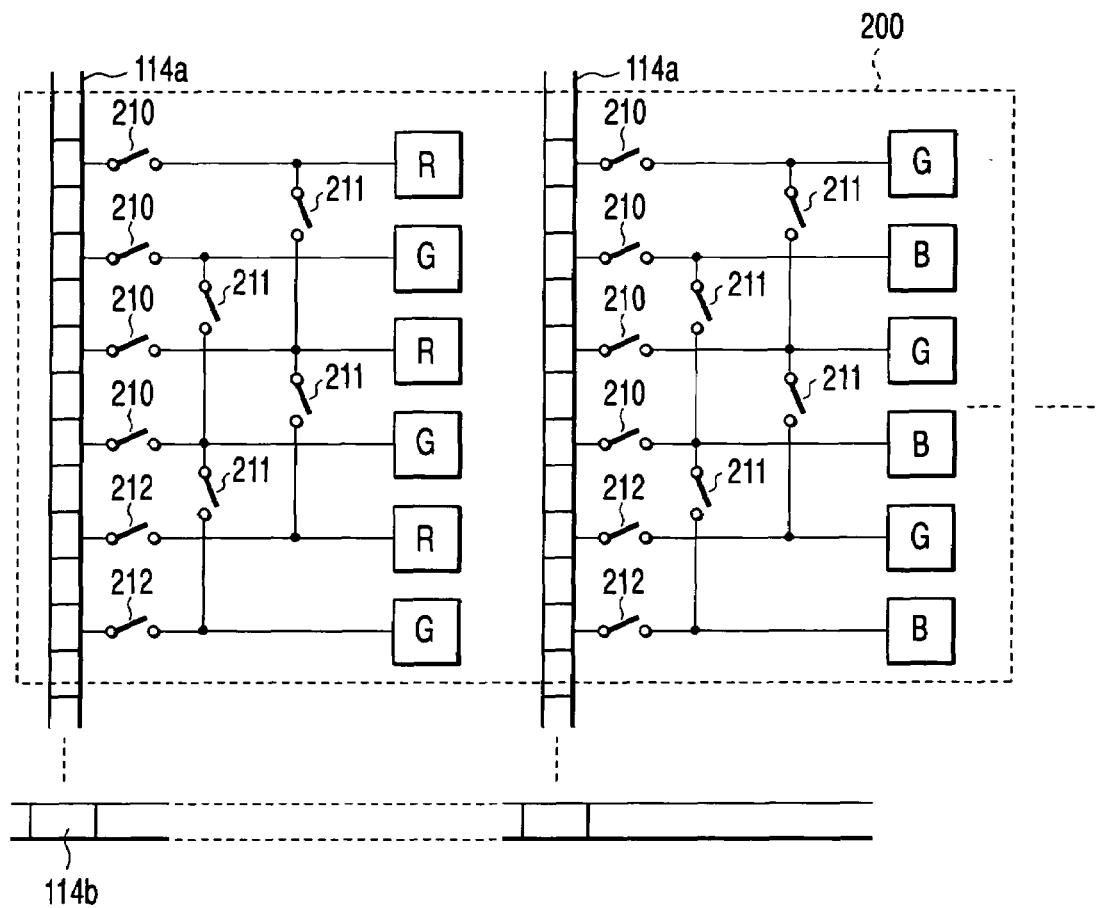
FIG. 6A is a view showing a configuration for reading in a vertical direction of an image pickup device.
Figure 6B:
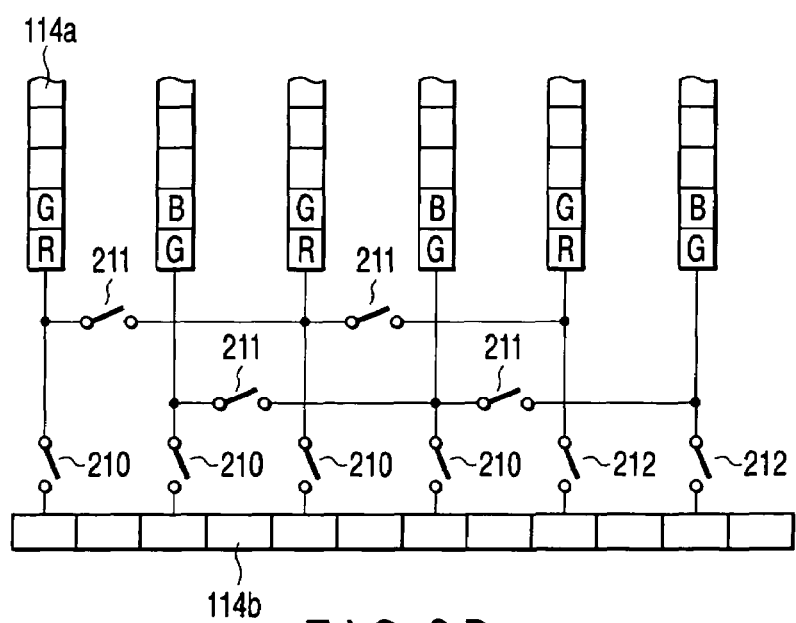
FIG. 6B is a view showing a configuration for reading in a horizontal direction of an image pickup device.

FIGS. 6A and 6B are views each showing a configuration of the image pickup device 114 for carrying out additive reading as shown in FIG. 5. FIG. 6A is a view showing a configuration for reading in a vertical direction of the image pickup device 114; and FIG. 6B is a view showing a configuration for reading in a horizontal direction of the image pickup device 114.

As shown in FIG. 6A, pixels of the image pickup device 114 each are connected to a vertical CCD 114a via a switch 210 or a switch 212. In addition, the pixels having the same color of the image pickup device 114 is connected via a switch 211. Further, as shown in FIG. 6B, a distal end of the vertical CCD 114a is connected to a horizontal CCD 114b via the switch 210 or the switch 212. In addition, the pixels having the same color at the distal end of the vertical CCD 114a are connected to via the switch 211.

In such a configuration, in the case of carrying out reading in a non-additive mode that is a first reading mode, the image pickup reading driver 116 supplies an instruction so as to close the switch 210 and the switch 212 of the image pickup device 114, and open the switch 211. In this manner, the electric charges from pixels of the image pickup device 114 are vertically transferred and horizontally transferred independently, respectively, and then, the transferred electric charges are converted into an analog image signal in a charge-to-voltage conversion amplifier (not shown). In contrast, in the case of carrying out reading in an additive mode that is a second reading mode, the image pickup device reading driver 116 supplies an instruction so as to open the switch 210 of the image pickup device 114, and then, close the switch 211 and the switch 212. In this manner, after the electric charges having the pixels of the same color of the image pickup device 114 have been added, the added electric charges are vertically transferred and horizontally transferred, and then, the transferred electric charges are converted into an analog image signal in the charge-to-voltage conversion amplifier (not shown).

FIG. 7 is a view showing an internal configuration of the image pickup device output processing circuit 115. The image pickup device output processing circuit 115 is composed of: a gain variable amplifier 115a; a gain controller 115b; and an analog-to-digital converter 115c. The gain variable amplifier 115a amplifies with a predetermined amplifier gain an analog image signal input from the image pickup device 114. The gain controller 115b sets an amplifier gain of the gain variable amplifier 115a based on a gain control signal from the sequence controller 113. The analog-to-digital converter 115c converts into a digital signal an analog image signal amplified by means of the gain variable amplifier 115a.

Here, the amplifier gain of the gain variable amplifier 115a is determined by a gain value A preset by the gain variable amplifier 115a and a magnification set in the gain controller 115b. Further, the magnification to be set in the gain controller 115b is set in response to imaging sensitivity (ISO sensitivity) specified by user manual setting or auto setting based on camera program setting. FIG. 8A is a view showing a relationship between ISO sensitivity and an amplifier gain. As shown in FIG. 8A, an amplifier gain is set while ISO 100 is defined as a reference.

In addition, FIG. 8A shows an integral time (exposure time) of the image pickup device 114 in the set amplifier gain. Further, FIG. 8B shows a relationship between an integral time of the image pickup device 114 and an analog-to-digital conversion range in the analog-to-digital converter 115c. As is evident from FIG. 8B, as ISO sensitivity decreases, the amplifier gain decreases. Thus, an integral time is extended for an output of the image pickup device 114 to reach a maximum value of the analog-to-digital conversion range of the analog-to-digital converter 115c. In contrast, as ISO sensitivity increases, the amplifier gain increases. Thus, the integral time of the image pickup device 114 is shortened.

Here, referring to a description of FIG. 4 again, an image memory 117 is provided as an image memory for temporarily holding image data processed by the image pickup device output processing circuit 115. An SDRAM, for example, is used for the image memory 117. An image processing circuit 118a reads image data stored in the image memory 117, and carries out YC de-multiplexing processing (RGB processing). Further, the image processing circuit 118a carries out a processing operation such as a shading correction processing operation or a distortion correction processing operation by utilizing distortion correction data or shading correction data and the like stored in a correction value storage memory 119.

In addition, image data output from the image pickup device 114 and processed in the image processing circuit 118a is sent to an image processing circuit 118b via the image memory 117. The image processing circuit 118b carries out another image processing operation which has not been made by the image processing circuit 118a such as γ-conversion processing operation with respect to the input image data. Further, the image data processed by the image processing circuit 118b is sent to an image compressing/decompressing circuit 120 via the image memory 117. The image compressing/decompressing circuit 120 compresses the input image data in accordance with a predetermined scheme such as a JPEG scheme.

Then, the image compressing/decompressing circuit 120 writes the compressed image data into a recording medium 121. The writing of the compressed image data into the recording medium 121 by means of the image compressing/decompressing circuit 120 is controlled by a control signal from the sequence controller 113. Namely, the sequence controller 113 also functions as a recording circuit. Here, as the recording medium 121, there is used a build-in memory such as a built-in flash memory or an external memory such as a mount type memory card. In addition, the image compressing/decompressing circuit 120 comprises a function of reading and decompressing image data from the recording medium 121.

An LCD driver 122 having received a control signal from the sequence controller 113 displays an image on the rear LCD panel 10 based on the image data decompressed by the image compressing/decompressing circuit 120. In addition, the LCD driver 122 having received a control signal from the sequence controller 113 displays a live view image input via the image pickup device 114 on the finder 6 or the rear LCD panel 10.

An image motion vector computing circuit 123 detects a motion of an image (image motion vector) while in a motion image pickup mode or the like, and outputs a result of the motion vector to the sequence controller 113.

An AF sensor module 12 is provided rearward of the AF window 12a, and outputs to the sequence controller 113 an AF luminous flux detected by carrying out detection of the AF luminous flux for focus driving of the lens 15. The sequence controller 113 carries out well known AF computation based on the AF luminous flux from the AF sensor module 12. Then, based on a result of this AF computation, the focus motor 105 is driven via the motor driver circuit 103.

Now, a change of a reading mode in accordance with the first embodiment will be described here. As described above, a first merit caused by adding and reading a pixel output is that sensitivity increases at the time of reading because outputs are added on a 9 by 9 pixel basis. In this manner, even in the case of imaging a dark object, an exposure time can be reduced, and camera shake is unlikely to occur. In addition, an output relevant to noise on the image pickup device 114 or the subsequent image pickup device output processing circuit 115 can be increased. That is, image noise or roughness can be reduced because the signal-to-noise ratio is improved.

In addition, a second merit caused by adding and reading a pixel output is that a reading time of pixel outputs for the whole screen is reduced because the data count at the time of reading is reduced to $1/9$. In this manner, during successive shots, for example, a number of frame images can be picked up within a predetermined time interval.

In contrary to these merits, a demerit caused by adding and reading pixels is that image resolution is lowered to $1/9$. Thus, in the case of picking up an image with a fine pattern, image fineness is lowered.

In addition, in the case of imaging while a camera is manually held, there is a problem that an image deteriorates due to camera shake while in imaging. Thus, in a conventional camera, a shutter speed is set in association with a zoom state (focal distance). Specifically, a shutter speed is set at a high speed side so that camera shake is unlikely to occur. Experimentally, in the case of a silver halide camera using a 135-format film with a focal distance represented by millimeters, it is said that deterioration of an image due to camera shake is reduced as long as a shutter speed is higher than an inverted number of the focal distance. For example, in the case where a focal distance is x mm, deterioration of an image due to camera shake is reduced when a shutter speed is 1/x seconds. A shutter speed of the inverted number of the focal distance is called camera shake second.

However, in the case where an object is dark, it is necessary to increase sensitivity of the image pickup device 114 in order to obtain the shutter speed that corresponds to the camera shake second. In this case, if imaging sensitivity is forcibly increased, noise increases, and a photograph which cannot be appreciated as an image is produced. Thus, in non-additive reading in which no pixel addition is carried out, there is a limitation to the shutter speed that can be set. Therefore, in the case where an object is dark in room or at a cloudy outside and the like, camera shake is likely to occur.

Therefore, in the first embodiment, a camera shake evaluation is made prior to imaging. That is, after detecting or predicting camera shake quantity which would occur with an image in accordance with an imaging condition, a mode for reading a pixel from the image pickup device 114 is changed from a non-additive reading mode to an additive reading mode in the case where deterioration of an image caused by camera shake is greater than deterioration of an image caused by pixel addition. In this manner, by speeding up a shutter speed, significant image deterioration caused by camera shake can be prevented.

FIGS. 9 to 14 are program diagrams of exposure control of a camera in accordance with the first embodiment. The camera in these examples is provided as a ×10 zoom camera, and is exemplified as that which changes from 6.3 to 63 mm in focal distance. In addition, a so called 1/2.5 type size image pickup device (CCD) is used, and its effective pixel size is in the order of 5,000,000 pixels. In addition, a focal distance in the case of conversion into a 135-format silver halide camera in a zoom lens in these examples (in the case where an angle of field is are substantially equal to each other), corresponds to 38 to 380 mm. In addition, F numbers of the zoom lens are F2.8 in Wide, F3.7 in Tele, and F8 in minimum aperture.

In addition, in the case of reading without pixel addition, for the imaging sensitivity of the camera in this example, base sensitivity is ISO 64-equivalent. In addition, the imaging sensitivity can be increased by changing the amplifier gain of the gain variable amplifier 115a at the inside of the image pickup device output processing circuit 115. In this example, by means of the gain variable amplifier 115a, it is possible to substantially continuously increase the imaging sensitivity from ISO 64 to a maximum of ISO 400-equivalent.

Figure 9:
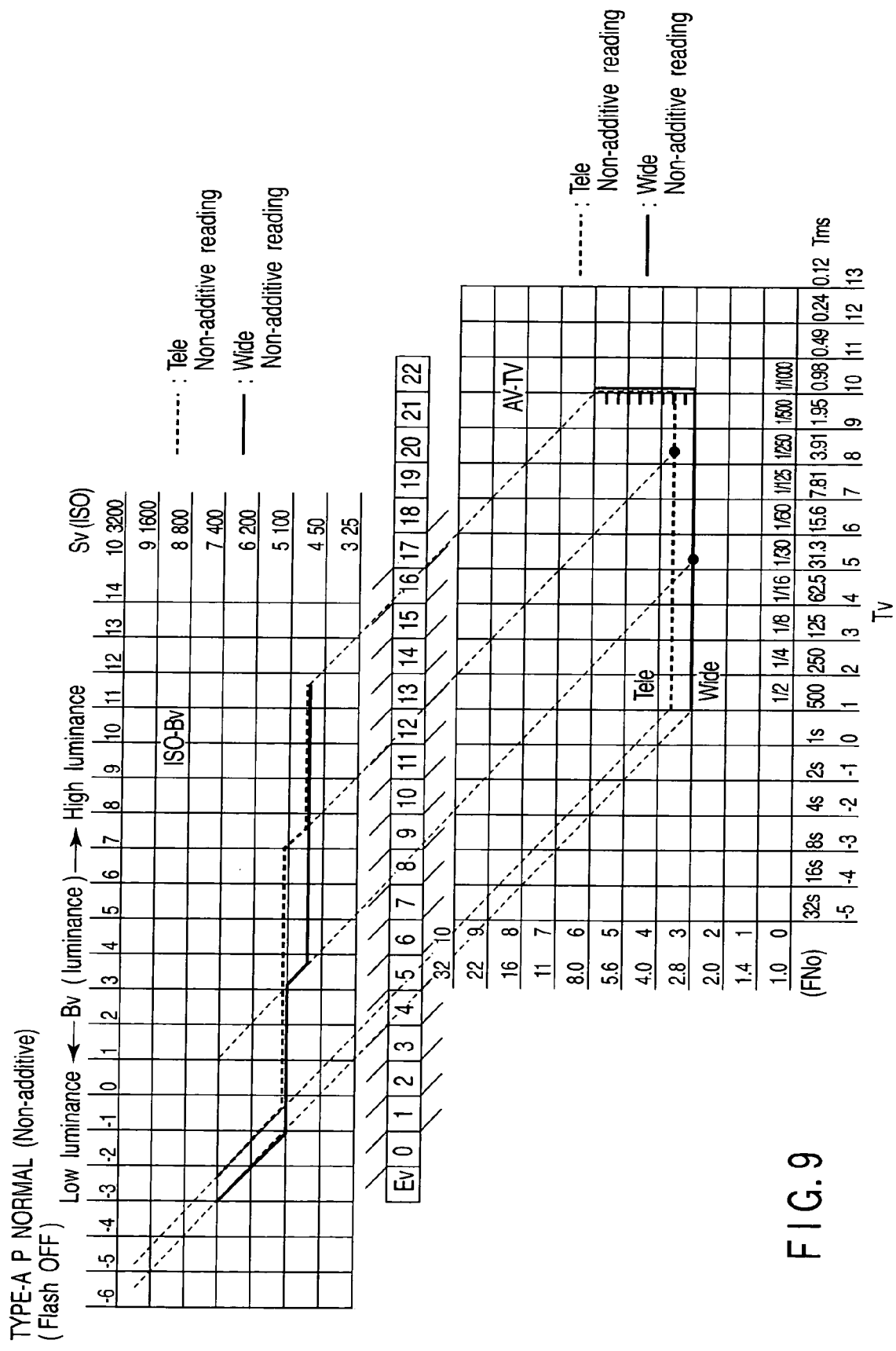
FIG. 9 is a program diagram in an exposure control program of TYPE-A.

FIG. 9 is a program diagram in an exposure control program of TYPE-A. In FIG. 9, Wide and Tele are typically represented, and an intermediate zoom area is between two lines indicating Wide and Tele. The program of TYPE-A shown in FIG. 9 does not carry out additive reading, and basically restricts ISO sensitivity to ISO 100 or less. In this manner, image noise is reduced and image fineness is also increased. Namely, the program of TYPE-A puts importance on improvement of image quality in the case where no camera shake occurs rather than prevention of image deterioration due to camera shake.

The high luminance side shown in FIG. 9 is set at ISO 64 of base sensitivity. In BV11 corresponding to bright outside (corresponding to EV16 in ISO 100), aperture (AV in the figure) is set to F8, and the shutter speed (TV in the figure) is set to $1/1000$ second. In FIG. 9, as the luminance becomes darker than BV11, the aperture is opened while the shutter speed is maintained. Then, at a time point at which the aperture has reached an open state, the shutter speed is then delayed.

Here, in the case of Tele, the imaging sensitivity is gradually increased near $1/380$ second of the above-described camera shake second, and the imaging sensitivity is fixed from where the imaging sensitivity has reached ISO 100. Then, exposure is adjusted by delaying the shutter speed.

On the other hand, in the case of Wide, the imaging sensitivity is gradually increased near $1/38$ second of the camera shake second, and the imaging sensitivity is fixed where the imaging sensitivity has reached ISO 100. Then, exposure is adjusted by delaying the shutter speed. Then, when the shutter speed becomes $1/2$ second in both of Tele and Wide, exposure is adjusted by increasing the imaging sensitivity with respect to a darker region while ISO 400 is defined as an upper limit.

Figure 10:
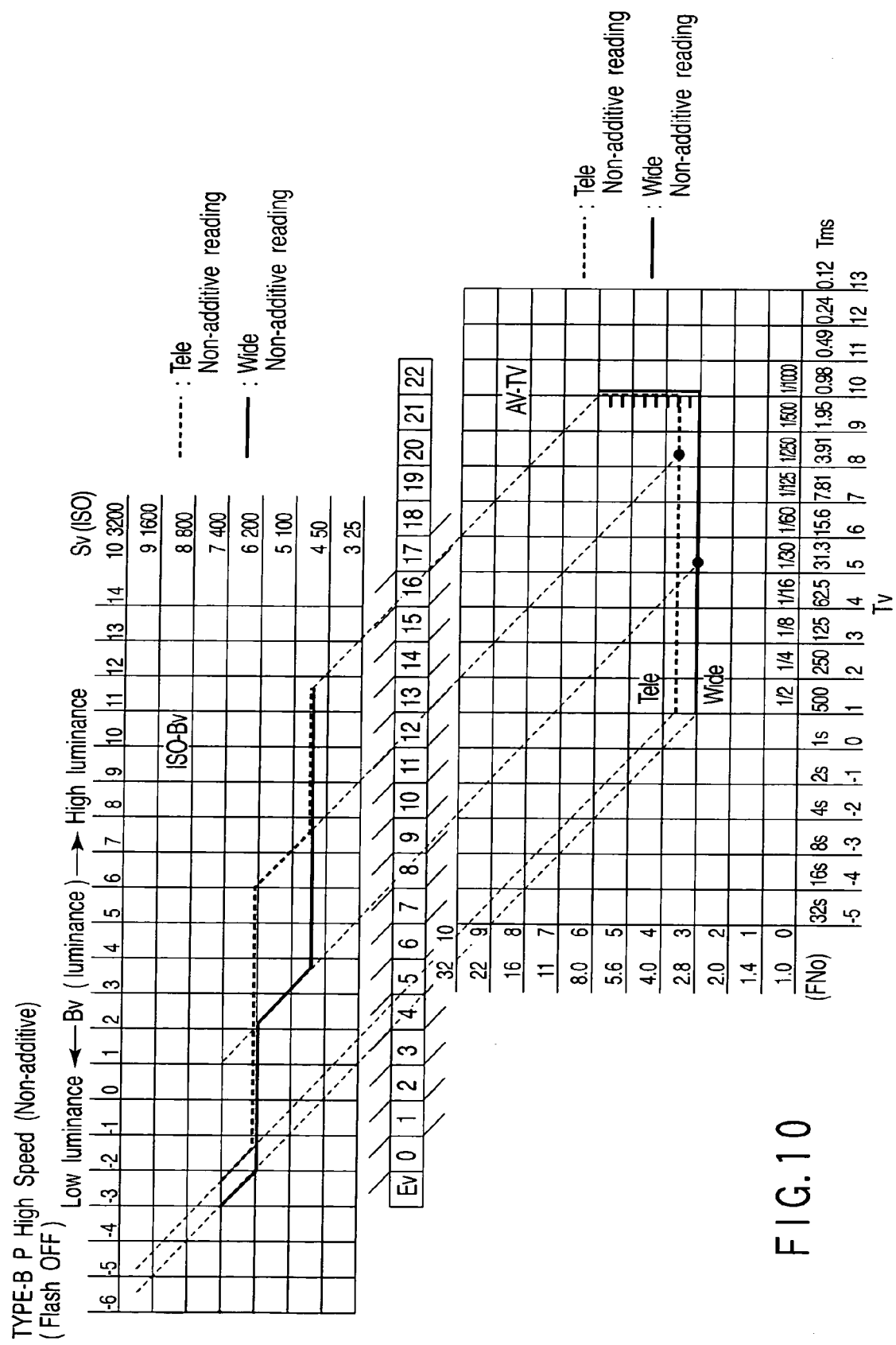
FIG. 10 is a program diagram in an exposure control program of TYPE-B.

In addition, FIG. 10 is a program diagram in an exposure control program of TYPE-B. In FIG. 10 as well, Wide and Tele is typically indicated, and an intermediate zoom region is between two lines indicating Wide and Tele. This program of TYPE-B does not carry out pixel additive reading. In addition, ISO sensitivity is basically restricted to ISO 200 or less. In this manner, image fineness is increased while a balance between image noise and shutter speed is taken. That is, the program of TYPE-B restricts an effect due to camera shake more than TYPE-A does while putting importance on image fineness.

The high luminance side is set at ISO 64 of base sensitivity, and, in BV11 corresponding to bright outside (corresponding to EV16 in ISO 100), the aperture is set to F8, and the shutter speed is set to 1/100 second. In FIG. 10, when the luminance becomes darker than BV11, the aperture is opened while the shutter speed is maintained. Then, at a time point at which the aperture has reached the open state, the shutter speed is then delayed.

In the case of Tele, after gradually increasing the imaging sensitivity near 1/380 second of the above-described camera shake second, the imaging sensitivity is fixed when the imaging sensitivity has reached ISO 200. Then, exposure is adjusted by delaying the shutter speed.

On the other hand, in the case of Wide, the imaging sensitivity is gradually increased near 1/38 second of the camera shake second, and the imaging sensitivity are fixed where the imaging sensitivity has reached ISO 200. Then, exposure is adjusted by delaying the shutter speed.

Then, when the shutter speed becomes 1/2 second in both of Tele and Wide, exposure is adjusted by increasing the imaging sensitivity with respect to a darker region while ISO 400 is defined as an upper limit.

Figure 11:
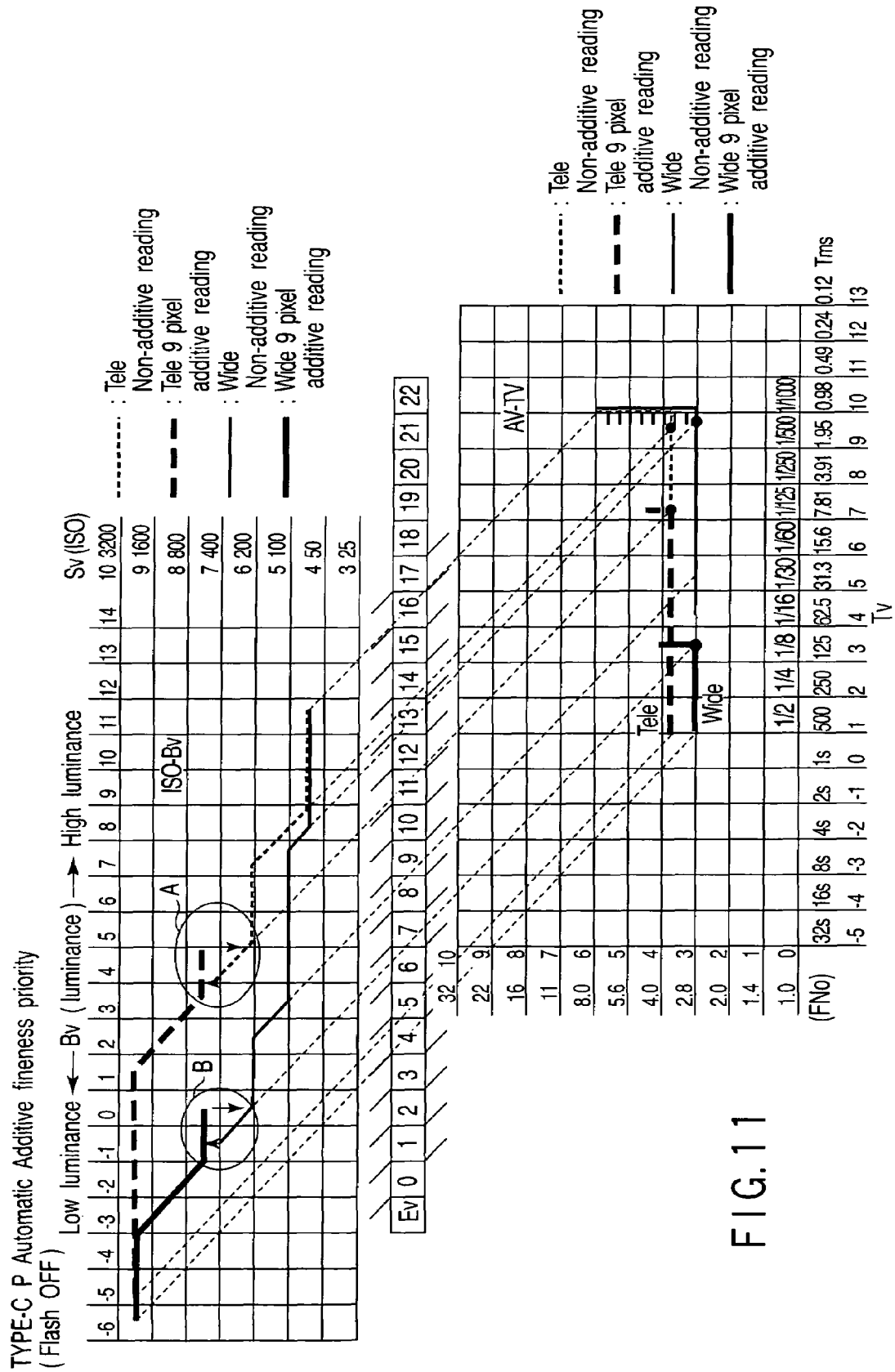
FIG. 11 is a program diagram in an exposure control program of TYPE-C.

FIG. 11 is a program diagram in an exposure control program of TYPE-C. In FIG. 11 as well, Wide and Tele are typically shown, and an intermediate zoom region is between two lines indicating Wide and Tele. This program of TYPE-C permits up to ISO 400 the imaging sensitivity in a normal non-additive reading mode. Then, in the case where the shutter speed lower than the camera shake second by 1 or 2 steps cannot be maintained, a reading mode is changed to the additive reading mode, thereby increasing the imaging sensitivity and preventing camera shake. That is, TYPE-C carries out additive reading only in the case where camera shake is likely to occur while maximizing a range in which non-additive reading can be carried out. In other words, TYPE-C is provided as a mixture program of non-additive reading and additive reading, which puts importance on image fineness.

The high luminance side is set at ISO 64 of base sensitivity. In BV11 corresponding to bright outside (corresponding to EV16 in ISO 100), the aperture is set to F8, and the shutter speed is set to 1/100 second. If the luminance becomes darker than BV11, the aperture is opened while the shutter speed is maintained. Then, at a time point at which the aperture has reached the open state, the shutter speed is delayed.

Here, in the case of Tele, imaging sensitivity is gradually increased around 1/760 second that is a half of the above-described camera shake second of 1/380 second. Then, when the imaging sensitivity has reached ISO 400, the reading mode is changed to the additive reading mode in order to prevent camera shake. In the additive reading mode, processing first starts from ISO 576 that falls into nine times of base sensitivity. In this state, while control is made so as not to be slower than 1/190, the shutter speed, that is twice as large as the camera shake second, the imaging sensitivity is increased up to ISO 2400 at maximum. Then, after the imaging sensitivity has reached ISO 2400, the imaging sensitivity is fixed, and then, exposure is controlled while the shutter speed is changed to a low speed side.

On the other hand, in the case of Wide, when the shutter speed is equal to or smaller than 1/1000 second, exposure is controlled by increasing imaging sensitivity to ISO 100. The imaging sensitivity is then fixed to ISO 100, and the shutter speed is delayed, thereby making exposure control. Then, the imaging sensitivity is gradually increased again from the proximity of 1/38 second that is the camera shake second. When the imaging sensitivity has reached ISO 200, exposure is adjusted by fixing the imaging sensitivity, and then, delaying the shutter speed. Further, in the case of Wide, at a time point at which the shutter speed has reached 1/95 second that is four times of camera shake second, and exposure control is made until the imaging sensitivity becomes ISO 400. In addition, in the case of Wide, the reading mode is changed to an additive reading mode at a time point at which the imaging sensitivity becomes brightness that is not compatible with ISO 400 in a state of 1/9.5 second that is four times of the camera shake second. Then, the imaging sensitivity is increased while ISO 2400 is set to an upper limit, and exposure control is made so that the shutter speed is not delayed than 1/9.5.

In a state in which the imaging sensitivity is ISO 2400 in both of Tele and Wide as well, in the case where the shutter speed of 1/9.5 second is not available, exposure is then controlled by delaying the shutter speed up to a maximum of 1/2 seconds.

Here, in a program of TYPE-C, hysteresis for about one stage is provided at a changing point between the additive reading mode and the non-additive reading mode (A region of FIG. 11 in the case of Tele and B region of FIG. 11 in the case of Wide). This is because image fineness or a noise level changes as described above when the additive reading mode and non-additive reading mode are changed to each other, namely when an additive pixel size is changed (in this case, one pixel and nine pixel are changed to each other). That is, at a changing point, a change in image fineness and a change in noise level become non-continuous. Thus, in the case where a user takes a plurality of photographs near the changing point, even in the case where brightness or a construction is substantially identical, there coexist the additive reading mode image and non-additive reading mode image. Therefore, there is a danger that a user has an unnatural feeling. As shown in FIG. 11, therefore, by providing hysteresis, hunting in the reading scheme can be prevented in the case where brightness greatly changes and a construction does not change.

In addition, in general, a degree of a change in imaging sensitivity changed due to pixel addition is greater than a degree of a change in imaging sensitivity that can be set by the user. Specifically, in an example of FIG. 11, at the changing point, the imaging sensitivity changes from ISO 64 to ISO 400. The change rate is 6.25 times, while the change rate at the time of changing the non-additive reading mode and 9-pixel additive reading mode is 9 times. At the changing point, while the shutter speed is maintained, exposure is adjusted by closing an aperture.

For example, if an attempt is made to change the reading mode to the additive reading mode in the case of Tele, in a state of ISO 400, aperture open (F3.7), and the shutter speed of 1/190 second, the minimum imaging sensitivity during the additive reading mode is set to ISO 576 that is nine times of ISO 64. Thus, at F3.7 and at a shutter speed of 1/190 second, over-exposure occurs. Here, when exposure is adjusted by delaying a shutter speed, a situation of camera shake or object shake discontinuously changes at this changing point. In this case, in spite of a slightly darken state, the shutter speed changes to a high speed side, and an unnatural change that camera shake or object shake becomes small occurs. Thus, the aperture is closed while the shutter speed is fixed, thereby adjusting exposure. Then, in the case where object luminance is further lowered, and becomes darker, exposure is first controlled by opening the aperture. Then, at a time point at which the aperture has reached the open state, the imaging sensitivity is increased and exposure is controlled by increasing the amplifier gain of the gain variable amplifier 115a.

As described above, in the first embodiment, in the case where the luminescence is lowered and the non-additive reading mode is changed to the additive reading mode or in the case where an additive count at the time of reading is changed, first, the aperture is closed, and exposure is controlled in a state in which the shutter speed is fixed. In the case where the luminance becomes darker, until the aperture is opened, exposure is controlled by opening the aperture in a state in which the imaging sensitivity and shutter speed are fixed. In the case where the luminance becomes further darker in a state in which the aperture is opened, the imaging sensitivity is changed, and exposure is controlled.

Figure 12:
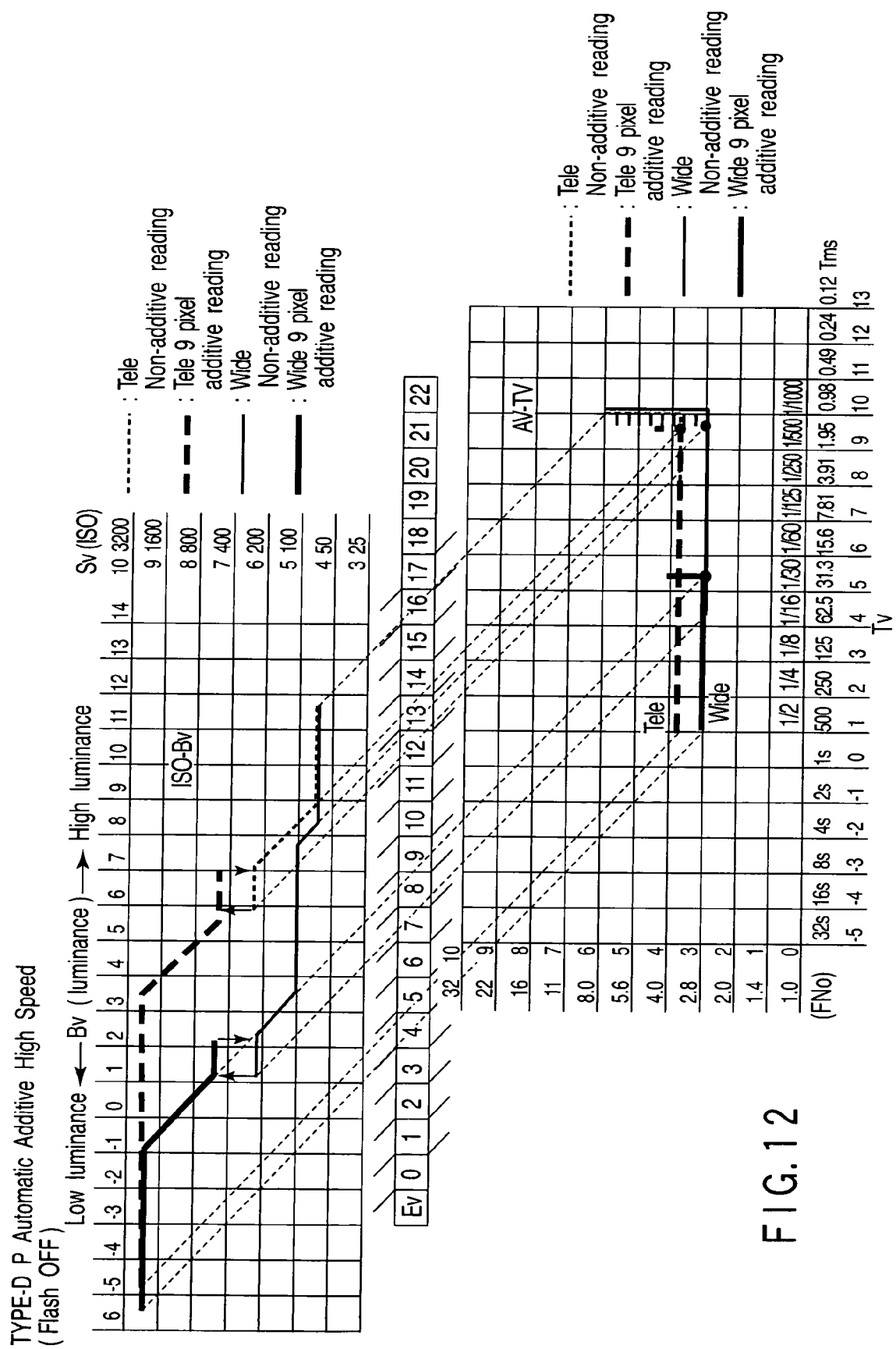
FIG. 12 is a program diagram in an exposure control program of TYPE-D.

FIG. 12 is a program diagram in an exposure control program of TYPE-D. In FIG. 12 as well, Wide and Tele are typically shown, and an intermediate zoom region is between two lines indicating Wide and Tele. In this program of TYPE-D, in order to restrict camera shake or object shake, a luminance range in which the shutter speed at the time of camera shake is maintained is set as widely as possible. In addition, in the case where the non-additive reading mode is not available, the imaging sensitivity is increased, and then, camera shake is prevented, by changing the reading mode to the additive reading mode.

In addition, the ISO sensitivity in the non-additive reading mode is restricted to a maximum of ISO 250, thereby restricting noise level to that endurable to viewing. That is, TYPE-D is provided as a mixed program having the non-additive reading mode and the additive reading mode emphasizing reduction of camera shake and object shake and restriction of image noise.

The high luminance side is set to ISO 64 of base sensitivity; the aperture is set to F8 at BV11 corresponding to a bright exterior (corresponding to EV16 in ISO 100); and the shutter speed is set to $1/100$ second. If the luminance becomes darker than BV11, the aperture is opened while the shutter speed is maintained. Then, at a time point at which the aperture has reached the open state, the shutter speed is delayed.

Here, in the case of Tele, the imaging sensitivity is gradually increased near $1/760$ second that is the shutter speed being half of the above camera shake second. Then, at a time at which the imaging sensitivity has reached ISO 250, the imaging sensitivity is fixed, and then, the shutter speed is delayed, thereby adjusting exposure. Then, when the shutter speed at the time of camera shake is near $1/380$ second, a current mode is changed to the additive reading mode. The additive reading mode first starts from ISO 576 that falls into nine times of the base sensitivity. In this state, while the shutter speed is controlled so as not to be slower than $1/760$ second, the imaging sensitivity is increased to ISO 2400 at maximum. After the imaging sensitivity has reached ISO 2400, the imaging sensitivity is fixed, and exposure is then controlled while the shutter speed is delayed.

On the other hand, in the case of Wide, when the shutter speed is equal to or smaller than $1/1000$ second, exposure is controlled by increasing the imaging sensitivity until the imaging sensitivity reaches ISO 100. Then, the imaging sensitivity is fixed to ISO 100, and the shutter speed is delayed, thereby controlling exposure. In addition, the imaging sensitivity is gradually increased again from the vicinity of $1/38$ second at the time of the camera shake second. When the imaging sensitivity has reached ISO 250, the imaging sensitivity is fixed, and the shutter speed is delayed, thereby adjusting exposure. Further, at a time point at which the camera shake becomes $1/19$ second that is two times of the camera shake second, the reading mode is changed to the additive reading mode. First, the additive reading mode starts from ISO 576 that falls into nine times of the base sensitivity. In this state, while the shutter speed is controlled so as not to be slower than $1/38$ second of the shutter speed at the time of camera shake, the imaging sensitivity is increased to ISO 2400 at maximum. After the imaging sensitivity has reached ISO 2400, the imaging sensitivity is fixed, and then, the shutter speed is delayed, thereby controlling exposure.

In a program of TYPE-D, as in TYPE-C, hysteresis is provided at a changing point between the non-additive reading mode and the additive reading mode. However, in the case where the non-additive reading mode is changed to the additive reading mode in TYPE-D, unlike TYPE-C, an increase in the imaging sensitivity is solved using both of the aperture and the shutter speed. This is because, in this program of TYPE-D, the imaging sensitivity changes from ISO 250 to ISO 576, and thus, its change rate is increased by setting either one of the aperture and shutter speed, preventing a discontinuously significant change of camera shake and object shake or an object field depth.

Figure 13:
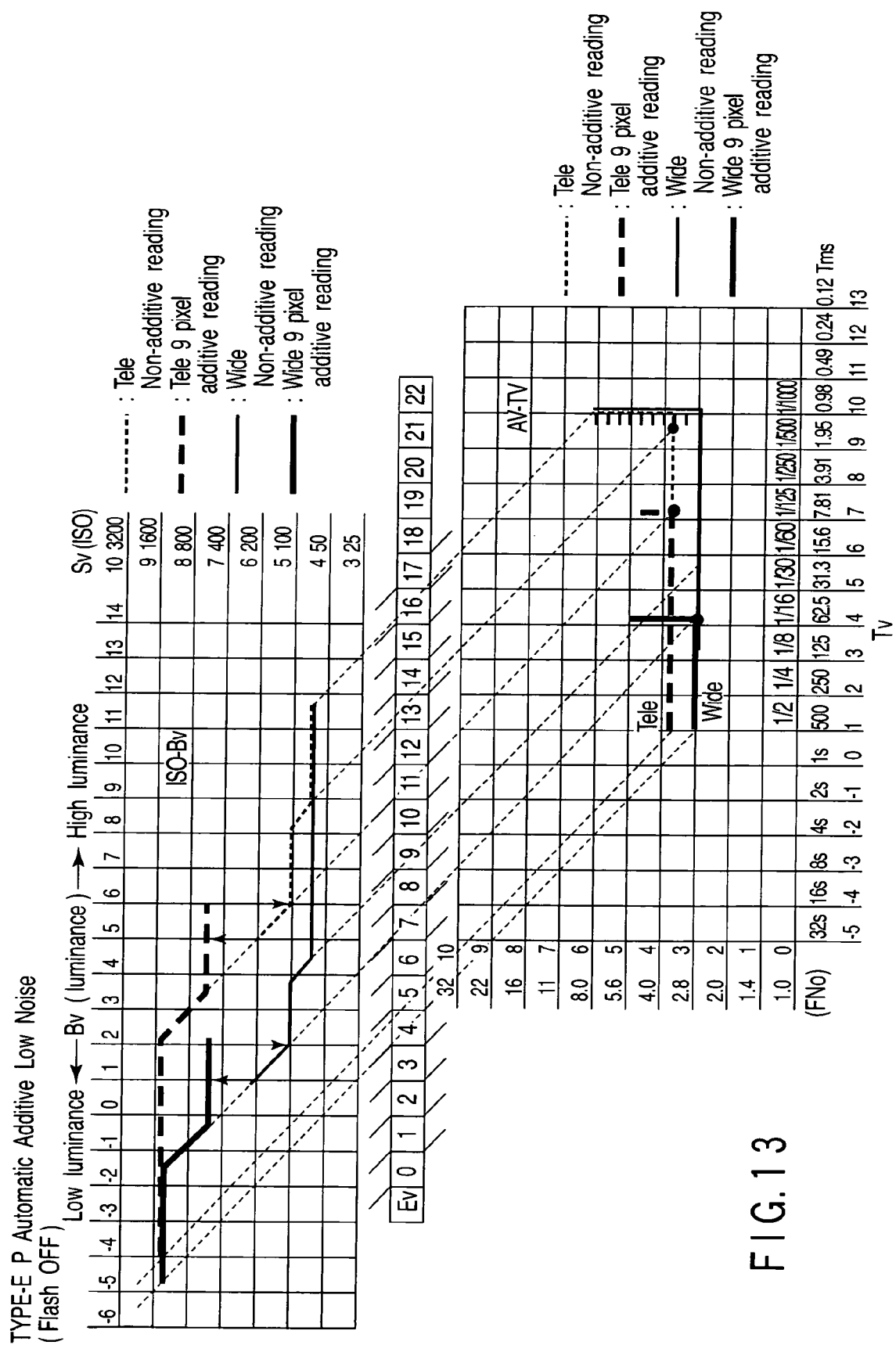
FIG. 13 is a program diagram in an exposure control program of TYPE-E.

FIG. 13 is a program diagram in an exposure control program of TYPE-E. In FIG. 13 as well, Wide and Tele are typically shown, and an intermediate zoom region is between two lines indicating Wide and Tele. In this program of TYPE-E, by restraining noise of an image to the minimum, there can be easily obtained a smooth image free of roughness on a whole screen at the time of viewing even in an object having a comparatively low luminance. In a program of TYPE-E, ISO sensitivity during the non-additive reading mode is restricted to ISO 200 at maximum. In addition, the image sensitivity during the additive reading mode is restricted to ISO 1440 at maximum. In this manner, a noise level becomes good. That is, TYPE-E is provided as a mixed program of the non-additive reading mode and the additive reading mode emphasizing restriction of image noise.

The high luminance side is set to ISO 64 of base sensitivity; the aperture is set to F8 in BV11 corresponding to a bright exterior (corresponding to EV16 in ISO 100); and the shutter speed is set to $1/100$ second. When the luminance becomes darker than BV11, the aperture is opened while the shutter speed is maintained. Then, the shutter speed is delayed at a time point at which the aperture has reached the open state.

Here, in the case of Tele, the imaging sensitivity is gradually increased near $1/760$ second that is a shutter speed being half of the camera shake second. At a time point at which the imaging sensitivity has reached ISO 100, the imaging sensitivity is fixed, and the shutter speed is delayed, thereby adjusting exposure. When the shutter speed is near $1/190$ second that is two times of the camera shake second, exposure is controlled while the imaging sensitivity is increased again. At a time point at which the imaging sensitivity has reached ISO 200, the reading mode is changed to the additive reading mode. The additive reading mode first starts from ISO 576 that falls into nine times of base sensitivity. In this state, while the shutter speed is controlled so as not to be slower than $1/190$ second that is two times of the camera shake second, the imaging sensitivity is increased to ISO 1440 at maximum. After the imaging sensitivity has reached ISO 1440, the imaging sensitivity is fixed, and then, exposure is controlled while the shutter speed is delayed.

On the other hand, in the case of Wide, when the shutter speed becomes $1/38$ second of the camera shake second, exposure is controlled by increasing imaging sensitivity until the imaging sensitivity reaches ISO 100. Then, the imaging sensitivity is fixed to ISO 100, and the shutter speed is delayed, thereby controlling exposure. Then, the imaging sensitivity is gradually increased again from the vicinity of $1/19$ second that is the shutter speed being two times of the camera shake second. The reading mode is changed to the additive reading mode after the imaging sensitivity has reached ISO 200. The additive reading mode first starts from ISO 576 that falls into nine times of base sensitivity. In this state, while the shutter speed is controlled so as not to be slower than the shutter speed of 1/38 second at the time of the camera shake second, the imaging sensitivity is increased to ISO 1440 at maximum. After the imaging sensitivity has reached ISO 1440, the imaging sensitivity is fixed, and then, the shutter speed is delayed, thereby controlling exposure.

Here, in a program of TYPE-E as well, as in TYPE-C, hysteresis is provided at a changing point of the reading mode.

FIG. 14 is a program diagram in an exposure control program of TYPE-F. In FIG. 14 as well, Wide and Tele are typically shown, and an intermediate zoom region is between two lines indicating Wide and Tele. This program of TYPE-F is provided as an additive reading fixed program for always adding and reading nine pixels. In this manner, a shutter is operated at a high speed and the pixel size at the time of reading is restricted to the minimum so as to enable high speed continuous photographing.

The high luminance side is set to ISO 576 that is nine times of ISO 64 of base sensitivity; the aperture is set to F8 in BV9 corresponding to a bright exterior (corresponding to EV17 in ISO 100); and the shutter speed is set to 1/2000 second. When the luminance becomes darker than BV9, the aperture is opened while the shutter speed is maintained. The shutter speed is delayed at a time point at which the aperture has reached the open state.

In the case of Tele, when the shutter speed becomes 1/380 second of the camera shake second, the imaging sensitivity is gradually increased and exposure is adjusted in a state in which the shutter speed is fixed. When the imaging sensitivity has reached ISO 2400, the imaging sensitivity is fixed, and the shutter speed is delayed, thereby adjusting exposure. On the other hand, this also applies to the case of Wide as well. Namely, the imaging sensitivity is first increased at about 1/38 second of the camera shake second.

The contents of exposure control programs of six types of TYPE-A to TYPE-F are summarized as shown in FIG. 15A. In the first embodiment, these six types of exposure control programs are properly selected and used in accordance with an imaging condition. FIG. 15B shows a combination of an photographing mode and an exposure control program selected in accordance with the photographing mode. The maximum recording pixel shows the maximum recording pixel size in each photographing mode. For example, in the case where the maximum recording pixel is 5M (5,000,000 pixels), recording is carried out in recording pixel size equal to a captured pixel size in the case of the non-additive reading mode. In the additive reading mode, recording is carried out by setting images captured in the order of 670,000 pixels to 5,000,000 pixels or equivalent in accordance with interpolating computation. In addition, in the case where the maximum recording pixel is 3M (3,000,000 pixels), recording is carried out in 3,000,000 pixels by resizing the pixel size smaller than the captured pixel size in the case of the non-additive reading mode. On the other hand, in the case of the additive reading mode, recording is carried out after the images captured in the order of 670,000 pixels have been resized to 3,000,000 pixels or equivalent in accordance with interpolating computation.

Here, in an example of FIG. 15B, the maximum recording pixel size is restricted to 3,000,000 pixels in the case of the EASY mode. As in the EASY mode, in the case where the additive reading mode and the non-additive reading mode coexist (in photographing mode in which programs of TYPE-C to TYPE-E are selected in FIG. 15B), rapid change of image characteristics when the reading mode has been changed can be reduced by fixing the recording pixel size to the pixel size between the pixel size of the non-additive reading mode and the pixel size of the additive reading mode. Specifically, a difference in image fineness is reduced, and the noise produced in an image in the non-additive reading mode is also reduced by making resizing operation. Thus, noise difference between the image in the non-additive reading mode and the image in the additive reading mode is reduced. Therefore, even if the reading mode is automatically changed, a user has little unnatural feeling. Further, in the EASY mode, the capacity of recording data is unnecessarily increased, and there is less worrying about reducing the number of images that can be recorded in the recording medium.

On the other hand, in other photographing modes, even in the case where the additive reading mode and the non-additive reading mode coexist, the maximum recording pixel size is set to 5,000,000 pixels. This is because a user other then a beginner can reflect imaging intention more significantly as the recording pixel size is larger. Further, the recording pixel size may be changed by making an operation such as the arrow key 9.

In addition, modes such as the EASY mode, the sport mode, the landscape mode, the portrait mode, and the nightscape mode are frequently used by a general user. Thus, in the case where the luminance is dark in order to prevent significant camera shake, a program of automatically changing the reading mode to the additive reading mode is provided. In these photographing modes, selection of the reading mode by the reading mode selection button 5 is inhibited.

On the other hand, in the case of photographing modes of taking a photograph considering the aperture and the shutter speed, such as a program mode, aperture priority (A)/shutter priority (S)/manual (M) modes, automatic switching of additive reading of pixel output is not carried out. In this case, a user can select whether or not additive reading of pixel output (that is, can select TYPE-A or TYPE-F) is carried out. This selection can be made by the reading mode selection button 5.

Namely, this camera comprises a scheme of automatically judging whether or not to carry out additive reading of additive pixel output (AUTO) and a scheme in which no change is made unless a user selects whether or not to carry out additive reading of pixel output (additive fixing or non-additive fixing) . Thus, control of reading of optimal pixels by one camera can be easily made according to the user preference.

Now, a description will be given with respect to displaying a reading scheme on an LCD display 5a according to the photographing mode. A scheme of reading pixels according to a current set photographing mode is displayed on the LCD display 5a provided on a side face of the camera. For example, in the case where a photographing mode dial 7 is set to EASY or sports, TYPE-D is selected as an exposure control program, as shown in FIG. 15B. This type-D is provided as a scheme of automatically changing whether or not to carry out additive reading of pixel output according to brightness of an object and a zoom state (focal distance). Thus, the indicator 5b lights in a portion of AUTO of the LCD display 5a.

In addition, in the case where the photographing mode dial 7 has been set to AUTO, TYPE-A is selected as an exposure control program. In the case where the dial has been set to PH1, TYPE-B is selected as an exposure control program. In these cases, the non-additive reading mode is always set. Therefore, the indicator 5b lights in a "non-additive" portion of the LCD display 5a. In addition, in the case where the photographing mode dial 7 is set to P or A/S/M, the indicator 5b either of the non-additive or additive portions lights in accordance with a scheme selected by a user via the reading mode selection button 5. In addition, in the case where the additive reading mode such as PH2 is fixed, the indicator 5b lights in an "additive" portion of the LCD display 5a.

As described above, the camera in accordance with the first embodiment can display on the LCD display 5a whether or not the scheme of determining whether or not to make additive reading of pixel output in a current photographing mode is fixed or automatic. Thus, even without referring to a manual or the like, it is possible to easily judge whether additive reading of pixel output is automatic or fixed for each selected photographing mode. In addition, the LCD display 5a displaying a selection result of whether or not to carry out additive reading of pixel output is allocated in the vicinity of the reading mode selection button 5, thus making it possible to easily check a pixel reading scheme selected by manual setting.

In addition, in this camera, in the case where a scheme of reading pixel output has been manually selected, the information is stored in the camera. Thus, information on a selection result of additive reading and non-additive reading of pixel output is maintained even in the case where the reading mode is changed to another photographing mode. Specifically, in the case where non-additive is selected in a state in which the photographing mode dial 7 is set to P, a system of reading pixel output is selected as non-additive even if the photographing mode dial 7 is set to A/S/M from P state. Thus, a risk of imaging with unintended setting can be avoided.

Now, a description will be given with respect to a display for actually checking that addition or non-addition of pixel output is set at the reading time point in a scheme of reading pixel output of the image pickup device 114. As described previously, in the case where switching of the additive reading mode and the non-additive reading mode is automatic in the photographing mode, the indicator 5b of the LCD display 5a lights at an AUTO portion. At this time, the display is made such that an addition or non-addition of pixel output can be judged on the rear LCD panel 10 or the finder 6.

Figure 16A:
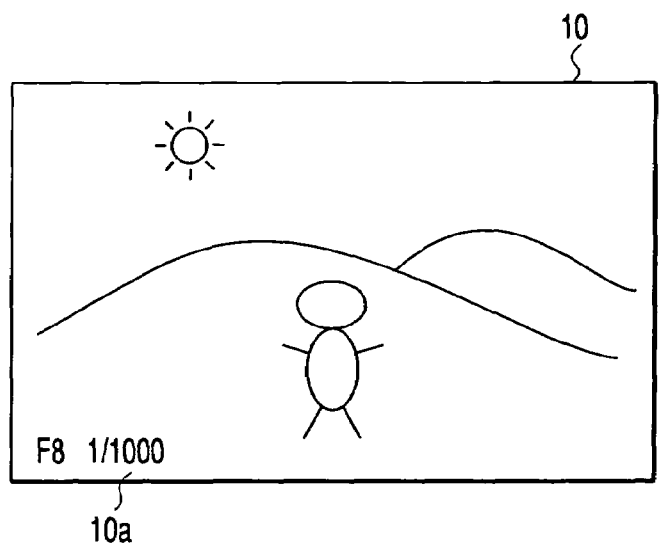
FIGS. 16A, 16B, and 16C are views for explaining a display for actually checking whether addition or non-addition of a pixel output is correctly set at a current time point.

For example, in the EASY mode, let us consider a case of imaging in a Tele state. In the case of brightness of BV11 (corresponding to EV16 in ISO 100), the aperture is set to F8, and the shutter speed is set to $\frac{1}{1000}$ second. In this case, as described above, the reading mode is set to the non-additive reading mode. Here, in a state in which the release button 3 is not depressed, the aperture and the shutter speed are displayed on the rear LCD panel 10, as designated by reference numeral 10a as shown in FIG. 16A. In this state, when the release button 3 is semi-pressed by a user, an operation ready for imaging is started, and the camera carries out photometry processing and AF processing. In this manner, a focus is fixed, and exposure is also fixed. At the same time, as shown in FIG. 16B, a "non-additive" character 10b is displayed to indicate that pixels of the image pickup device 114 are reading in the non-additive reading mode.

On the other hand, a mode of reading pixels in a slightly dark situation of BV1.5 is provided as the additive reading mode. For example, at the imaging sensitivity corresponding to ISO 2400, the aperture is set to F3.7, and the shutter speed is set to $\frac{1}{125}$ second. In this case, as shown in FIG. 16C, there are displayed the display 10a of an aperture value of F3.7 and a shutter speed of $\frac{1}{125}$ and an "additive" character 10c indicating that pixels are reading in the additive reading mode.

As described above, in the first embodiment, a display indicating a pixel reading mode is made at a time point at which photometry has been determined by making an imaging preparation operation such as semi-pressing of the release button 3. Thus, the user can easily judge in which of the additive reading mode and the non-additive reading mode, imaging has been carried out.

Figure 16B:
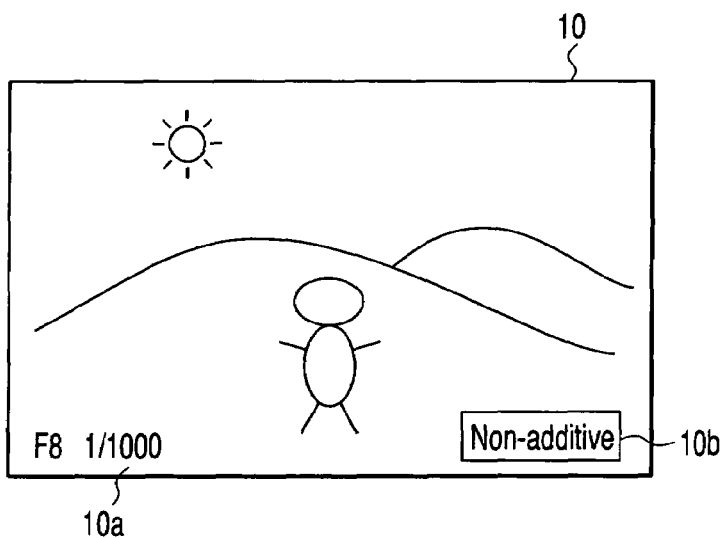
Figure 16C:
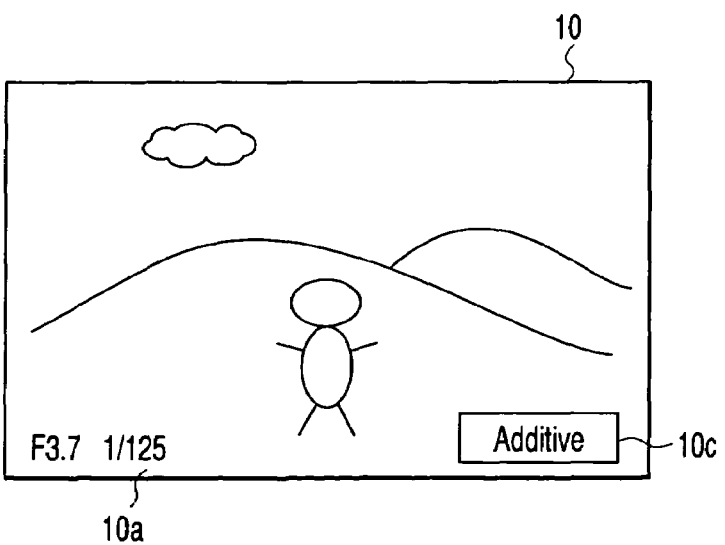

Here, in examples of FIGS. 16A to 16C, characters such as additive or non-additive have been displayed. However, in the case where a display is not made by symbols corresponding to the characters or ISO sensitivity is not wrapped, an ISO value may be displayed. In addition, display color of value of the aperture or the shutter speed may be changed.

Now, a description will be given with respect to an auto anti-vibration mode (AUTO-UV mode in FIG. 15B). This AUTO-UV mode is provided as a mode for, in the case where the camera senses a magnitude of the camera shake, and a degree of deterioration due to camera shake is greater than deterioration of image fineness due to the additive reading mode, automatically changing a pixel output reading mode to the additive reading mode. In this manner, a shutter speed is increased, thereby making it possible to restrict an effect of camera shake. The AUTO-UV mode is selected by adjusting the photographing mode dial 7 to SCENE and setting the AUTO-UV mode from among some modes that can be selected from among the scene modes, by the arrow key 9.

Figure 17:
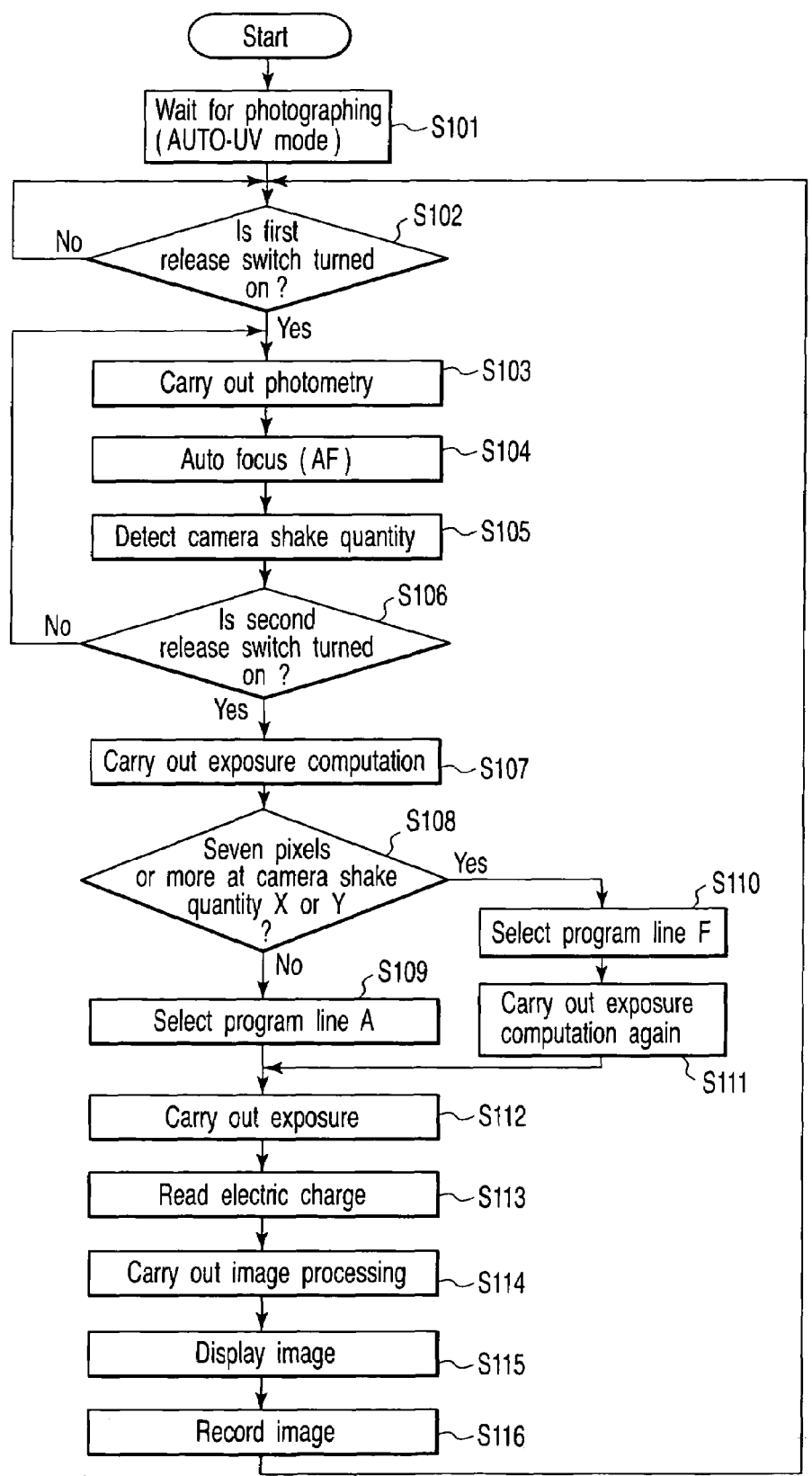
FIG. 17 is a flowchart showing a flow of a processing operation in an AUTO-UV mode in accordance with the first embodiment.

FIG. 17 is a flowchart showing a flow of processing operation in the AUTO-UV mode in the first embodiment. In FIG. 17, the AUTO-UV mode is set, and an imaging wait state is established until a first release operation has been made by a user (step S101). In this imaging wait state, the sequence controller 113 judges whether or not the first release operation has been made by the user (step S102). This judgment is made until the first release operation has been made by the user. In step S102, in the case where the first release operation has been made by the user, the sequence controller 113 carries out an photometry processing operation (step S103) and an AF processing operation (step S104). At the same time, the sequence controller 113 repeatedly monitors an output from the basic locus computing circuit 112 and carries out reading of camera shake quantity in real time (step S105).

Next, the sequence controller 113 judges whether or not the second release operation has been made by a user (step S106). If the second release operation has not been made in judgment of step S106, the current processing reverts to step S103. Then, operations in steps S104 to S106 are repeated until the second release operation is made. On the other hand, in the case where the second release operation has been made in judgment of step S106, the sequence controller 113 carries out exposure computation for computing the shutter speed or the aperture value at the time of exposure based on the photometry result of step S103 (step S107). The exposure control program is provided as TYPE-A.

Then, the sequence controller 113 estimates a motion quantity of an image on the image pickup device 114 predicted at the time of imaging based on camera shake situation obtained from an output of the basic locus computing circuit 112 immediately before the second release operation is made; and a shutter speed obtained in step S107.

Figure 18A:
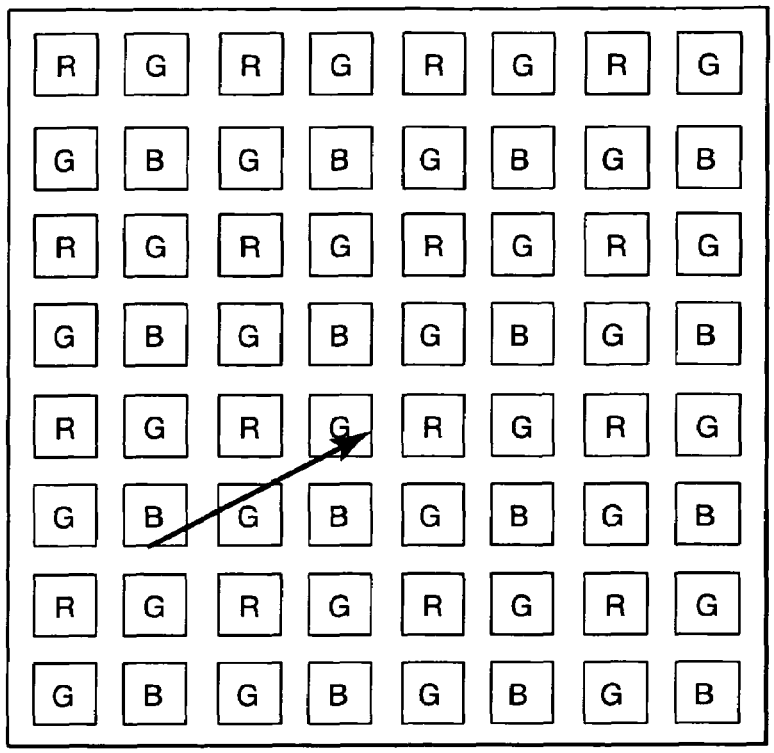
FIGS. 18A and 18B are views each showing an outline of an image shift.

For example, in the case where a motion quantity of the image is in the order of 12 pixels on the image pickup device 114 during a period of $\frac{1}{30}$ seconds immediately before the second release operation, it is possible to predict that a motion quantity of the image at the time of actual exposure will be in the order of three pixels when the shutter speed at the time of exposure is $\frac{1}{125}$ second. A motion of the image is shown in FIG. 18A. Here, image shake in the order of three pixels is smaller than a range of nine pixel additive reading (inside of region 200 shown in FIG. 5). Therefore, when additive reading is carried out, deterioration of image fineness due to additive reading has greater effect than image deterioration due to camera shake, and thus, a better photograph can be produced when no additive reading is carried out. Therefore, in such a case, exposure is carried out in the non-additive reading. That is, TYPE-A is selected as the exposure control program.

Figure 18B:
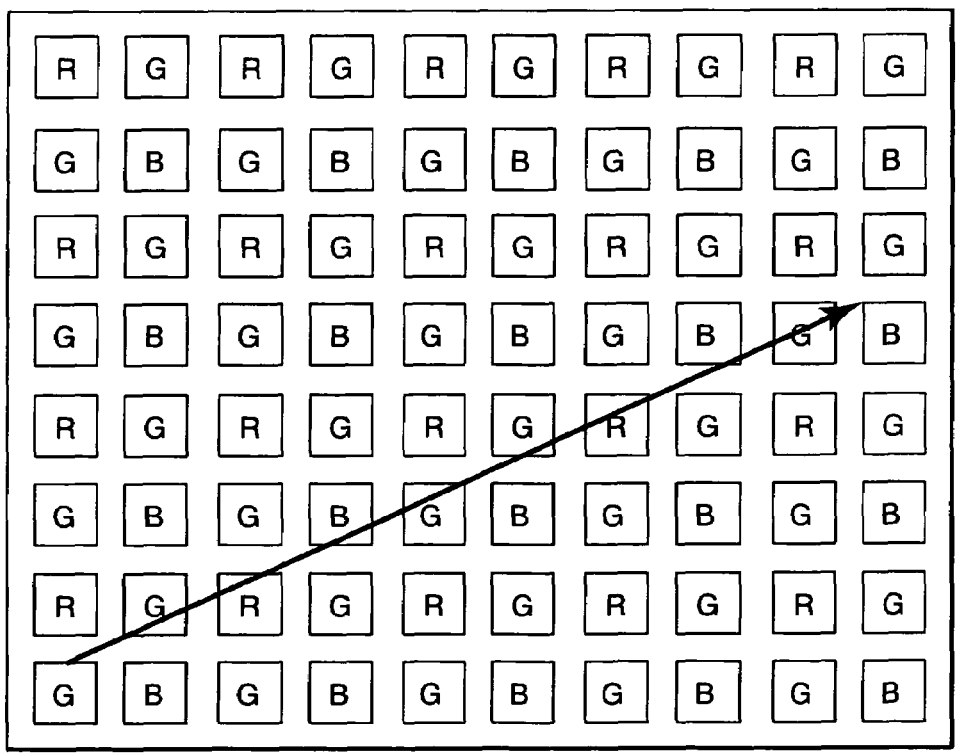

In contrast, for example, in the case where a motion quantity of the image is in the order of 40 pixels on the image pickup device 114 for a period of $\frac{1}{30}$ second immediately before the second release operation, it is possible to predict that a motion quantity of the image at the time of actual exposure will be in the order of 10 pixels when the shutter speed at the time of exposure is $\frac{1}{125}$ second. A motion of this image is shown in FIG. 18B. When about 10 pixels are obtained, imaging sensitivity is improved by carrying out additive reading of pixel output, whereby a good photograph can be obtained as a result when image shake is reduced. Therefore, in such a case, a reading mode is changed to the additive reading mode before exposure. That is, TYPE-F is selected as the exposure control program. In this manner, the shutter can be operated in the order of $\frac{1}{500}$ second, and an image shake quantity in exposure period is in order of 2.5 pixels. Here, although the pixels added by additive reading is in the order of 5×5 pixels (in range in which same color pixels for 9 pixels exist), image deterioration is reduced more remarkably by additive reading.

In order to make such a judgment, with respect to the shutter speed in the case of imaging by the exposure control program of TYPE-A, the sequence controller 113 judges whether or not the motion quantity of the image that can be predicted due to camera shake immediately before the second release operation is a predetermined quantity, for example, is equal to or smaller than seven pixels (step S108). This value of seven pixels is obtained as that which can be properly changed. In the case where the image motion quantity is less than 7 pixels in judgment of step S108, step S108 branches to step S109, wherein the sequence controller 113 selects TYPE-A as the exposure control program (step S109). On the other hand, In the case where the image motion quantity is 7 pixels or more in judgment of step S108, the sequence controller 113 selects TYPE-F as the exposure control program (step S110). In this case, the sequence controller 113 carries out re-exposure control in order to obtain an optimal exposure condition in the exposure control program of TYPE-F (step S111).

After the exposure condition has been determined in either TYPE-A or TYPE-F, the sequence controller 113 carries out exposure in the determined exposure condition (step S112). That is, aperture control or shutter control and the like are executed based on the exposure condition determined in step S107 or the exposure condition determined in step S111. Then, the sequence controller 113 reads an electric charge accumulated on the image pickup device 114 in the non-additive reading mode in the case where the exposure control program of TYPE-A is selected in step S109. In the case where the exposure control program of TYPE-F is selected in step S110, an instruction is supplied to the image pickup device reading driver 116 so as to carry out reading in the additive reading mode (step S113). Then, image processing is carried out by means of the image processing circuit 118a and the image processing circuit 118b (step S114). Then, this processed image is displayed on the rear LCD panel 10 or the like (step S115), the processed image is compressed, and the compressed image is recorded in the recording medium 121 (step S116). Then, the current processing reverts to step S102.

Figure 19A:
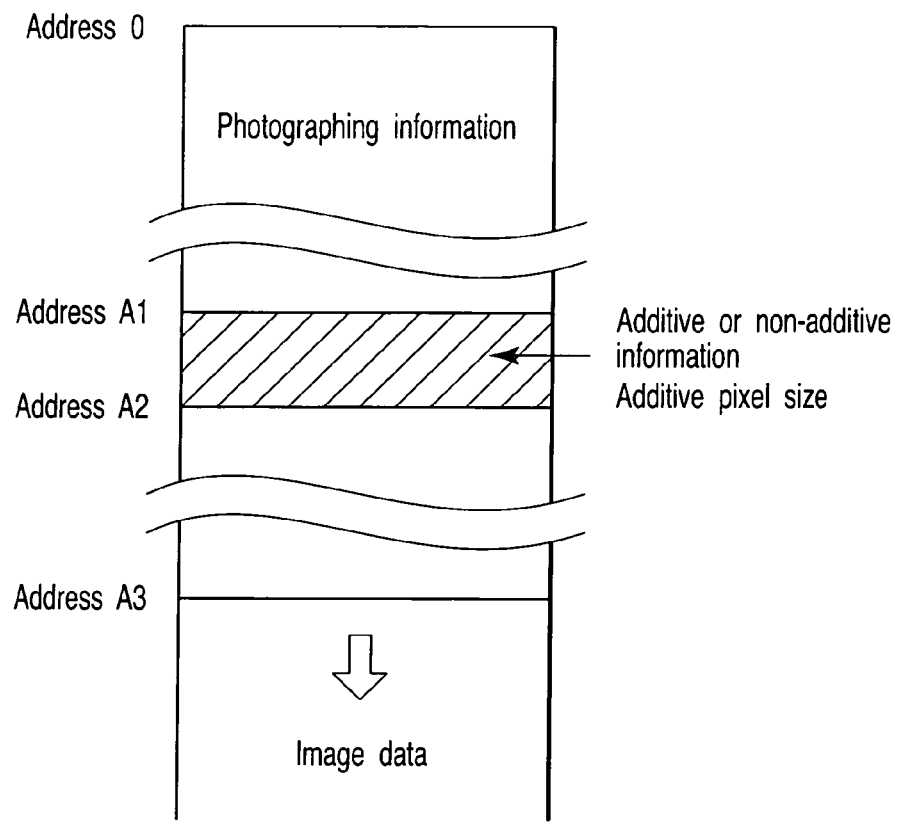
FIG. 19A is a view showing a header section for recording additive reading information.
Figure 19B:
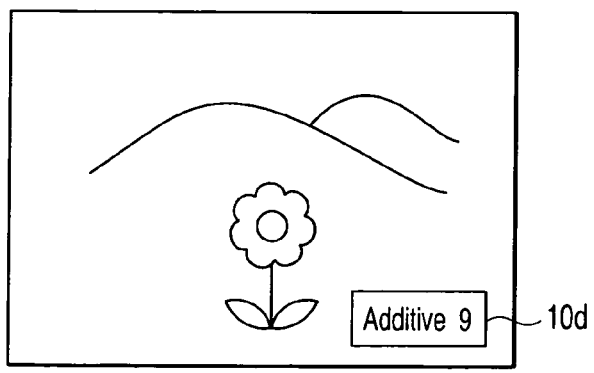
FIG. 19B is a view showing an appearance at the time of reproduction of an image when additive reading has been carried out.
Figure 19C:
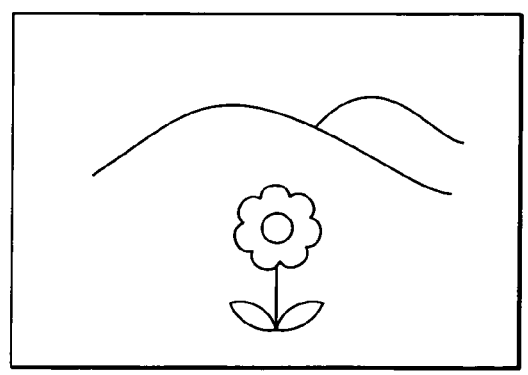
FIG. 19C is a view showing an appearance at the time of reproduction of an image when additive reading has not been carried out.

Now, image recording in step S115 will be described here. In the camera according to the first embodiment, in the case of recording an image, information associated with additive reading indicating whether or not an image is additively read in the image pickup device 114 and, in the case where additive reading has been made, how many additive pixels are produced is also written into the recording medium 121 together with an image. This information is recorded in a header section added to image data, as shown in FIG. 19A, for example. Then, based on this information, information associated with additive reading at the time of reproduction is also displayed. For example, as shown in the above-described example, in the case where exposure has been carried out by additive reading of nine pixels, a display 10d of "additive 9" as shown in FIG. 19B is made at the time of image reproduction. On the other hand, in the case where exposure has not been carried out by additive reading, no display is made as shown in FIG. 19C. By making such a display, when a user checks an image, it is possible to check in what reading mode the reading of pixel output of the image pickup device 114 has been carried out.

As has been described above, in the auto anti-vibration mode (AUTO-UV mode) according to the first embodiment, in the case where it is estimated that camera shake is small and an effect of camera shake during exposure is equal to or smaller than a predetermined level even if no additive reading is carried out, exposure corresponding to the non-additive reading mode is carried out. In addition, in the case where it is estimated that an effect of camera shake during exposure is equal to or greater than a predetermined level if no additive reading is carried out, exposure corresponding to the additive reading mode is carried out. In this manner, only in the case where an image quality is significantly deteriorated by camera shake, the reading mode is automatically changed to the additive reading mode. Thus, a photograph extremely deteriorated due to camera shake can be prevented from being picked up while a maximum of image fineness is maintained.

In addition, it is judged whether or not the reading mode is changed to the additive reading mode in accordance with a situation of camera shake immediately before the second release operation. Thus, change of a reading mode can be made based on information close to the situation of camera shake at the time of actual exposure.

Second Embodiment

Figure 20:
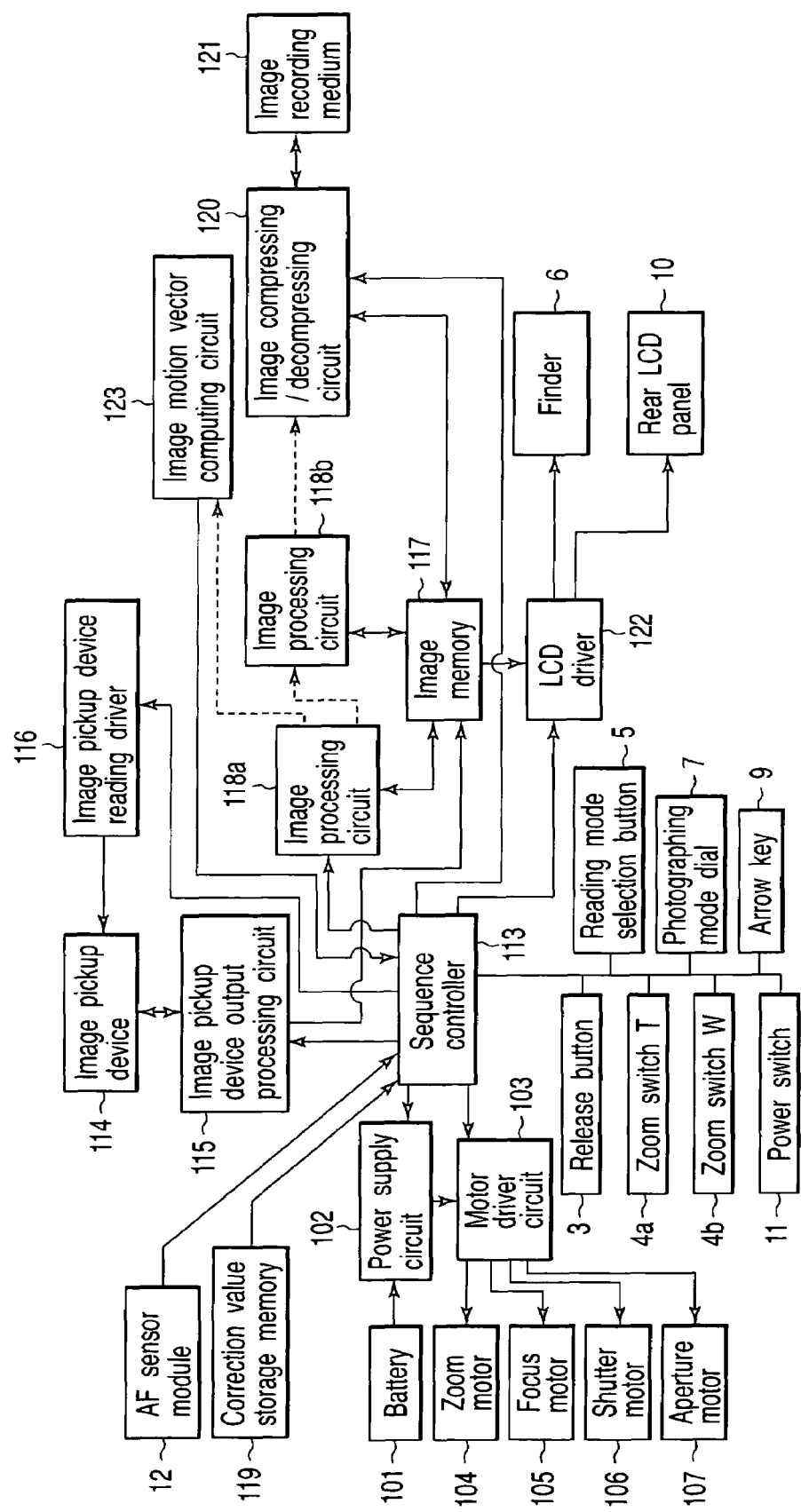
FIG. 20 is a block diagram depicting a detailed internal configuration of a camera in accordance with a second embodiment.

Now, a second embodiment of the present invention will be described here. FIG. 20 is a block diagram depicting a detailed internal construction of a camera in the second embodiment. The camera according to the second embodiment shown in FIG. 20 is similar to that according to the first embodiment in its construction, and is different therefrom in that detection of camera shake quantity in the AUTO-UV mode is carried out based on an output of an image motion vector computing circuit 123 as an image shake detecting circuit instead of based on an output of the basic locus computing circuit 112 based on the angle velocity sensor X108 and the angle velocity sensor Y109. Therefore, in FIG. 20, the angle sped sensor X108, the angle velocity sensor Y109, an analog processing circuit 110, and the analog-to-digital converter 111, and the basic locus computing circuit 112 are omitted.

FIG. 21 is a conceptual view for illustrating an operation of the image motion vector computing circuit 123. For example, before the second release operation, an output of the image pickup device 114 is repeatedly read at a period of $\frac{1}{30}$ second, and an image based on the thus read output is displayed on the finder 6 and the rear LCD panel 10. This is called a live view image display or a live view display and the like, and is required for determining a construction at the time of imaging.

Here, for example, an image of an object that exists at a position of reference numeral 301 shown in FIG. 21A at a time T is assumed to have moved to a position shown in reference numeral 302 due to camera shake at the time point of next reading (after elapse of T+1/30 second). The image motion vector computing circuit 123 computes a motion of a similar pattern (object image) in an image for two frames acquired during this 1/30 second, thereby calculating a motion vector between frames as shown in FIG. 21B. In the second embodiment, the motion vector computed in the image motion vector computing circuit 123 is assumed to be similar to camera shake detected based on an output of the basic locus computing circuit 112 described in the first embodiment. Then, a processing operation in the AUTO-UV mode described in FIG. 17 is carried out. Namely, the second embodiment is different from the first embodiment only in that processing for camera shake quantity detection in step S105 is carried out by the image motion vector computing circuit 123.

As has been described above, in the second embodiment, an image shake quantity is detected in the image motion vector computing circuit, and thus, there is no need for an angle velocity sensor or an output processing circuit of the angle velocity sensor. Therefore, it is effective for downsizing or cost reduction.

Third Embodiment

Now, a third embodiment of the present invention will be described here. The third embodiment is provided as a combination of the first embodiment and the second embodiment. In the AUTO-UV mode, image shake (object shake) due to a motion of an object as well as image shake due to camera shake is also sensed, and image shake is reduced. More specifically, in the third embodiment, dynamic shake sensing for detecting camera shake and shake sensing due to computation of motion vector calculation for sensing an image shake are used in combination, thereby sensing image deterioration. Then, whether or not to carry out additive reading of pixel output is changed so as to reduce the detected camera shake.

Figure 22:
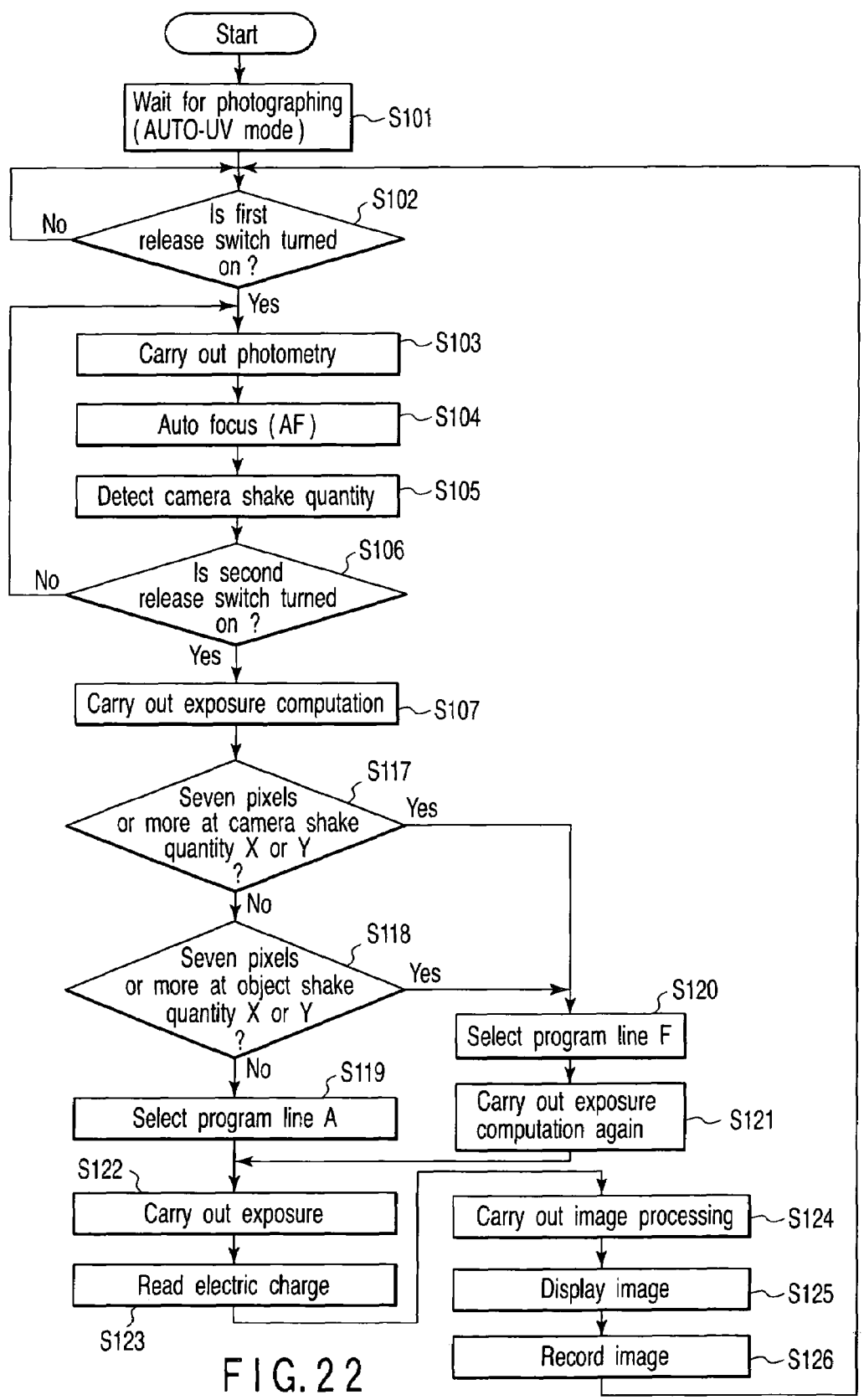
FIG. 22 is a flowchart showing a flow of a processing operation in an AUTO-UV mode in accordance with a third embodiment.

FIG. 22 is a flowchart showing a flow of processing operation in the AUTO-UV mode in the third embodiment. A duplication description is omitted with respect to processing operation similar to that shown in FIG. 17. In FIG. 22, processing operations in step S101 to step S107 are similar to those shown in FIG. 17. However, camera shake quantity detection in step S105 is carried out based on an output of the basic locus computing circuit 112.

After completion of exposure computation, the sequence controller 113 judges whether or not a motion quantity of an image predicted due to camera shake immediately before the second release operation is equal to or greater than seven pixels during the shutter speed in the case where imaging is carried out in the exposure control program of TYPE-A, based on an output of the basic locus computing circuit 112 based on an output of the angle velocity sensor X108 and the angle velocity sensor Y109 (step S117). In the case where a motion quantity of the image due to camera shake is less than seven pixels in judgment of step S117, the sequence controller 113 judges whether or not the image shake quantity computed by the image motion vector computing circuit 123 is seven pixels or more (step S118). Here, although the image shake quantity is judged in step S118, the image shake quantity in step S118 depends on object shake because camera shake is judged to be small in step S117.

In the case where the motion quantity of the image is less than seven pixels in judgment of step S118, the sequence controller 113 selects TYPE-A as the exposure control program (step S119). On the other hand, in either step S117 or step S118, in the case where a motion quantity of the image is equal to or greater than seven pixels, the sequence controller 113 selects TYPE-F as the exposure control program (step 120). In this case, the sequence controller 113 carries out re-exposure computation in order to obtain an optimal exposure condition in the exposure control program of TYPE-F (step S121).

The processing operations of the subsequent step S122 to step S126 are similar to those in step S112 to step S116. Thus, a duplicate operation is omitted.

As described above, according to the third embodiment, a probability of an occurrence of a faulty photograph can be reduced more significantly because both of camera shake and object shake can be prevented. In addition, camera shake is sensed by the angle velocity sensor, and thus, camera shake can be correctly detected even in the case where it is difficult to detect camera shake due to sensing of image shake or in the case where an error is likely to occur such as a low contrast object, a regular pattern object, or a dark object.

In addition, with a technique according to the third embodiment, even with a camera for correcting camera shake in an optical or mechanical manner, a faulty photograph can be prevented by sensing object shake which cannot be prevented, and then, increasing the shutter speed by additional reading of pixel output. Namely, the present embodiment is useful in a camera comprising camera shake correcting mechanism.

Fourth Embodiment

Now, a fourth embodiment will be described here. This fourth embodiment is provided as a modified example of the third embodiment. Namely, the fourth embodiment is different from the third embodiment in that shake quantity of the image in a screen including camera shake and object shake is calculated by the image motion vector computing circuit 123, and the exposure control program is selected based on its maximum value of the shake quantity. A construction of a camera according to the fourth embodiment is similar to that of FIG. 20 shown in the second embodiment.

Figure 23:
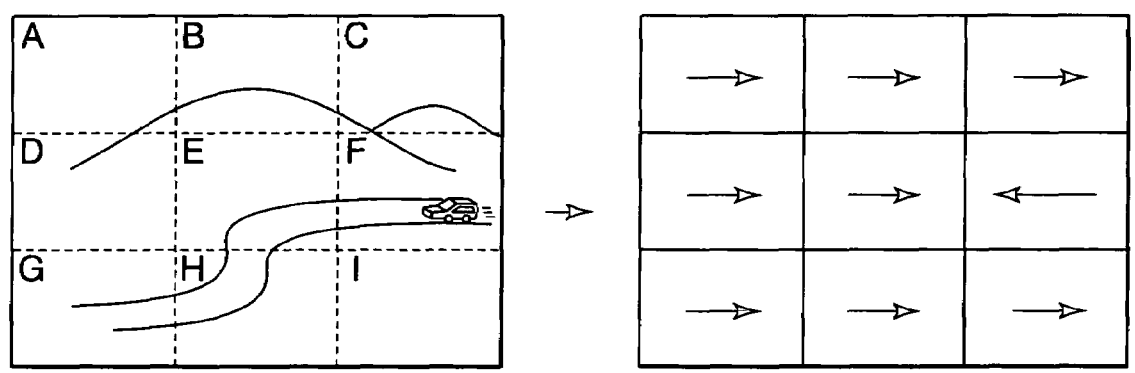
FIG. 23 is a conceptual view for explaining an operation of an image shift vector computing circuit in a camera according to a fourth embodiment.

FIG. 23 is a conceptual view for explaining an operation of the image motion vector computing circuit 123 in the camera according to the fourth embodiment. The image motion vector computing circuit 123 in the fourth embodiment divides an inside of a screen into nine areas from A to I, and calculates a motion of an image in each area by comparison with the previous frame at every time, and the live view image is captured.

Here, in an example shown in FIG. 23, a whole screen is moved in a right direction due to camera shake. In addition, this example is provided as an example in which an automobile moving in a left direction exists in an area F in the screen. At this time, a motion quantity of a whole screen due to camera shake is assumed to be a quantity of a motion for three pixels in exposure due to the program of TYPE-A. In addition, a motion quantity of the automobile is assumed to be a quantity for 10 pixels during exposure due to the program of TYPE-A. A motion quantity of an automobile is calculated by means of pattern shift computation between an immediately preceding live view image and a newly captured live view image.

In the fourth embodiment, a pixel output reading mode is changed based on a maximum value of a motion quantity obtained for each area. For example, in the example shown in FIG. 23, assuming that image shake in all areas is small but object shake is great, additive reading of pixel output is carried out.

Figure 24:
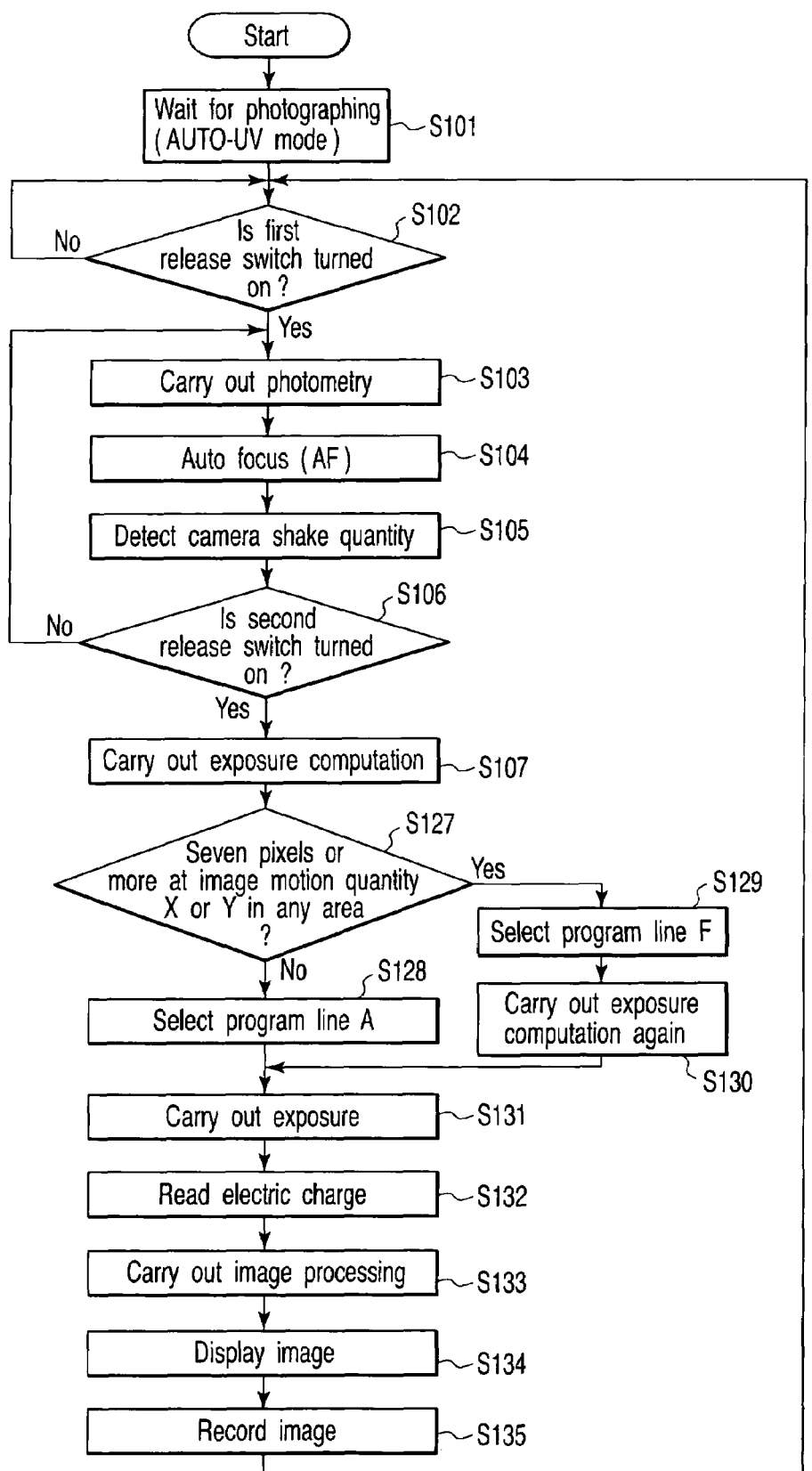
FIG. 24 is a flowchart showing a flow of a processing operation in an AUTO-UV mode in accordance with the fourth embodiment.

FIG. 24 is a flowchart showing a flow of processing operation in an AUTO-UV mode in the fourth embodiment. A duplicate description is omitted with respect to processing operation similar to that shown in FIG. 17. In FIG. 24, the processing operations from step S101 to step S107 are similar to those shown in FIG. 17. However, shake quantity detection of step S105 is carried out for each area in a screen in the image motion vector computing circuit 123.

After completion of exposure computation, the sequence controller 113 judges whether or not any of the motion quantities detected for each area is equal to or greater than seven pixels (step S127). In the case where the motion quantities of images in all areas are less than seven pixels in judgment of step S127, the sequence controller 113 selects TYPE-A as the exposure control program (step S128). On the other hand, in the case where the motion quantity of the image in any one area is equal to or greater than seven pixels in judgment of step S127, the sequence controller 113 selects TYPE-F as the exposure control program (step S129). In this case, the sequence controller 113 carries out re-exposure control in order to obtain an optimal exposure condition in the exposure control program of TYPE-F (step S130).

The processing operations of the subsequent step S131 to step S135 are similar to those in step S112 to step S116 shown in FIG. 17. Thus, a duplicate description is omitted here.

As described above, in the forth embodiment, the screen is divided into a plurality of areas, and an image motion quantity is detected for each area, so that camera shake that moves an image as a whole can be detected. Further, object shake that can be partially generated in a screen with a high possibility can be detected. In this manner, deterioration of an image generated due to a motion of an image during exposure can be reliably prevented.

Here, in the above-described first to fourth embodiments, the number of additive pixels may not be nine pixels in the case of carrying out additive reading of pixel output in the image pickup device, and may be another number of pixels such as four pixels or 16 pixels. However, in this case, in order to obtain uniform vertical and horizontal image resolutions, it is preferable to obtain the pixel size obtained by square of an integer. In addition, the image pickup device may be a CMOS sensor or another sensor other than that of a CCD scheme. Further, set program lines of TYPE-A to TYPE-F described above may be slightly different from those described in FIGS. 9 to 14.

Fifth Embodiment

Figure 25A:
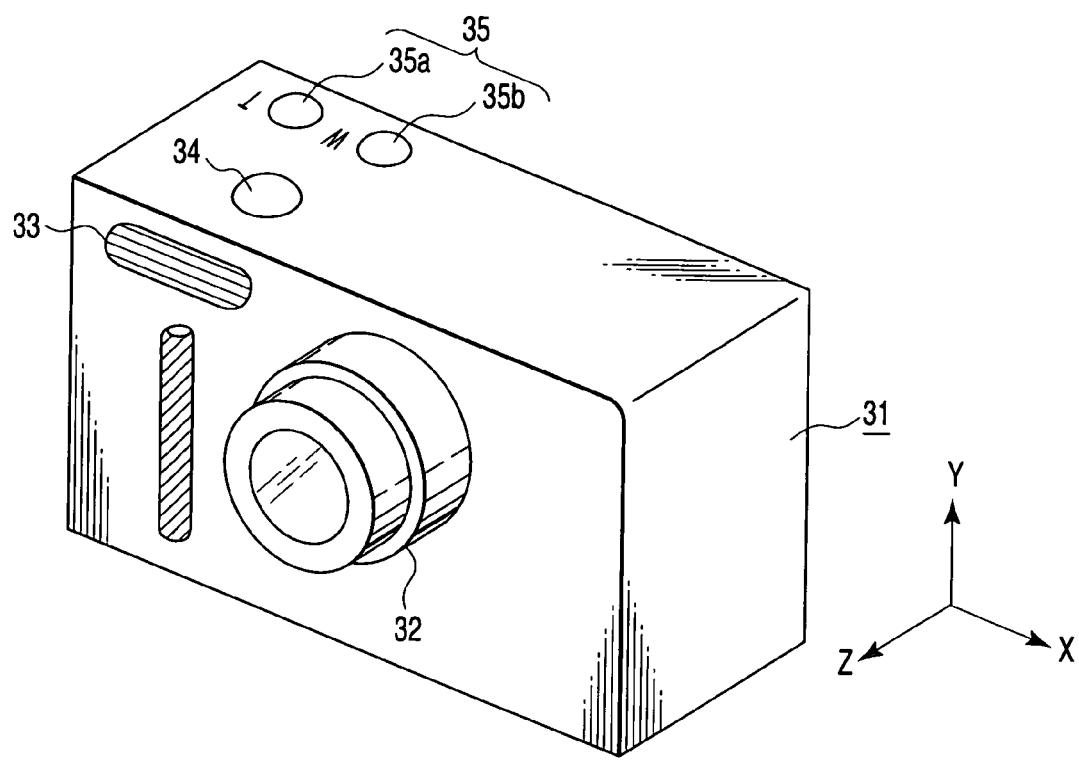
FIGS. 25A and 25B are perspective external views each showing an electronic camera according to a fifth embodiment.
Figure 25B:
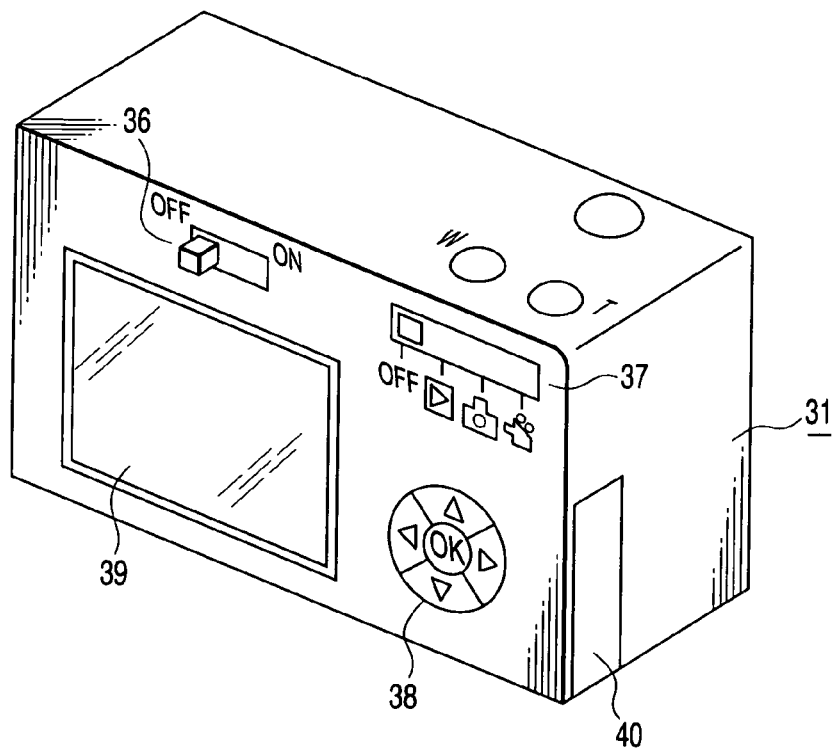

FIGS. 25A and 25B are external perspective views each showing a camera according to a fifth embodiment. Here, FIG. 25A is a front perspective view showing the camera, and FIG. 25B is a rear perspective view showing the camera.

As shown in FIG. 25A, an image pickup lens 32 and a flash light emitting section 33 are provided on a front face of a camera body 31 that is a main body of the camera. An image pickup lens 32 is provided as an optical system for forming an object image on an image pickup device in the camera. In addition, the flash light emitting section 33 emits light in the case where an object has low luminance or in the case of back light or the like, and illuminates an object.

In addition, a release button 34 and a zoom switch 35 are provided on a top face of the camera body 31. The release button 34 is provided as an operating member composed of two-step type switches such as a first release switch turned on by semi-pushing it and a second release switch turned on by fully pushing it. The first release switch is turned on by a photographer, whereby an exposure preparation operation such as automatic focus control (AF) and automatic exposure control (AE) is started. In addition, the second release switch is turned on by a photographer, whereby an exposure operation is started, and image recording is carried out. The zoom switch 35 is provided as an operating member composed of a T (Tele) switch 35a and a W (Wide) switch 35b, for starting a multiplying operation of the image pickup lens 32. Namely, when the T switch 35a is pressed by a photographer, a telephoto multiplying operation is made. When the W switch 35b is pressed, a wideangle multiplying operation is carried out.

In addition, as shown in FIG. 25B, camera shake proof mode setting switch 36, an operating mode change switch 37, an arrow key 38, and an LCD monitor 39 are provided on a rear face of the camera body 31. In addition, as shown in FIG. 25B, a cover 40 for a recording medium (memory card) is inserted in a side face of the camera body 31.

The camera shake proof mode setting switch 36 is provided as an operating member for changing ON/OFF of camera shake proof mode in the camera. By a photographer, this camera shake proof mode setting switch 36 is operated to slide, whereby on/off switching of camera shake proof mode is carried out. This operating mode change switch 37 is provided as an operating member for setting an operating mode of the camera. This operating mode change switch 37 is operated to slide, whereby an operating mode of the camera is sequentially switched to a power OFF mode, an image reproduction mode, a still photographing mode, and then, to a motion photographing mode. The arrow key 38 is provided as an operating member for providing a variety of settings on a menu screen or the like displayed on the LCD monitor 39. This arrow key 38 is configured so that four buttons are allocated at the periphery of a center determination button. By means of this arrow key 38, for example, on/off setting of macroscopic imaging, a self timer, and a flash is selected, making it possible to provide settings of other various detailed specifications. The LCD monitor 39 is provided as a display section for displaying a variety of images such as an image picked by a photographer, a live view image, and a menu screen.

FIG. 26 is a block diagram depicting a detailed internal construction of a camera according to the fifth embodiment. In FIG. 26, constituent elements described in FIGS. 25A and 25B are designated by the same reference numerals shown in FIG. 26.

In FIG. 26, the image pickup lens 32 is composed of a front lens 32a, a zoom lens 32b, an aperture 32c, and a focus lens 32d. The front lens 32a is provided as a fixed lens group for causing a luminous flux from an object (not shown), to a rear lens group. The zoom lens 32b is provided as a lens group that changes a focus distance of the image pickup lens 32. The aperture 32c limits an incidence quantity of a luminous flux from the object. The focus lens 32d is provided as a lens group for adjusting a focus state of the image pickup lens 32.

A zoom drive system 403 is provided as a drive mechanism for multiplying the zoom lens 32b. A zoom motor 404 is provided as a motor for driving the zoom drive system 403. In addition, an aperture drive system 405 is provided as a drive mechanism for opening or closing the aperture 32c. An aperture motor 406 is provided as a motor for driving the aperture drive system 405. In addition, a focus drive system 407 is provided as a drive mechanism for focusing the focus lens 32d. A focus motor 408 is provided as a motor for driving the focus drive system 407. A motor driver 409 controls the zoom motor 404, the aperture motor 406, and the focus motor 408.

An image pickup device 410 is provided as an image pickup device of CCD system, for example. The image pickup device 410 is composed of a plurality of pixels and a CCD transfer passage or the like for transferring electric charges obtained by these pixels. This image pickup device 410 optically receives an object image formed by the image pickup lens 32 by each pixel, and generates an electric charge according to its optical receiving quantity. An image pickup device drive circuit 411 makes controlling the image pickup device 410 and timing control when reading the electric charges generated in the image pickup device 410. An image pickup device output processing circuit 412 applies predetermined analog processing to an electrical signal based on an electric charge read from the image pickup device 410, converts the signal after analog processed to a digital signal (digital image data), and then outputs the converted digital signal to an image processing circuit 413. Here, the image pickup device drive circuit 411 and the image pickup device output processing circuit 412 will be described later in detail.

The image processing circuit 413 carries out a variety of image processing operations such as a white balance (WB) correction processing operation, a YC separation processing operation, and a γ-correction processing operation with respect to the image data input from the image pickup device output processing circuit 412. Here, the WB correction processing operation is a processing operation for correcting a color balance of image data by correcting R, G, and B gains of the image data so that a white color in the image data input from an image pickup device output processing circuit 412 is defined as a predetermined reference white color. In addition, the YC separation processing operation is a processing operation for separating image data composed of three components of R signals, G signals, and B signals into luminance signals Y and color signals C. In addition, the γ-correction processing operation is a processing operation for correcting γ-characteristics of the image data to a characteristic suitable to print or display.

A compressing/decompressing circuit 414 compresses the image data processed by the image processing circuit 413 in a predetermined compression scheme such as JPEG scheme or decompresses the compressed image data. A monitor interface 415 converts the image data decompressed by the compressing/decomposing circuit 414 to a signal suitable to display, and makes an image display on the LCD monitor 39. In addition, the monitor interface 415 makes a so called live view image for displaying on the LCD monitor 39 the image data obtained in time series in the image pickup device 410, the image data in time series processed by the image processing circuit 413.

In addition, an image recording circuit 416 reads the compressed image data from the compressing/decompressing circuit 414, and records the read the image data in a recording medium 417. This circuit also reads the image data recorded in the recording medium 417, and outputs the read image data to the compressing/decompressing circuit 414. The recording medium 417 is provided as a nonvolatile recording medium for recording the image data, and a memory card or the like configured to be removable from the camera is used.

A sequence controller 418 integrally controls operations of the camera such as operation control the motor driver 409 while in imaging, operation control of the image pickup device drive circuit 411, and operation control of the image pickup device output processing circuit 412. To this sequence controller 418, there are connected: operating members such as the above-described release button 34, the zoom switches T35*a* and W35*b*, the camera shake proof mode setting switch 36, the operating mode change switch 37, and the arrow key 38. The sequence controller 418 makes a variety of controls of the camera such as imaging control according to an operating state of these operating members.

An angle velocity sensor X419 detects camera shake in an X direction (refer to FIG. 25A) of the camera. In addition, an angle velocity sensor Y420 detects camera shake in a Y direction of the camera. These angle velocity sensors each are connected to an angle velocity sensor analog processing circuit 421.

The angle velocity sensor analog processing circuit 421 carries out an analog processing operation of canceling an offset in an output of each one of the angle velocity sensor X419 and the angle velocity sensor Y420, and amplifying the output of each one of the sensors. Then, this circuit digitizes these outputs, and forwards the outputs to the sequence controller 418. With such a construction, camera shake detecting section is formed.

The sequence controller 418 integrates an input from the angle velocity sensor analog processing circuit 421 by a time, and calculates a displacement angle for each time. Then, based on the computed displacement angle and focus distance information on the image pickup lens 32, the sequence controller 418 computes locus in the X direction and locus in the Y direction (shake locus) of the image acquired in the image pickup device 410, and carries out a process for reducing camera shake based on the thus computed shake locus.

Here, the sensor for camera shake detection is not limited to the angle velocity sensor. For example, when a computing process is changed, camera shake detection can be carried out by means of an angle acceleration sensor or one pair of two acceleration sensors.

A description will be given with respect to reading of electric charges from the image pickup device 410 controlled by the image pickup device driver circuit 411. In the fifth embodiment, it becomes possible to read electric charges from the image pickup device 410 by selecting any one of three reading modes such as: an individual pixel reading mode for reading outputs of pixels of the image pickup device 410 on one by one pixel basis; $N^2$ pixel additive reading mode of reading outputs of pixels of the same color on an $N^2$ by $N^2$ pixel basis (N is an integer of 2 or more); an $M^2$ pixel additive reading mode for reading outputs of pixels of the same color on an $M^2$ by $M^2$ pixel basis (M is an integer of 2 or more and has a relationship of N>M) after adding the outputs in an analog manner. Thus, an $N^2$ electric charge adder circuit for adding pixel outputs of the same color on an $N^2$ by $N^2$ pixel basis and an $M^2$ electric charge adder circuit for adding pixel outputs of the same color on an $M^2$ by $M^2$ pixel basis are provided at the image pickup device 410.

Figure 27:
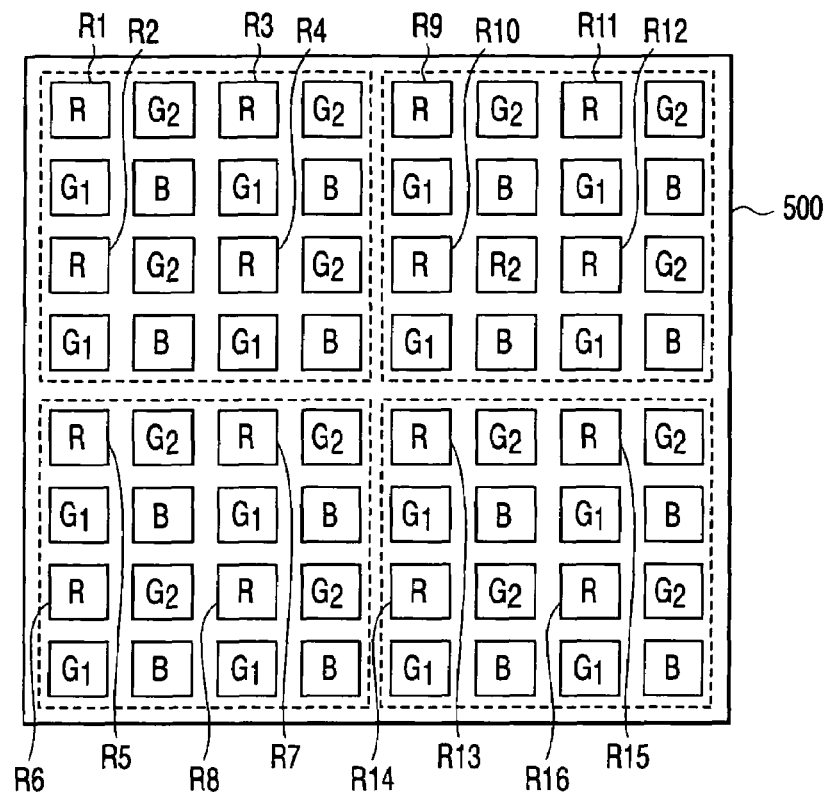
FIG. 27 is a view for explaining pixel reading modes, i.e., a 16-pixel additive reading mode and a 4-pixel additive reading mode.

These three reading modes will be further described with reference to FIG. 27. Here, FIG. 27 shows pixel arrangement of the image pickup device 410. FIG. 27 shows a case in which an image array of the image pickup device 410 is a Bayer array. Namely, a color filter corresponding to the array shown in FIG. 27 is provided on a front face of each pixel of the image pickup device 410. In the following description, assuming that the above N is 4 and M is 2, the $N^2$ pixel additive reading mode is called a 16 pixel additive reading mode, and the $M^2$ pixel additive reading mode is called a four pixel additive reading mode.

First, in the case of the individual pixel reading mode, the electric charges from pixels shown in FIG. 27 are read by a one by one pixel basis. For example, by way of example of R pixels, the electric charges generated from 16 pixels made of R1 to R16 are read respectively independently in a square area 500 shown in FIG. 27.

In addition, in the case of the 16 pixel additive reading mode, the electric charges generated from 16 pixels of the same color shown in FIG. 27 are added and read in an analog manner. For example, by way of example of the R pixels, all of the electric charges generated from 16 pixels made of R1 to R16 in the square area 500 shown in FIG. 27 are added, and then, read. This also applies to B pixels and G pixels. However, in the Bayer array, 32 G pixels exist in the square area 500, and thus, addition is carried out between odd numbered lines in the square area 500 ($G_2$ pixels in FIG. 27) and between even numbered lines ($G_1$ pixels in FIG. 27).

In addition, in the case of the four pixel additive reading mode, the electric charge generated from four pixels of the same color shown in FIG. 27 are added and read in an analog manner. For example, by way of example of R pixels, the electric charges generated from four pixels of R1 to R4, four pixels of R5 to R8, four pixels of R9 to R12, and four pixels of R13 to R16 in the square area 500 shown in FIG. 27 are added and read, respectively. This applies to B pixels and G pixels. However, with respect to the G pixels, as is the case with the 16 pixel additive reading mode, addition is carried out between odd numbered lines and between even numbered lines in the square area 500.

Figure 28:
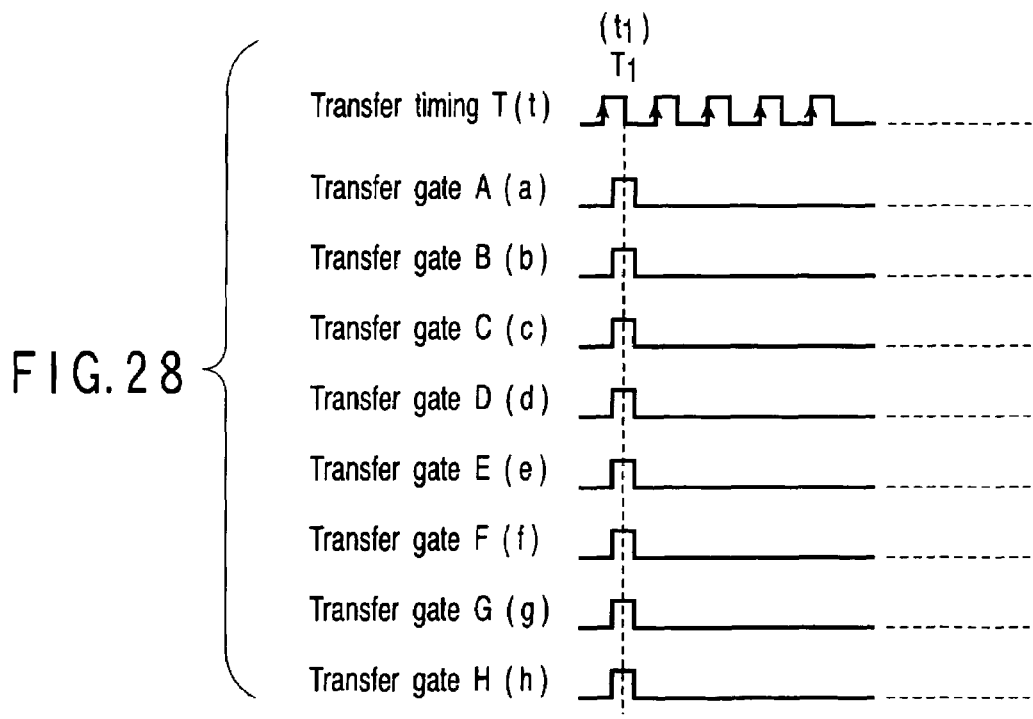
FIG. 28 is a timing chart showing a reading timing of a pixel output of an image pickup device in an individual pixel reading mode.
Figures 29A, 29B:
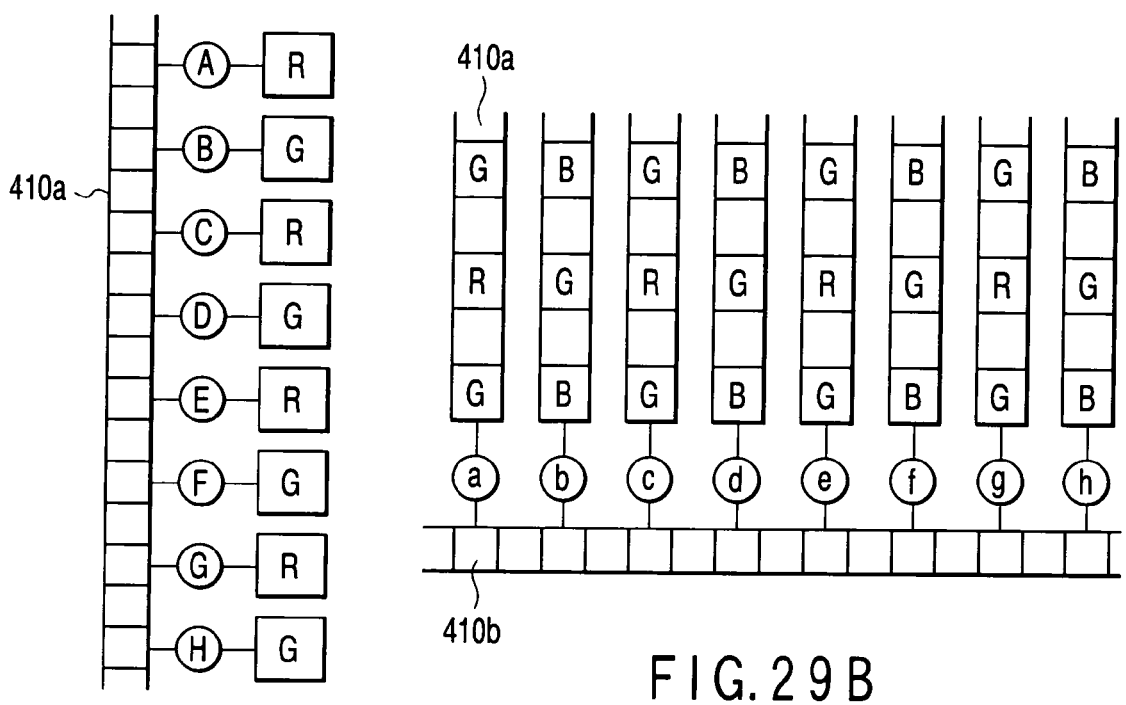
FIGS. 29A and 29B are views for explaining a configuration of an image pickup device for carrying out each pixel reading.

FIG. 28 is a timing chart showing a reading timing of pixel output of the image pickup device 410 in the individual pixel reading mode. In addition, FIGS. 29A and 29B are views for explaining a construction of the image pickup device 410 for making the individual pixel reading. Here, FIG. 29A is a view for explaining a construction of a vertical CCD; and FIG. 29B is a view for explaining a construction of the horizontal CCD. As shown in FIG. 29A, the pixels of the image pickup device 410 each are connected to a vertical CCD 410a via transfer gates A to H. In addition, as shown in FIG. 29B, each vertical CCD 410a is connected to a horizontal CCD 410b via transfer gates a to h.

As shown in FIG. 28, transfer gates of all the pixels are controlled to be switched at the same time during vertical transfer and during horizontal transfer, respectively, so that a reading timing of all the pixels are identical to each other in the case of the individual pixel reading mode. In this manner, the electric charges from the pixels of the image pickup device 410 each are vertically transferred and horizontally transferred respectively independently.

Figure 30:
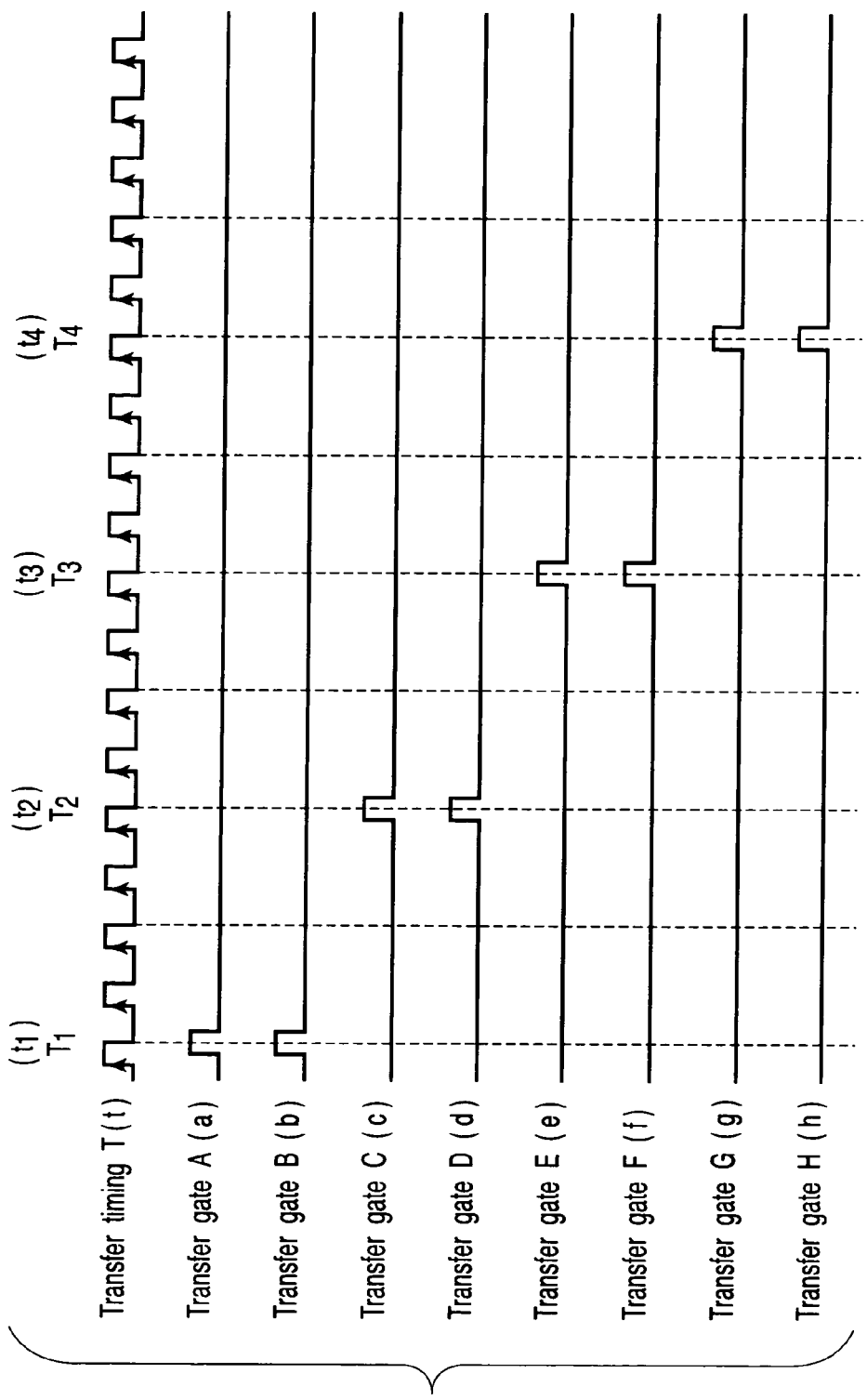
FIG. 30 is a timing chart showing a reading timing of a pixel output of an image pickup device in a 16-pixel additive reading mode.
Figure 31A:
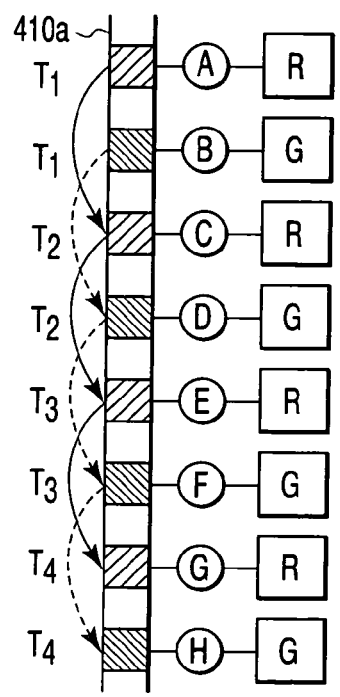
FIGS. 31A and 31B are views for explaining a configuration of an image pickup device for carrying out 16-pixel additive reading.
Figure 31B:
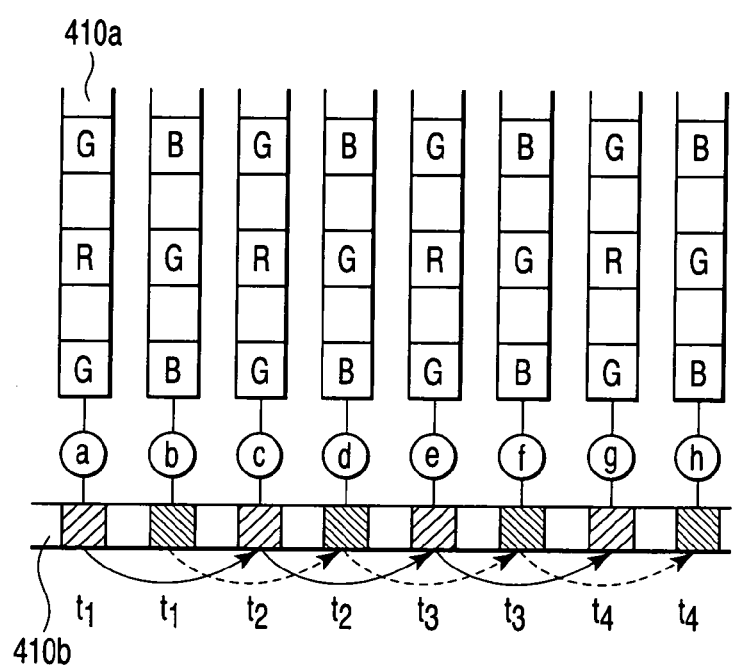

FIG. 30 is a timing chart showing a reading timing of the image pickup device 410 in the 16 pixel additive reading mode. In addition, FIGS. 31A and 31B are views for explaining a construction of the image pickup device 410 for making 16 pixel additive reading. Here, FIG. 31A is a view for explaining a construction of a vertical CCD, and FIG. 31B is a view for explaining a construction of a horizontal CCD.

First, control at the time of vertical transfer will be described here. As shown in FIG. 30, in the 16 pixel additive reading mode, only a transfer gate A and a transfer gate B are switched at a first reading timing of $T_1$, and electric charge reading is carried out. Then, at a timing $T_2$ at which the read electric charges is transferred at four times, only a transfer gate C and a transfer gate D are switched, and electric charge reading is carried out. In this manner, an electric charge of the R pixel read via the transfer gate A and an electric charge of the R pixel read via the transfer gate C are added to each other, and an electric charge of $G_1$ pixel (refer to FIG. 27) read via the transfer gate B and an electric charge of $G_1$ pixel read via the transfer gate D are added to each other. Next, only a transfer gate E and a transfer gate F are switched, and reading of the electric charge is carried out at a timing $T_3$ at which these added electric charges are transferred four times. In this manner, an electric charge of the R pixel read via the transfer gate E are added to the electric charge of the R pixel after two pixels have been added, and an electric charge of the $G_1$ pixel read via the transfer gate F is added to an electric charge of the $G_1$ pixel after two pixels have been added. Next, only a transfer gate G and a transfer gate H are switched, and reading of the electric charge is carried out at a timing $T_4$ at which these added electric charges are transferred four times. In this manner, for the R pixel and $G_1$ pixel, electric charges for four pixels are added respectively. For the B pixel and a $G_2$ pixel, electric charges for four pixels are added during vertical transfer by making control of a transfer gate, similarly.

On the other hand, in the case of horizontal transfer as well, switching of a transfer gate is carried out in the same manner as in the case of vertical transfer. In this manner, every time switching of the transfer gate is carried out, the electric charge added for four pixels are added at the time of vertical transfer, and thus, the electric charge added for 16 pixels are finally output.

Pixel output is thus added, and then, read, whereby an exposure time is reduced, and camera shake effect can be reduced. However, outputs for 16 pixels are added and read, and thus, image resolution is lowered as compared with the individual pixel reading mode.

Figure 32:
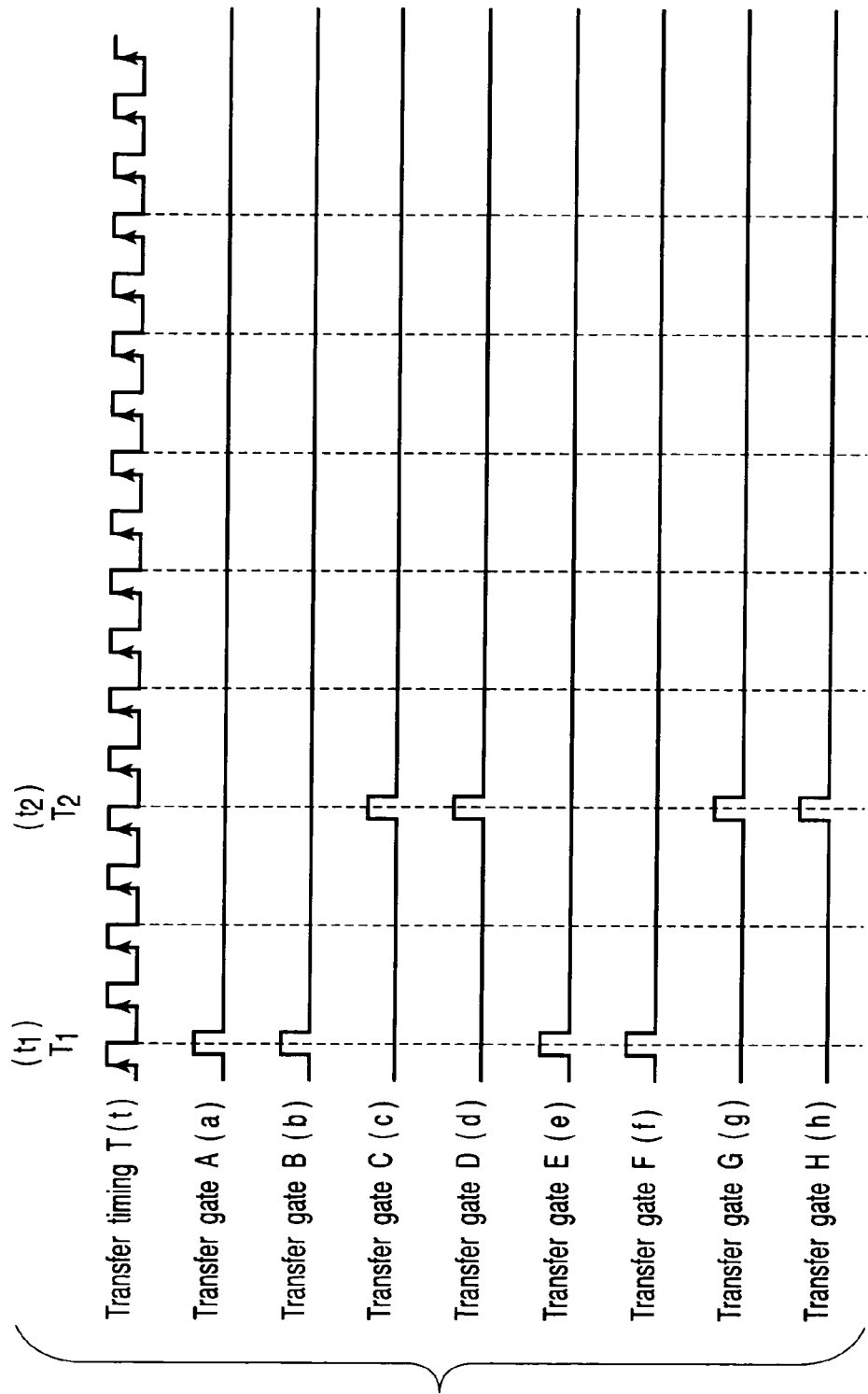
FIG. 32 is a timing chart showing a reading timing of a pixel output of an image pickup device in a 4-pixel additive reading mode.
Figure 33A:
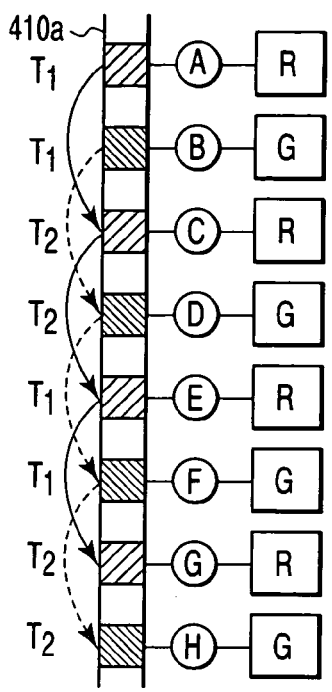
FIGS. 33A and 33B are views for explaining a configuration of an image pickup device for carrying out 4-pixel additive reading.
Figure 33B:
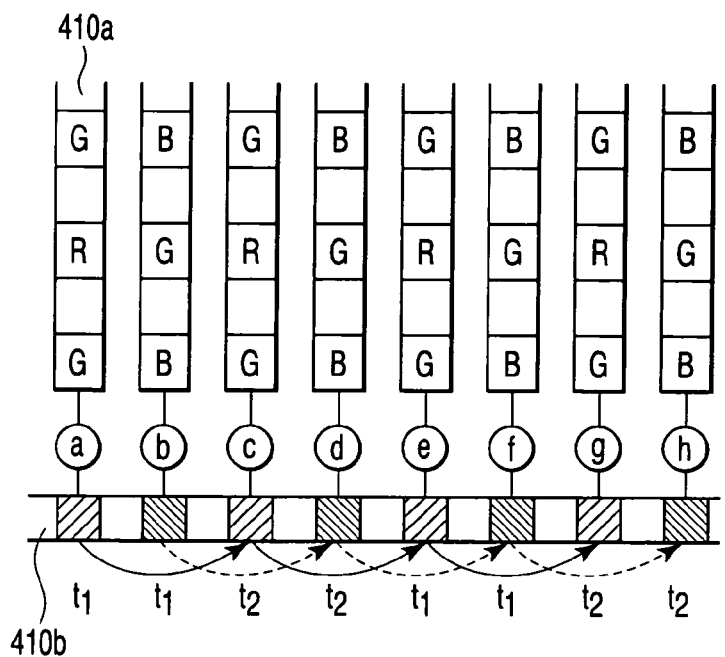

FIG. 32 is a timing chart showing a reading timing of the image pickup device 410 in the four pixel additive reading mode. In addition, FIGS. 33A and 33B are views for explaining a construction of the image pickup device 410 for carrying out the four pixel additive reading. Here, FIG. 33A is a view for explaining a construction of a vertical CCD, and FIG. 33B is a view for explaining a construction of a horizontal CCD.

First, vertical transfer will be described here. As shown in FIG. 32, at a first reading timing $T_1$, only a transfer gate A, a transfer gate E, a transfer gate B and a transfer gate F are switched, and charge reading is carried out. Next, only a transfer gate C, a transfer gate G, a transfer gate D and a transfer gate H are switched at a timing $T_2$ at which the read electric charges are transferred four times, and reading of the electric charges are carried out. In this manner, an electric charge of the R pixel read via the transfer gate A and an electric charge of the R pixel read via the transfer gate C are added to each other. An electric charge of the $G_1$ pixel read via the transfer gate B and an electric charge of the $G_1$ pixel read via the transfer gate D are added to each other. An electric charge of the R pixel read via the transfer gate E and an electric charge of the R pixel read via the transfer gate G are added to each other. An electric charge of the $G_1$ pixel read via the transfer gate F and an electric charge of the $G_1$ pixel read via the transfer gate H are added to each other.

On the other hand, in the case of horizontal transfer as well, switching of a transfer gate is carried out, as is the case with vertical transfer. In this manner, electric charges added for four pixels are finally output.

Here, the electric charges read in accordance with the three reading modes as described above are converted into analog voltage signals in a charge-to-voltage converter amplifier (not shown), and the converted voltage signals are output to an image pickup device output processing circuit 412.

Figure 34:
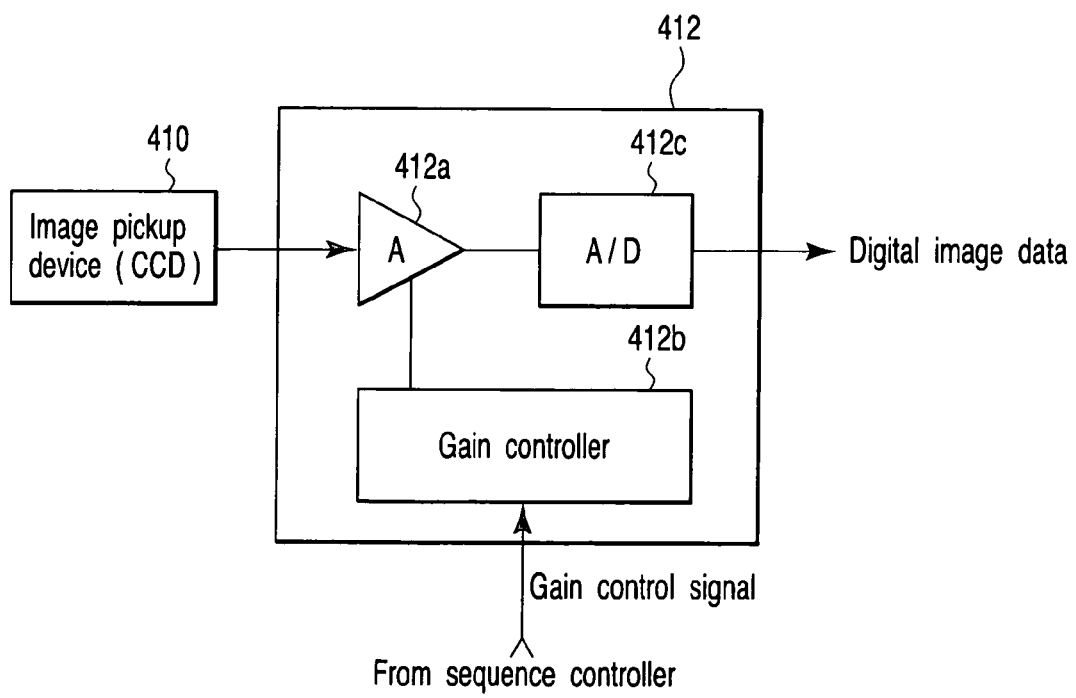
FIG. 34 is a view showing an internal configuration of an image pickup device output processing circuit.

Now, the image pickup device output processing circuit 412 will be described here. FIG. 34 is a view showing an internal construction of the image pickup output processing circuit 412. The image pickup device output processing circuit 412 is composed of a gain variable amplifier 412a, a gain controller 412b, and an analog-to-digital converter 412c. The gain variable amplifier 412a serving as an amplifier circuit amplifies an analog voltage signal input from the image pickup device 410 with a predetermined amplifier gain. The gain controller 412b sets an amplifier gain of the gain variable amplifier 412a based on a gain control signal from a sequence controller 418. The analog-to-digital converter 412c converts the signal amplified by the gain variable amplifier 412a into a digital signal (digital image data).

Here, the amplifier gain of the gain variable amplifier 412a is determined depending on a gain value A preset in the gain variable amplifier 412a and a magnification set in the gain controller 412b. The gain value A is set to a value such that, when an output signal has been amplified in the case where the accumulated charge quantity of the image pickup device 410, for example, enters a substantial saturated state or is saturated, its output becomes a maximum conversion level which can be analog-to-digital converted in the analog-to-digital converter 412c.

Now, with reference to a flowchart shown in FIG. 35, a description will be given with respect to a processing operation during a still image pickup mode in a camera having the above-described construction.

In the still photographing mode, the sequence controller 418 judges whether or not the first release switch has been turned on by a user (step S201).

In the case where the first release switch has not been turned on in judgment of step S201, the sequence controller 418 makes control of a live view image display on which an image obtained from the image pickup device 410 in real time is displayed on the LCD monitor 39 for each predetermined period (step S202). Then, the sequence controller 418 judges whether or not the camera shake proof mode setting switch 36 is set to on (step S203).

In the case where the camera shake proof mode setting switch 36 is set to on in judgment of step S203, the sequence controller 418 operates to turn on the angle velocity sensor X419 and the angle velocity sensor Y420 in order to detect camera shake quantity (step S204). On the other hand, in the case where the camera shake proof mode setting switch 36 is set to off in judgment of step S203, the sequence controller 418 operates to turn off the angle velocity sensor X419 and the angle velocity sensor Y420 (step S205).

After completion of the processing operation in step S204 or step S205, the sequence controller 418 judges whether or not a variety of operating sections other than the release button 34 and the camera shake proof mode setting switch 36 have been turned on (step S206). In judgment of step S206, in the case where a variety of operating members have been turned on, the sequence controller 418 executes a processing operation that corresponds to the operating members turned on (step S207). Then, current processing reverts to step S201. On the other hand, in judgment of step S206, in the case where a variety of switches have not been turned on, current processing reverts from step S206 to step S201.

In addition, in the case where the first release switch has been turned on in judgment of step S201, the sequence controller 418 carries out an automatic focus adjusting (AF) processing operation (step S208). As this AF processing technique, there may be used a well known technique such as a technique for driving the image pickup lens 32 so that a contrast of an image output from the image pickup device 410 is the highest. In addition, a focus state of the image pickup lens 32 may be detected by using a dedicated AF sensor. After completion of AF in step S208, the sequence controller 418 carries out a photometry processing operation for detecting brightness of the image (step S209). Then, the sequence controller 418 carries out exposure quantity computation for computing a proper exposure time $t_{EXP}$ of the image pickup device 410 (step S210). For example, in the case where a saturation exposure quantity of photodiode cells configuring pixels of the image pickup device 410 (maximum value of accumulated charge) is substantially equal to a maximum accumulated charge quantity of transfer cells configuring the vertical CCD and the horizontal CCD, the proper exposure time $t_{EXP}$ is provided as an exposure time for the accumulated charge quantity of pixels judged to be the brightest as a result of photometry to enter a saturation state or a state close to the saturation state.

After exposure quantity computation of step S210, the sequence controller 418 judges whether or not the second release switch has been turned on by a photographer (step S211). Then, one waits until the second release switch is turned on. In judgment of step S211, in the case where the second release switch has been turned on, the sequence controller 418 stops a live view image display (step S212), and controls the aperture 32a via the motor driver 409 (step S213).

Next, the sequence controller 418 judges whether or not the camera shake proof mode setting switch 36 has been set to on (step S214). In the case where the camera shake proof setting switch 36 has been set on in judgment of step S214, the sequence controller 418 carries out a processing operation of exposure control 1 (step S215). In addition, in the case where the camera shake proof mode setting switch 36 has not been set to on in judgment of step S214, the sequence controller 418 carries out a processing operation of exposure control 2 (step S216). These processing operations of exposure control 1 and exposure control 2 will be described later in detail.

After exposure control of step S215 or step S216, the image processing circuit 413 processes the image data input from the image pickup device output processing circuit 412 under the control of the sequence controller 418, and outputs the processed image data to the compressing/decompressing circuit 414 (step S217). The compressing/decompressing circuit 414 compresses the image data processed by the image processing circuit 413 (step S218). This compressed image data is recorded in the recording medium 417 (step S219).

After completion of image recording in step S219, the sequence controller 418 controls the motor driver 409 so as to open the aperture 32c (step S220). Then, current processing reverts to step S201.

Now, the processing operation of exposure control 1 in step S215 shown in FIG. 35 will be described here. FIG. 36 is a flowchart showing the processing operation of exposure control 1 in the fifth embodiment.

Figure 37A:
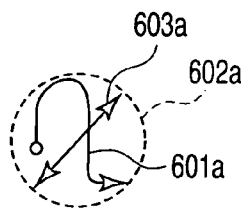
FIGS. 37A, 37B, and 37C are views for explaining a blurring circle diameter.
Figure 37B:
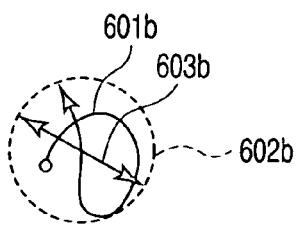
Figure 37C:
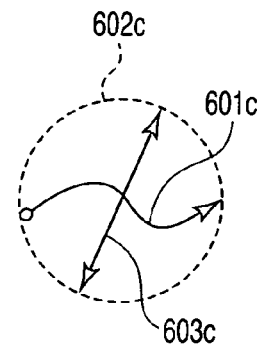

Here, before explaining the processing operation of exposure control 1, a blurring diameter is defined. This blurring diameter shows an evaluation level of an integral value of camera shake quantity. This blurring diameter is defined as a diameter of a minimum circle (hereinafter, referred to as a blurring circle) including a blurring locus obtained based on outputs of the angle velocity sensor X419 and the angle velocity sensor Y420. For example, in the case where the shake locus from exposure start is designated by reference numeral 601a shown in FIG. 37A, the blurring diameter can be obtained as a diameter 603a of a blurring circle 602a that is a minimum circle including the blurring locus 601a. In addition, in the case where the blurring locus from exposure start is designated by reference numeral 601b shown in FIG. 37B, the blurring diameter is obtained as a diameter 603b of a blurring circle 602b. In the case where a blurring locus is designated by reference numeral 601c shown in FIG. 37, the blurring diameter of a circle is obtained as a diameter 603c of a blurring circle 602c. In this manner, the blurring diameter is obtained as a quantity representing a motion range of a pre-determined dotted image that serves as a reference when obtaining a blurring locus. Such a blurring diameter is defined, thereby making it possible to evaluate a blurring quantity of an image due to camera shake during exposure.

Now, a description will be given here with respect to a flowchart shown in FIG. 36. First, in order to make preparations for exposure, the sequence controller 418 resets electric charges accumulated in pixels of the image pickup device 410 via the image pickup device driver circuit 411 (step S221). Next, the sequence controller 418 resets to zero a count value t of a timer (not shown), for clocking an integral time of the image pickup device 410 (step S222). Then, an integrating operation of the image pickup device 410 is started via the image pickup device driver circuit 411 (step S223). In addition, at the same time, the sequence controller 418 calculates the shake locus during exposure by integrating outputs from the angle velocity sensor X410 and the angle velocity sensor Y420. Then, the sequence controller 418 calculates blurring diameter from the calculated shake locus (step S224).

Figure 38A:
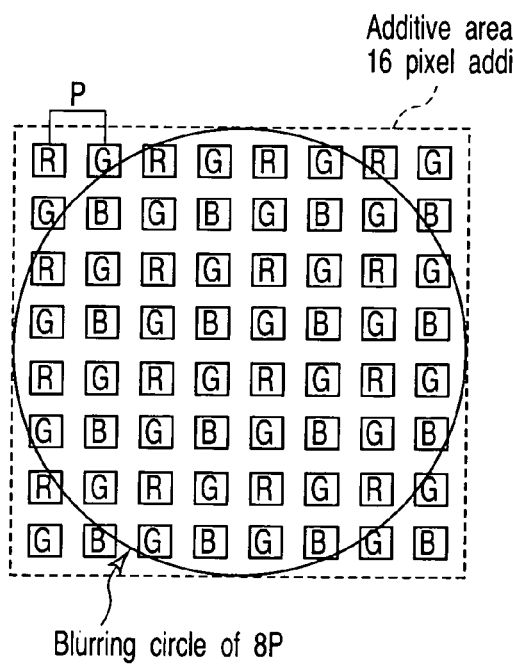
FIG. 38A is a view showing a relationship between a pixel addition range and a blurring circle in a 16-pixel additive reading mode.

Next, the sequence controller 418 judges whether or not the blurring diameter exceeds a range of pixel addition in the 16 pixel additive reading mode (step S225). FIG. 38A shows a relationship between the image addition range and the blurring diameter in the 16 pixel additive reading mode. As shown in FIG. 38A, the range of pixel addition in the 16 pixel additive reading mode can be represented by 8 pixels×8 pixels. Here, P shown in FIG. 38A indicates pixel pitches of the image pickup device 410. Therefore, in judgment of step S225, it may be judged whether or not the blurring diameter is less than 8 P that is a first threshold level.

In the case where the blurring diameter is equal to or greater than 8 P in judgment of step S225, current processing branches from step S225 to step S226. In this case, the blurring circle is greater than the range of pixel addition in the 16 pixel additive reading mode, and thus, an effect of blurring on the image due to camera shake is greater than that of lowered resolution of the image by carrying out 16 pixel addition. In such a case, camera shake reduction is carried out by utilizing the 16 pixel additive reading mode. Thus, the sequence controller 418 closes a shutter and terminates exposure of the image pickup device 410 (step S226). Here, as the shutter, a device shutter (electronic shutter) of the image pickup device 410 may be utilized, for example, or a mechanical shutter may be provided on a front face of the image pickup device 410.

Figure 35:
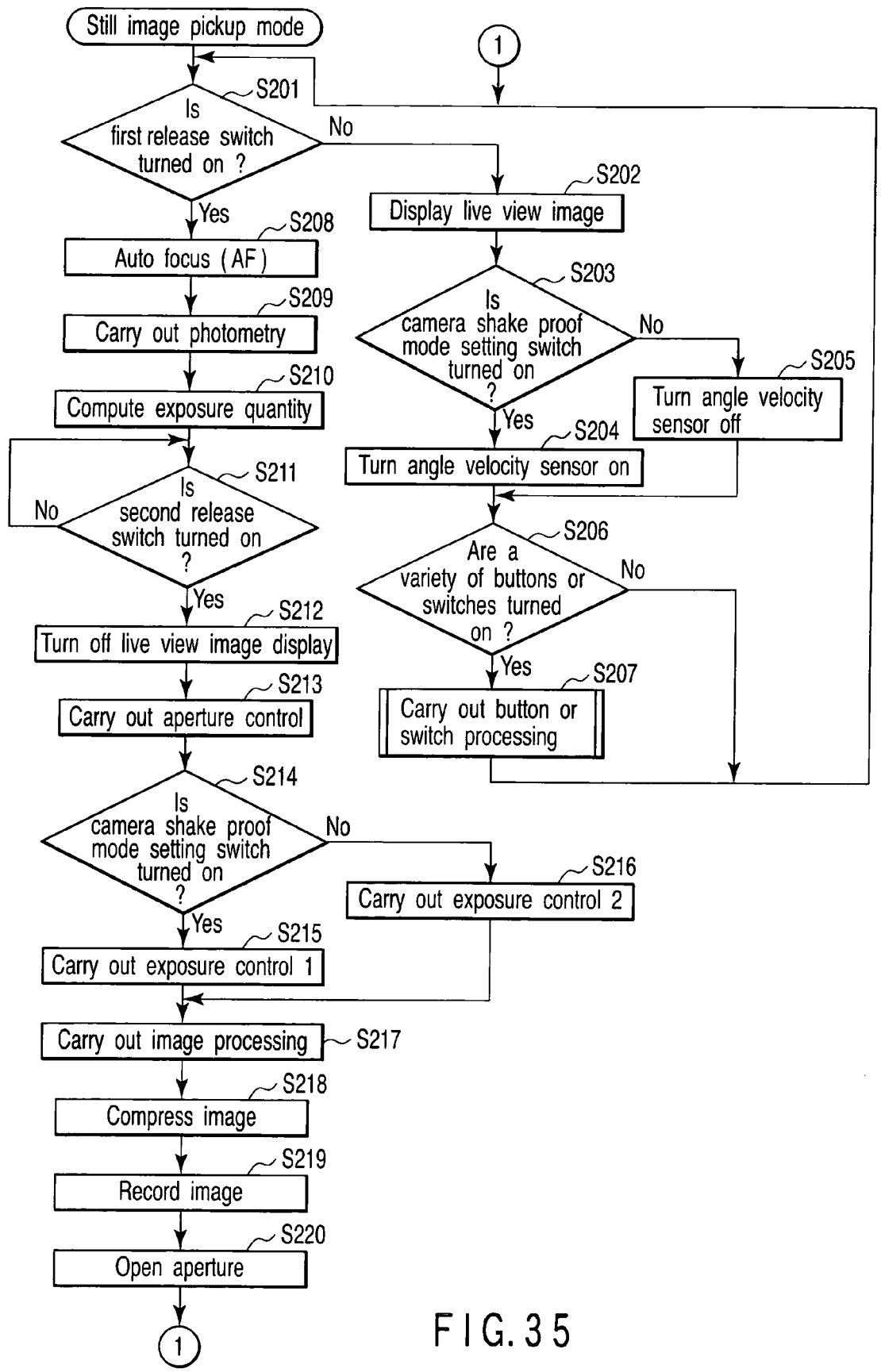
FIG. 35 is a flowchart showing a processing operation during a still image pickup mode.
Figure 36:
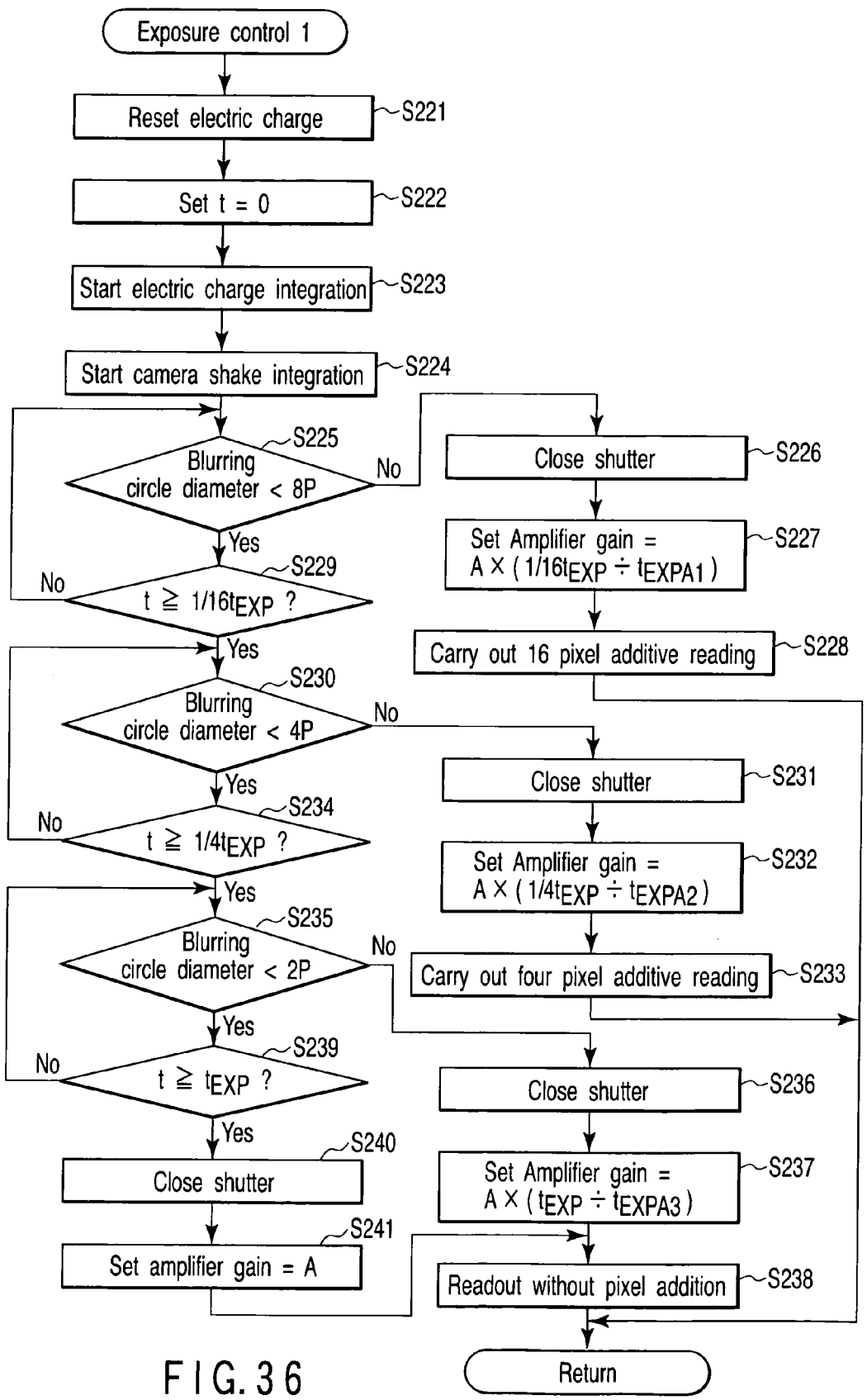
FIG. 36 is a flowchart showing a processing operation of exposure control 1 in accordance with the fifth embodiment.

After the exposure has been terminated in step S226, the sequence controller 418 sets the amplifier gain of the gain variable amplifier 412a as follows (step S227):

$$\text{Amplifier gain} = A \times (\text{1/16} t_{EXP}/t_{EXPA1}) \quad \text{(Formula 1)}$$

where $t_{EXP}$ of (Formula 1) denotes a proper exposure time obtained in step S210 shown in FIG. 35, and $t_{EXPA1}$ denotes a time from exposure start to termination of exposure.

After the amplifier gain has been set in step S227, the sequence controller 418 supplies an instruction to the image pickup device driver circuit 411 so as to read electric charges from the image pickup device 410 in the 16 pixel additive reading mode (step S228). Then, current processing goes to step S217 shown in FIG. 35.

In addition, in the case where the blurring diameter is less than 8 P in judgment of step S225, current processing branches from step S225 to step S229. In this case, the sequence controller 418 judges whether or not a count value t of the timer is obtained as 1/16 $t_{EXP}$ that is a first time point (step S229). In the case where t is not obtained as 1/16 $t_{EXP}$ in judgment of step S229, current processing reverts from step S229 to step S225. In addition, in the case where t is obtained as 1/16 $t_{EXP}$ in judgment of step S229, current processing branches from step S229 to step S230 without carrying out reduction of camera shake utilizing the 16 pixel additive reading mode.

Figure 39:
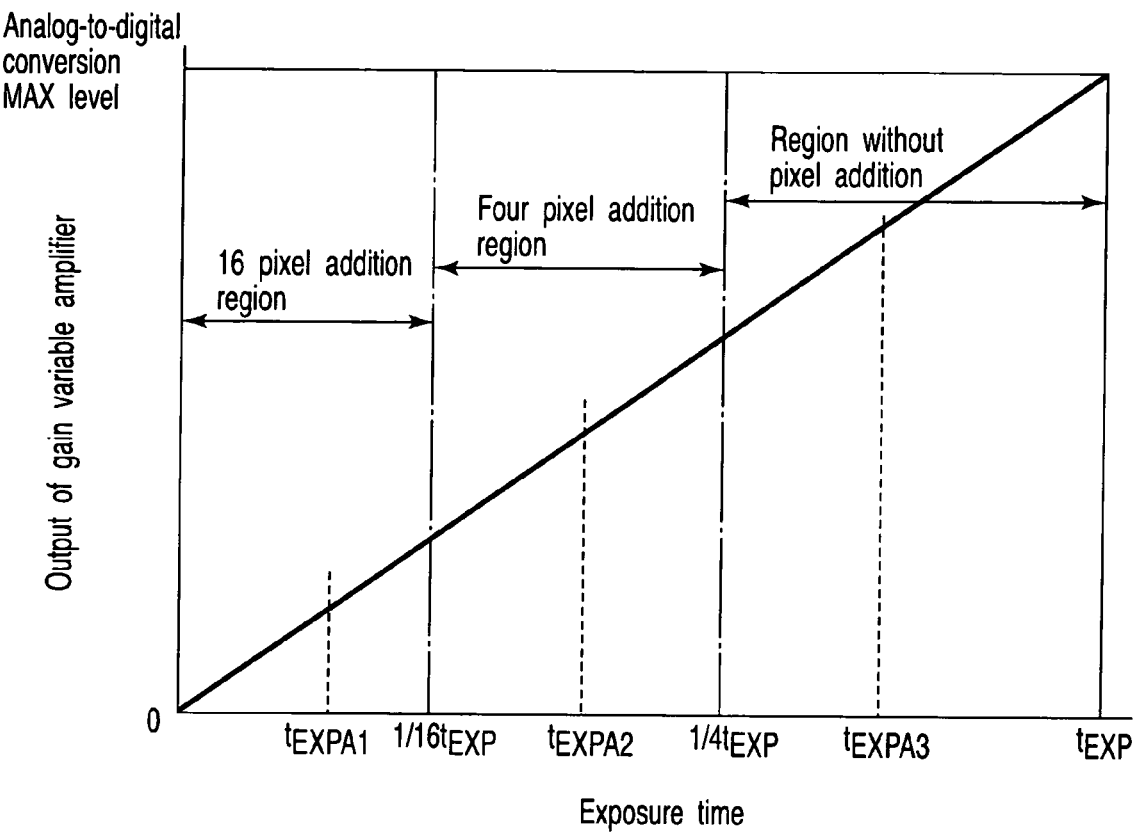
FIG. 39 is a view showing a relationship between an exposure time and an output of a gain variable amplifier.

Here, a description will be given with respect to a reason why reduction of camera shake utilizing the 16 pixel additive reading mode is carried out during only a period from exposure start to 1/16 $t_{EXP}$. FIG. 39 is a view showing a relationship between an exposure time and an output of the gain variable amplifier 412a. In general, the output of the image pickup device 410 is proportional to the exposure time, and thus, the output of the gain variable amplifier 412a is also proportional to the exposure time, as shown in FIG. 39. In addition, as shown in FIG. 39, exposure is carried out during the proper exposure time $t_{EXP}$, whereby a gain value A is set so that the output of the gain variable amplifier 412a is obtained as a maximum level (analog-to-digital conversion MAX level) that can be analog-to-digital converted in the analog-to-digital converter 412a. However, this proper exposure time $t_{EXP}$ presumes that pixel addition is not carried out. In the case of the 16 pixel additive reading mode, if exposure is carried out for a time interval longer than 1/16 $t_{EXP}$, there is a possibility that the electric charge quantity of transfer cells that configure a CCD transfer passage saturates, and a correct pixel output cannot be obtained.

Therefore, in the fifth embodiment, reduction of camera shake utilizing the 16 pixel additive reading mode is carried out in only a period of the 16 pixel addition region ($0 \leq t < 1/16$ $t_{EXP}$) shown in FIG. 39.

Figure 40:
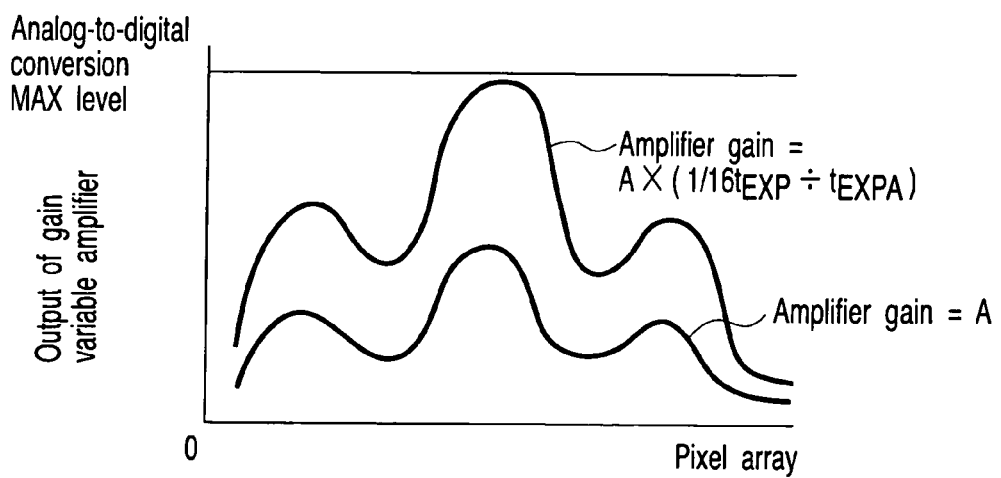
FIG. 40 is a view for explaining an amplifier gain of a gain variable amplifier in the case where exposure has been cancelled at a time shorter than $\frac{1}{16} t_{EXP}$.

In addition, as shown in FIG. 40, in the case where exposure has been terminated in a time period shorter than 1/16 $t_{EXP}$, even if an output signal from the image pickup device 410 is multiplied by the gain value A, its output is not obtained as an analog-to-digital conversion MAX level. Therefore, in the case where exposure has been terminated at a time $t_{EXPA1}$ shorter than 1/16 $t_{EXP}$, the amplifier gain as shown in (Formula 1) is set. By setting such the amplifier gain, the output of the gain variable amplifier 412a can be set at an analog-to-digital conversion MAX level.

Figure 38B:
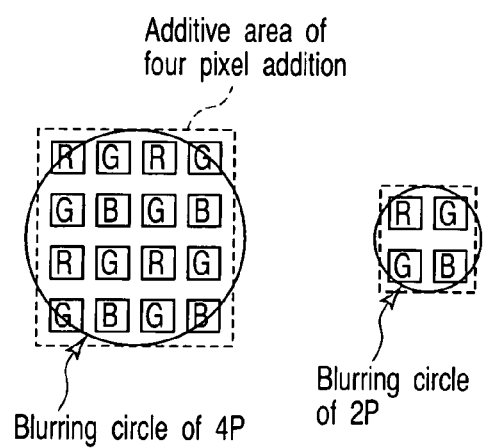
FIG. 38B is a view showing a relationship between a pixel addition range and a blurring circle in a 4-pixel additive reading mode.
Figure 38C:
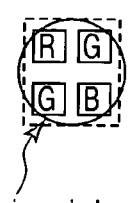
FIG. 38C is a view showing a relationship between a pixel unit in a Bayer array and a blurred circle.

Next, in the case where t is obtained as 1/16 $t_{EXP}$ in judgment of step S229 shown in FIG. 36, the sequence controller 418 judges whether or not the blurring diameter calculated in step S224 is less than 4 P that is a second threshold level (step S230). That is, the range of pixel addition in the 4 pixel additive reading mode is 4 pixels×4 pixels as shown in FIG. 38B, and thus, judgment step S230 is carried out.

In the case where the blurring diameter is equal to or greater than 4 P in the judgment of step S230, the sequence controller 418 closes the shutter, and terminates exposure of the image pickup device 410 (step S231). Then, the amplifier gain of the gain variable amplifier 412a is set as follows (step S232):

$$\text{Amplifier gain} = A \times (\text{1/4} t_{EXP}/t_{EXPA2}) \quad \text{(Formula 2)}$$

where $t_{EXPA2}$ denotes a time interval from exposure start to termination of exposure.

After the amplifier gain has been set in step S232, the sequence controller 418 supplies an instruction to the image pickup device driver circuit 411 so as to read electric charges from the image pickup device 410 in the 4 pixel additive reading mode (step S233). Then, current processing goes to step S217 shown in FIG. 35.

In addition, in the case where the blurring diameter is less than 4 P in the judgment of step S230, current processing branches from step S230 to step S234. In this case, the sequence controller 418 judges whether or not a count value t of the timer has been obtained as 1/4 $t_{EXP}$ that is a second time point (step S234). In the case where t is not obtained as 1/4 $t_{EXP}$ in the judgment of step S234, current processing reverts from step S234 to step S230. In addition, in the case where t is obtained as ¼ $t_{EXP}$ in the judgment of step S234, current processing branches from step S234 to step S235 without carrying out reduction of camera shake utilizing the 4 pixel additive reading mode. A reason why reduction of camera shake utilizing the 4 pixel additive reading mode is carried out only in the range of the 4 pixel additive region (1/16 $t_{EXP}$≦t<¼ $T_{EXP}$) shown in FIG. 39 is similar to that in the case of the 16 pixel additive reading mode.

In the case where t is obtained as ¼ $t_{EXP}$ in judgment of step S234, the sequence controller 418 judges whether or not the blurring diameter calculated in step S224 is less than 2 P (step S235). This 2 P denotes a range corresponding to the range of R, $G_1$, $G_2$, and B that are pixel units of Bayer array shown in FIG. 37C.

In the case where the blurring diameter is equal to or greater than 2 P in the judgment of step S235, the sequence controller 418 closes the shutter, and terminates exposure of the image pickup device 410 (step S236). Then, the amplifier gain of the gain variable amplifier 412a is set as follows (step S237)

Amplifier gain=$A \times (t_{EXP}/t_{EXPA3})$ (Formula 3)

where $t_{EXPA3}$ denotes a time interval from exposure start to termination of exposure.

After the amplifier gain has been set in step S237, the sequence controller 418 supplies an instruction to the image pickup device driver circuit 411 so as to read electric charges from the image pickup device 410 in the individual pixel reading mode (step S238). Then, current processing goes to step S217 shown in FIG. 35.

That is, the processing operations in step S236 to step S238 are provided as processing operations for reducing an exposure time by only amplification of a signal in the gain variable amplifier 412a without carrying out pixel addition, and carrying out camera shake reduction.

In addition, in the case where the blurring diameter is less than 2 P in the judgment of step S235, camera shake hardly occurs, and thus, there is no need for carrying out camera shake reduction processing operation. In this case, the sequence controller 418 judges whether or not a count value t of a timer is obtained as $t_{EXP}$ (step S239). In the case where t is not obtained as $t_{EXP}$, current processing reverts to step S235. On the other hand, in the case where t is obtained as $t_{EXP}$ in judgment of step S239, current processing branches from step S239 to step S240. In this case, a proper exposure time $t_{EXP}$ has elapsed, and thus, the sequence controller 418 closes the shutter and terminates exposure (step S240), and then, sets the amplifier gain to A (step S241). Then, the sequence controller 118 supplies an instruction to the image pickup device driver circuit 411 so as to read electric charges from the image pickup device 410 in the individual pixel reading mode. Then, current processing goes to step S217 shown in FIG. 35.

Figure 41:
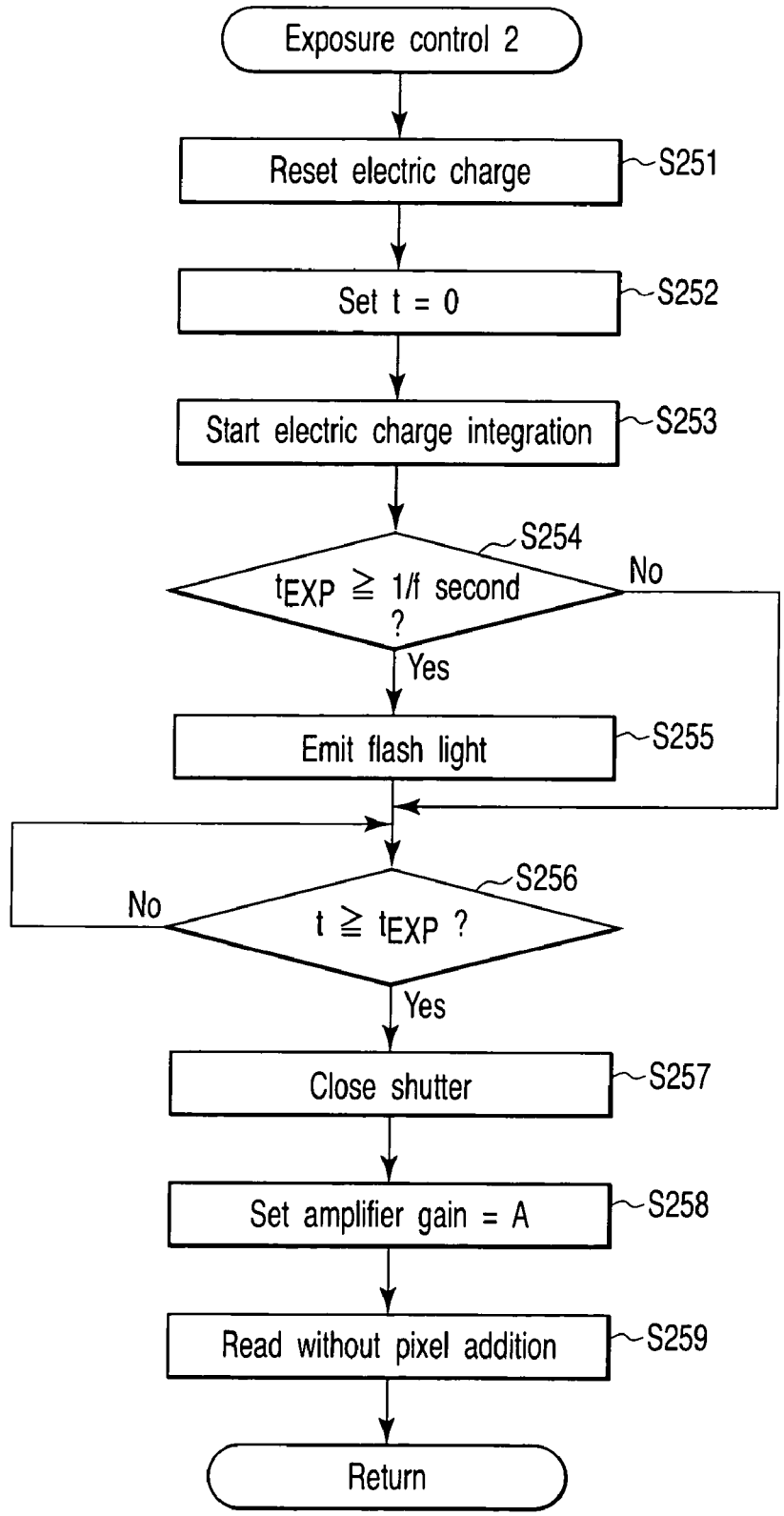
FIG. 41 is a flowchart showing a processing operation of exposure control 2.

Now, a description will be given with respect to exposure control 2 of step S216 shown in FIG. 35. FIG. 41 is a flowchart showing processing operation of exposure control 2.

In order to make preparations for exposure, the sequence controller 418 resets electric charges accumulated in pixels of the image pickup device 410 via the image pickup device driver circuit 411 (step S251). Next, the sequence controller 418 resets to zero a count value t of a timer (not shown), for clocking an integral time of the image pickup device 410 (step S252). Then, an integrating operation of the image pickup device 410 is started via the image pickup device driver circuit 411 (step S253).

Next, the sequence controller 418 judges whether or not a proper exposure time $t_{EXP}$ is equal to or greater than camera shake second 1/f (step S254). Here, the camera shake second is defined as an inverted number of a focal distance f of the image pickup lens 32, as described above.

In the case where $t_{EXP}$ is equal to or greater than 1/f in judgment of step S254, the sequence controller 418 supplies an instruction so as to illuminate the flash light emitting section 33 for the purpose of assistance of exposure because there is a high possibility that camera shake occurs (step S255). Then, current processing goes to step S256. On the other hand, in the case where $t_{EXP}$ is less than 1/f in the judgment of step S254, the flash light emitting section 33 is not illuminated, and current processing branches from step S254 to step S256.

Following step S254 or step S255, the sequence controller 418 judges whether or not a count value t of the timer has been obtained as the proper exposure time $t_{EXP}$ (step S256), and one waits until t is obtained as $t_{EXP}$. On the other hand, in the case where t has been obtained as $t_{EXP}$ in the judgment of step S256, current processing branches from step S256 to step S257. In this case, the proper exposure time $t_{EXP}$ has elapsed, and thus, the sequence controller 418 closes the shutter and terminates exposure (step S257), and sets the amplifier gain to A (step S258). Then, the sequence controller 418 supplies an instruction to the image pickup device driver circuit 411 so as to read electric charges from the image pickup device 410 in the individual pixel reading mode (step S259). Then, current processing goes to step S217 shown in FIG. 35.

As has been described above, according to the fifth embodiment, a magnitude of camera shake during exposure is evaluated by a blurring diameter of a circle. In the case where this blurring diameter has exceeded a predetermined threshold value, exposure is terminated at that time point, so as to read electric charges from the image pickup device in the pixel additive reading mode in the closest additive range at that time point. In this manner, electric charges are read in an optimal reading mode according to the magnitude of the camera shake, and an image with less image deterioration can be obtained.

Namely, in the 16 pixel additive reading mode, although an advantageous effect of camera shake reduction is high, electric charges for 16 pixels are added, and thus, image resolution is lowered as compared with that in the individual pixel reading mode. Therefore, in the fifth embodiment, the 16 pixel additive reading mode is selected only in the case where camera shake is large, thereby restricting image deterioration due to such camera shake. In the case where camera shake is middle, the four pixel additive reading mode is selected such that lowering of the image resolution is restricted because an advantageous effect of camera shake correction is lower than that in the 16 pixel additive reading mode. In the case where camera shake hardly occurs, image resolution is prioritized, and the individual pixel reading mode is selected, thereby making it possible to minimize image deterioration.

In addition, exposure is terminated at a time point at which the blurring diameter has exceeded a threshold value during judgment of the blurring diameter. Thus, there is no case in which camera shake becomes further larger than the camera shake at that time point, and image deterioration is advanced more extremely. In addition, the amplifier gain of the gain variable amplifier 412a is set in accordance with a time interval from a time point of exposure start of the image pickup device to a time point of exposure termination of the image pickup device, thus making it possible to compensate for lowered level of an exposure quantity caused by termination of exposure on its way.

Sixth Embodiment

Now, a sixth embodiment of the present invention will be described here. The sixth embodiment is provided as an example of summarizing a processing operation of exposure control 1 in the fifth embodiment. In this sixth embodiment, there are two pixel reading modes; a 9 pixel additive reading mode and an individual pixel reading mode.

Figure 42:
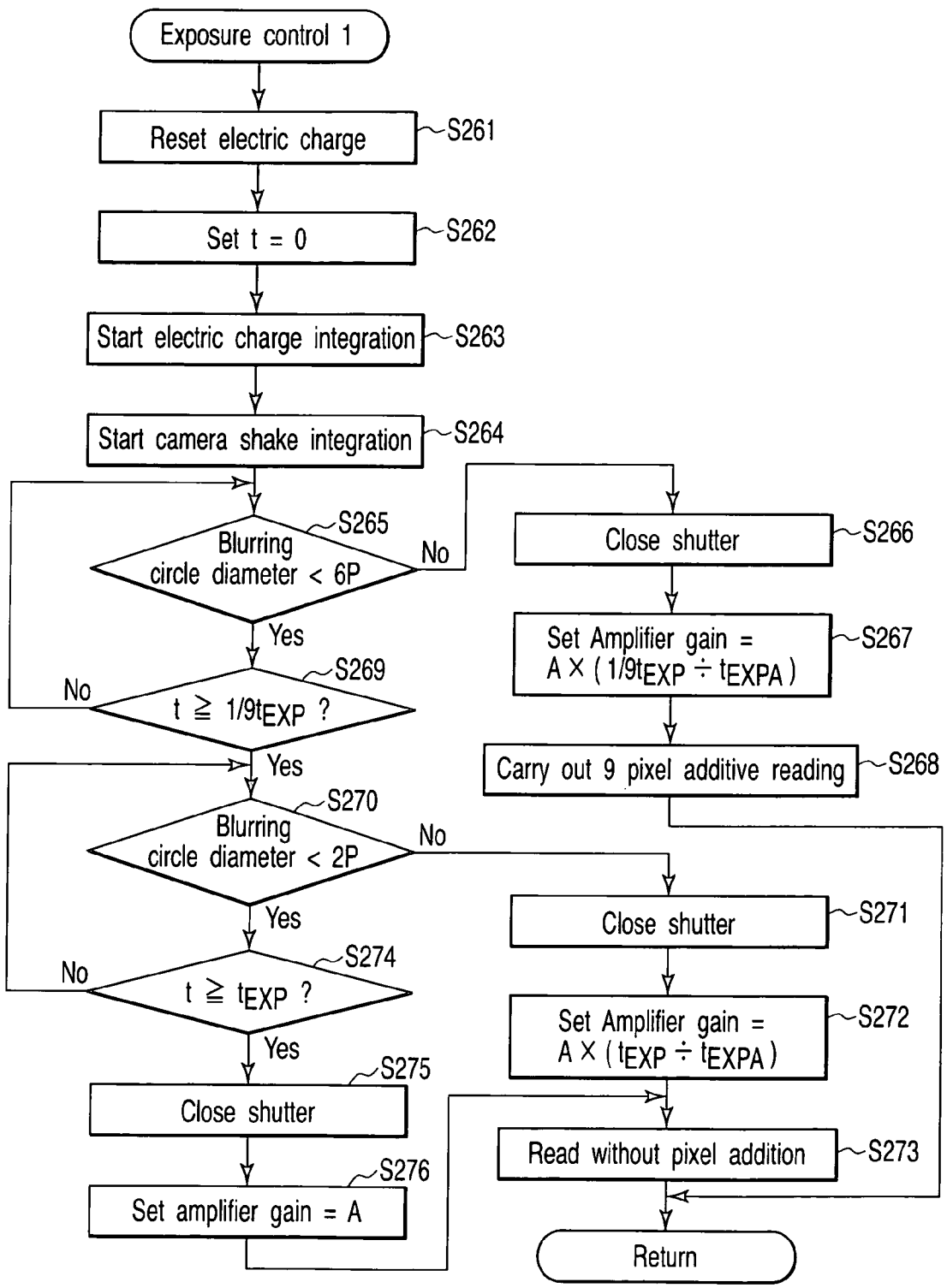
FIG. 42 is a flowchart showing a processing operation of exposure control 1 in accordance with a sixth embodiment.

FIG. 42 is a flowchart showing a processing operation of exposure control 1 in the sixth embodiment. Other processing operations, i.e., a processing operation during a still image pickup mode and a processing operation of exposure control 2 are identical to those according to the fifth embodiment.

First, in order to make preparations for exposure, the sequence controller 418 resets electric charges accumulated in pixels of the image pickup device 410 via the image pickup device driver circuit 411 (step S261). Next, the sequence controller 418 resets to zero a count value t of a timer (not shown), for clocking an integral time of the image pickup device 410 (step S262), and then, starts an integrating operation of the image pickup device 410 via the image pickup device driver circuit 411 (step S263). At the same time, the sequence controller 418 calculates the shake locus during exposure by integrating outputs from an angle velocity sensor X419 and the angle velocity sensor Y420. At the same time, the sequence controller 418 calculates the blurring diameter from the calculated shake locus (step S264).

Next, the sequence controller 418 judges whether or not the blurring diameter does not exceed the additive range of 9 pixel addition shown in FIG. 43 (step S265). As shown in FIG. 43, the additive range of 9 pixel addition is 6 pixels×6 pixels, and thus, in judgment of step S265, it may be judged whether or not the blurring diameter of a circle is less than 6 P.

In the judgment of step 265, in the case where the blurring diameter is equal to or greater than 6 P, current processing branches from step S265 to step S266. In this case, camera shake reduction utilizing the 9 pixel additive reading mode is carried out. Thus, the sequence controller 418 closes the shutter and terminates exposure of the image pickup device 410 (step S266). Then, the amplifier gain of the gain variable amplifier 412a is set as follows (step S267):

$$\text{Amplifier gain} = A \times (\tfrac{1}{9} t_{EXP}/t_{EXPA}) \quad \text{(Formula 4)}$$

where $t_{EXPA}$ denotes a time interval from exposure start to a time point of exposure termination.

After the amplifier gain has been set in step S267, the sequence controller 418 supplies an instruction to the image pickup device driver circuit 411 so as to read electric charges from the image pickup device 410 in the 9 pixel additive reading mode (step S268). Then, current processing reverts to step 217 shown in FIG. 35.

In addition, in the case where the blurring diameter is less than 6 P in judgment of step S265, the sequence controller 418 judges whether or not a count value t of the timer has been obtained as ⅑ $t_{EXP}$ (step S269). In the case where t has not been obtained as ⅑ $t_{EXP}$ in the judgment of step S269, current processing reverts from step S269 to step S265. In addition, in the case where t has been obtained ⅑ $t_{EXP}$ in the judgment of step S269, current processing branches from step S269 to step S270 without carrying out camera shake reduction utilizing the 9 pixel additive reading mode. Here, a reason why camera shake reduction utilizing the 9 pixel additive reading mode is carried out only from exposure start to ⅑ $t_{EXP}$ is similar to that in the case of the 16 pixel additive reading mode described in the fifth embodiment.

In the case where t has been obtained as ⅑ $t_{EXP}$ in judgment of step S269, the sequence controller 418 judges whether or not the blurring diameter is less than 2 P (step S270). In the case where the blurring diameter is equal to or greater than 2 P in the judgment of step S270, the sequence controller 418 closes the shutter, and terminates exposure of the image pickup device 410 (step S271). Then, the amplifier gain of the gain variable amplifier 412a is set as follows (step S272):

$$\text{Amplifier gain} = A \times (t_{EXP}/t_{EXPA}) \quad \text{(Formula 5)}$$

After the amplifier gain has been set in step S272, the sequence controller 418 supplies an instruction to the image pickup device driver circuit 411 so as to read electric charges from the image pickup device 410 in the individual pixel reading mode (step S273). Then, current processing reverts to step S217 shown in FIG. 35.

In the case where the blurring diameter is less than 2 P in the judgment of step S270, the sequence controller 418 judges whether or not a count value t of the timer has been obtained as $t_{EXP}$ (step S274). In the case where t has not been obtained as $t_{EXP}$, the judgment of step S274 is continued. On the other hand, in the case where t has been obtained as $t_{EXP}$ in the judgment of step S274, current processing branches from step S274 to step S275. In this case, the proper exposure time has elapsed, and thus, the sequence controller 418 closes the shutter, and terminates exposure (step S275). Then, the amplifier gain is set to A (step S276). Then, the sequence controller 418 supplies an instruction to the image pickup device driver circuit 411 so as to read an electric charge from the image pickup device 410 in the individual pixel reading mode. Then, current processing reverts to step S217 shown in FIG. 35.

As has been described above, according to the sixth embodiment, the processing operation of exposure control 1 can be simplified by using the 9 pixel additive reading mode that is an intermediate pixel additive reading mode of the 16 pixel additive reading mode and the 4 pixel additive reading mode.

Figure 44:
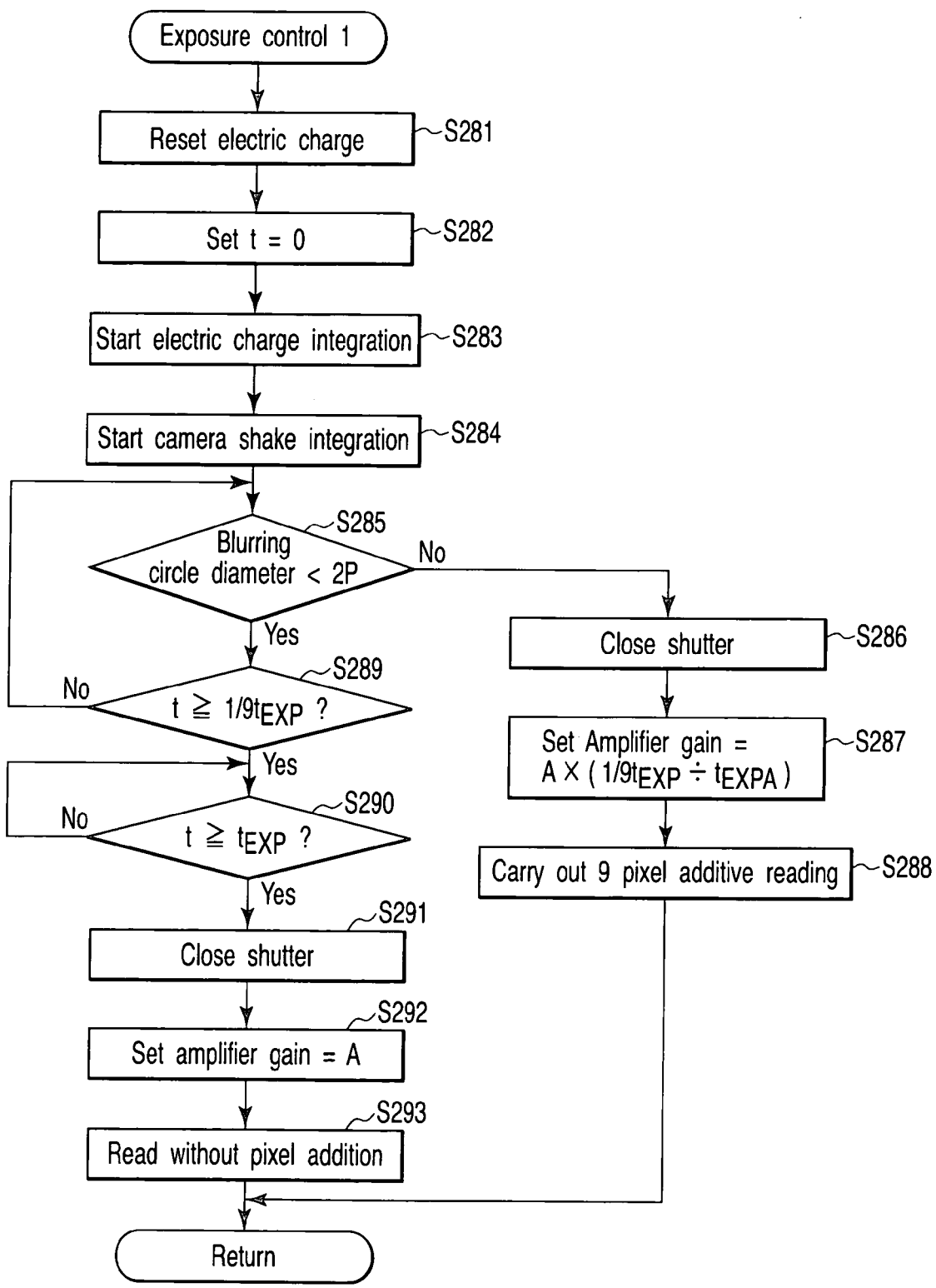
FIG. 44 is a flowchart showing a modified example of exposure control 1 in accordance with the sixth embodiment.

Exposure control 1 in the sixth embodiment is carried out as shown in FIG. 44, and the processing can be further simplified. In FIG. 44, in order to make preparations for exposure, the sequence controller 418 resets electric charges accumulated in pixels of the image pickup device 410 via the image pickup device driver circuit 411 (step S281). Next, the sequence controller 418 resets to zero a count value t of a timer (not shown), for clocking an integral time of the image pickup device 410 (step S282). Then, an integrating operation of the image pickup device 410 is started via the image pickup device driver circuit 411 (step S283). At the same time, the sequence controller 410 calculates the shake locus during exposure by integrating outputs from the angle velocity sensor X419 and the angle velocity sensor Y420. At the same time, the sequence controller 418 calculates the blurring diameter from the calculated shake locus (step S284).

Next, the sequence controller 418 judges whether or not the blurring diameter is less than 2 P (step S285). In the case where the blurring diameter is equal to or greater than 2 P in judgment of step S285, current processing branches from step S285 to step S286. In this case, camera shake reduction utilizing the 9 pixel additive reading mode is carried out. That is, the sequence controller 418 closes the shutter, and terminates exposure of the image pickup device 410 (step S286). Then, the amplifier gain of the gain variable amplifier 412a is set to the amplifier gain shown in (Formula 4) (step S287).

After the amplifier gain has been set in step S287, the sequence controller 418 supplies an instruction to the image pickup device driver circuit 411 so as to read electric charges from the image pickup device 410 in the 9 pixel additive reading mode (step S288). Then, current processing reverts to step S217 shown in FIG. 35.

In the case where the blurring diameter is less than 2 P in judgment of step S285, the sequence controller 418 judges whether or not a count value t of the timer has been obtained as ⅙ $t_{EXP}$ (step S289). In the case where t has not been obtained as ⅙ $t_{EXP}$ in judgment of step S289, current processing reverts from step S289 to step S285. In addition, in the case where t has been obtained as ⅙ $t_{EXP}$ in the judgment of step S289, the sequence controller 418 judges whether or not a count value t of the timer has been obtained as $t_{EXP}$ without carrying out camera shake reduction utilizing the 9 pixel additive reading mode (step S290). Then, one waits until t has been obtained as $t_{EXP}$.

On the other hand, in the case where t has been obtained as $t_{EXP}$ in judgment of step S290, current processing branches from step S290 to step S291. In this case, the proper exposure time has elapsed, and thus, the sequence controller 418 closes the shutter, and terminates exposure (step S291). Then, the amplifier gain is set to A (step S292). Then, the sequence controller 418 supplies an instruction to the image pickup device driver circuit 411 so as to read electric charges from the image pickup device 410 in the individual pixel reading mode (step S293). Then, current processing reverts to step S217 shown in FIG. 35.

That is, in a modified example shown in FIG. 44, a threshold value for judging whether or not to carry out camera shake reduction utilizing the 9 pixel additive reading mode is set to 2 P. Further, in the case of reading electric charges in the individual pixel reading mode, exposure is not terminated on its way. In this manner, camera shake reduction utilizing the 9 pixel additive reading mode can be easily carried out and the processing operation is further simplified as compared with FIG. 42.

Seventh Embodiment

Now, a seventh embodiment of the present invention will be described here. The seventh embodiment is provided as an example of adjusting the amplifier gain in the gain variable amplifier 412a without carrying out pixel addition, thereby reducing an exposure time and reducing an effect of camera shake.

Figure 45:
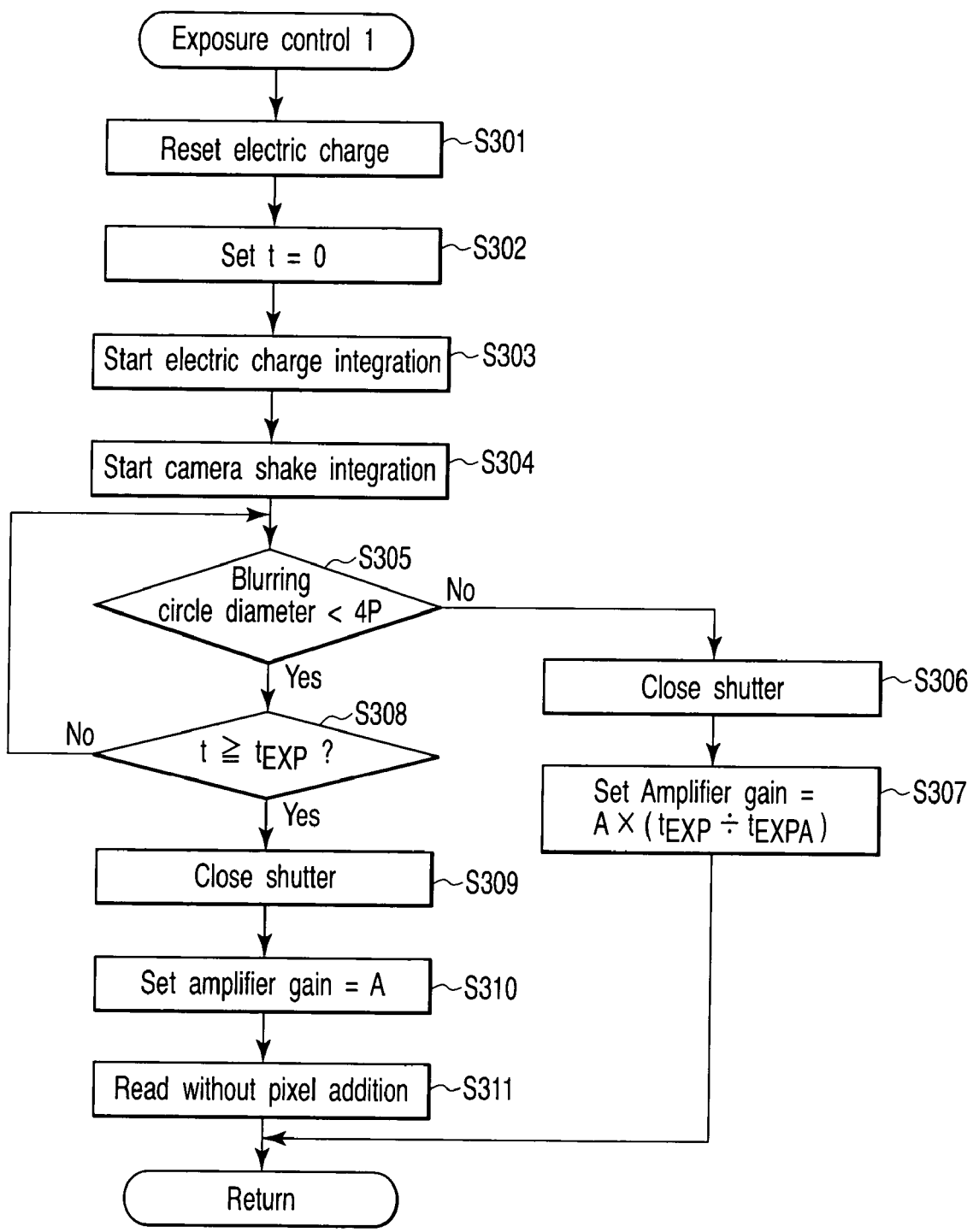
FIG. 45 is a flowchart showing a processing operation of exposure control 1 in accordance with a seventh embodiment.

FIG. 45 is a flowchart showing the processing operation of exposure control 1 in the seventh embodiment. Other processing operations, i.e., a processing operation in the still image pickup mode and a processing operation of exposure control 2 are similar to those according to the fifth embodiment.

First, in order to make preparations for exposure, the sequence controller 418 resets electric charges accumulated in pixels of the image pickup device 410 via an image pickup device driver circuit 411 (step S301). Next, the sequence controller 418 resets to zero a count value t of a timer (not shown), for clocking an integral time of the image pickup device 410 (step S302). Then, an integrating operation of the image pickup device 410 is started via the image pickup device driver circuit 411 (step S303). In addition, at the same time, the sequence controller 418 calculates the shake locus during exposure by integrating outputs from the angle velocity sensor X419 and the angle velocity sensor Y420. Then, the sequence controller 418 calculates the blurring diameter from the calculated shake locus (step 304).

Next, the sequence controller 418 judges whether or not the blurring diameter exceeds 4 P (step S305). This 4 P is provided as an example, and is a threshold value level that can be changed. In the case where the blurring diameter is equal to or greater than 4 P in judgment of step S305, current processing branches from step S305 to step S306. In this case, the sequence controller 418 closes the shutter, and terminates exposure of the image pickup device 410 (step S306). Then, the amplifier gain of the gain variable amplifier 412a is set as shown in (Formula 5) (step S307). Then, the sequence controller 418 supplies an instruction to the image pickup device driver circuit 411 so as to read electric charges from the image pickup device 410 in the individual pixel reading mode (step S311). Then, current processing reverts to step S217 shown in FIG. 35.

On the other hand, in the case where the blurring diameter is less than 4 P in judgment of step S305, the sequence controller 418 judges whether or not a count value t of the timer has been obtained as $t_{EXP}$ (step S308). In the case where t has not been obtained as $t_{EXP}$, the judgment of step S308 is continued.

On the other hand, in the case where t has been obtained as $t_{EXP}$ in the judgment of step S308, current processing branches from step S308 to step S309. In this case, the proper exposure time has elapsed, and thus, the sequence controller 418 closes the shutter, and terminates exposure (step S309). Then, the amplifier gain is set to A (step S310). Next, the sequence controller 418 supplies an instruction to the image pickup device driver circuit 411 so as to read electric charges from the image pickup device 410 in the individual pixel reading mode. Then, current processing reverts to step S217 shown in FIG. 35.

As has been described above, according to the seventh embodiment, camera shake reduction can be carried out without using a mechanical system for reducing camera shake.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus configured to pick up an image, the apparatus comprising:
    an image pickup device which has a plurality of pixels to convert an object image formed by an optical system to an electric charge;
    a pixel reading circuit which operates in either a first reading mode for reading electric charges obtained from respective pixels of the image pickup device on a pixel by pixel basis or a second reading mode for adding and reading the electric charges obtained from respective pixels of the image pickup device; and
    a controller which evaluates a shake of the apparatus during exposure, which operates the pixel reading circuit in the second reading mode when an evaluation level of the camera shake is greater than a predetermined level, and which operates the pixel reading circuit in the first reading mode when the evaluation level is smaller than the predetermined level.

2. The image pickup apparatus according to claim 1, wherein the controller obtains the evaluation level prior to exposure of the image pickup device.

3. The image pickup apparatus according to claim 1, further comprising a shake detecting section which detects a shake of the image pickup device,
    wherein the controller obtains the evaluation level based on an output from the camera shake detecting section.

4. The image pickup apparatus according to claim 3, further comprising an exposure time setting section which sets an exposure time of the image pickup device, wherein the controller obtains the evaluation level based on the exposure time and a focal distance of the optical system in addition to an output of the shake detecting section.

5. The image pickup apparatus according to claim 3, wherein the controller obtains the evaluation level from the shake obtained by the shake detecting section during exposure of the image pickup device.

6. The image pickup apparatus according to claim 5, wherein the second reading mode is provided as an $N^2$ pixel additive reading mode for adding and reading the electric charges on an $N^2$ by $N^2$ pixel basis.

7. The image pickup apparatus according to claim 5, wherein the second reading mode includes: an $N^2$ pixel additive reading mode for adding and reading the electric charges on an $N^2$ by $N^2$ pixel basis; and an $M^2$ pixel additive reading mode for adding and reading the electric charges on an $M^2$ by $M^2$ pixel basis (where M is an integer of 2 or more, and has a relationship of N>M), and the controller controls the pixel reading circuit to operate in the $N^2$ pixel additive reading mode in the case where the evaluation level has reached a first threshold level from the time point of exposure start of the image pickup device to a first time point, and controls the pixel reading circuit to operate in the $M^2$ pixel additive reading mode in the case where the evaluation level does not reach the first threshold level from the time point of exposure start of the image pickup device to the first time point but the evaluation level has reached a second threshold level that is a predetermined level smaller than the first threshold level from the first time point to a second time point.

8. The image pickup apparatus according to claim 5, wherein the shake detecting section includes an angle velocity sensor.

9. The image pickup apparatus according to claim 5, wherein the evaluation level is obtained as an integral value of the shake obtained by the shake detecting section from a time point of exposure start of the image pickup device.

10. The image pickup apparatus according to claim 9, wherein the evaluation level is provided as a blurring diameter of a circle including a locus of the shake from a time point of exposure start of the image pickup device.

11. The image pickup apparatus according to claim 9, wherein the controller controls the pixel reading circuit to operate in the second reading mode in the case where the evaluation level has reached a first threshold level from a time point of exposure start to a first time point.

12. The image pickup apparatus according to claim 11, wherein the controller terminates the exposure of the image pickup device immediately when the evaluation level has reached the first threshold level from the time point of exposure start to the first time point, and controls the pixel reading circuit to operate in the second reading mode.

13. The image pickup apparatus according to claim 12, further comprising an amplifier circuit which amplifies an electrical signal based on the electric charges read from the image pickup device at a variable amplification rate, wherein the controller terminates the exposure of the image pickup device, controls the pixel reading circuit to operate in the second reading mode, and then, sets the amplification rate of the amplifier circuit in accordance with a time interval from a time point of exposure start of the image pickup device to a time point of exposure termination.

14. The image pickup apparatus according to claim 3, wherein the shake detecting section includes an angle velocity sensor.

15. The image pickup apparatus according to claim 3, further comprising an image processing circuit which acquires image data from the electric charges read from the pixel reading circuit, wherein the shake detecting section detects the shake from the image data.

16. The image pickup apparatus according to claim 15, wherein the shake detecting section detects the shake quantity in respective areas which is divided into a plurality of areas from a whole area of the image data, obtains a maximum value of the shake quantity detected in each area, and detects the shake from the maximum value of the image shake quantity.

17. The image pickup apparatus according to claim 15, wherein the shake detecting section compares a plurality of image data obtained from the image processing circuit in different time points from each other, thereby detecting the shake quantity and detecting the shake from the image shake quantity.

18. The image pickup apparatus according to claim 1, wherein the pixel reading circuit reads an electric charges by a first photographic sensitivity when operating in the first reading mode, and reads an electric charges by a second photographic sensitivity that is higher in sensitivity than the first imaging sensitivity when operating in the second reading mode.

19. The image pickup apparatus according to claim 1, further comprising an object luminance detecting section which detects object luminance, wherein the controller obtains the evaluation level based on the object luminance and a focal distance of the optical system.

20. The image pickup apparatus according to claim 19, wherein the controller determines an exposure time of the image pickup device based on the object luminance detected by the object luminance detecting section and the focal distance of the optical system, and obtains the evaluation level based on the exposure time and the focal distance of the optical system.

21. The image pickup apparatus according to claim 19, wherein the predetermined level is set in accordance with the focal distance of the optical system.

22. The image pickup apparatus according to claim 19, further comprising a photographing mode selecting section which selects one photographing mode from among a plurality of photographing modes, wherein the predetermined level is set in accordance with the photographing mode selected by the photographing mode selecting section.

23. The image pickup apparatus according to claim 19, wherein the controller provides hysteresis with respect to an object luminance value changing point between the first reading mode and the second reading mode.

24. The image pickup apparatus according to claim 23, wherein the controller determines an exposure time of the image pickup device based on the object luminance detected by the object luminance detecting section and the focal distance of the optical system, and obtains the evaluation level based on the exposure time and the focal distance of the optical system.

25. An image pickup apparatus configured to pick up an image, the apparatus comprising:

an image pickup device which has a plurality of pixels to convert an object image formed by an optical system to an electric charge;

a pixel reading circuit which operates in either a first reading mode for reading electric charges obtained form the respective pixels of the image pickup device on a pixel by pixel basis or a second reading mode for adding and reading the electric charges obtained from the respective pixels of the image pickup device;

an object shake detecting section which detects an object shake quantity generated by a motion of an object; and a controller which operates the pixel reading circuit in the second reading mode when an object shake quantity during exposure of the image pickup device is greater than a predetermined level, and which operates the pixel reading circuit in the first reading mode when the object shake quantity is smaller than the predetermined level.

26. The image pickup apparatus according to claim 25, further comprising an image processing circuit which acquires image data from the electric charges read from the pixel reading circuit, wherein the object shake detecting section includes:

a shake detecting sensor which detects a shake quantity of the image pickup apparatus; and an image shake detecting circuit which detects a shake quantity of an image from the image data obtained by the image processing circuit, wherein the object shake detecting section compares the shake quantity detected by the shake detecting sensor and the image shake detected by the image shake detecting circuit, thereby detecting the object shake.

27. A method for picking up an image, comprising:

evaluating a level of a camera shake during exposure prior to picking up an image;

starting exposure for acquiring the image;

terminating the exposure; and adding and reading electric charges of each pixel obtained by the exposure when the evaluation level of the camera shake obtained by the evaluation is greater than a predetermined level, and reading electric charges of each pixel obtained by the exposure on a pixel by pixel basis when the evaluation level is smaller than the predetermined level.

28. The method according to claim 27, wherein a photographic sensitivity, when the evaluation level is smaller than the predetermined level, is set to a first imaging sensitivity, and an imaging sensitivity, when the evaluation level is greater than the predetermined level, is set to a second imaging sensitivity that is higher in an sensitivity than the first imaging sensitivity.

29. An image pickup apparatus configured to pick up an image, the apparatus comprising:

an image pickup device having a plurality of pixels to convert an object image formed by an optical system to an electric charge;

an electric charge adder circuit which adds electric charges obtained from respective pixels of the image pickup device on a predetermined pixel size by pixel size basis;

a controller which selects either an individual pixel reading mode for reading the electric charges obtained from the respective pixels of the image pickup device on a pixel by pixel basis, or a pixel additive reading mode for operating the electric charge adder circuit and adding and reading the electric charges obtained from the respective pixels of the image pickup device on the predetermined pixel size by pixel size basis based on a shake of the apparatus occurring during an exposure of the image pickup device.

30. A method for picking up an image, comprising:

starting exposure for acquiring an image;

evaluation a magnitude of a camera shake during the exposure;

terminating the exposure; and when an evaluation level of the camera shake obtained by the evaluation is greater than a predetermined level, adding and reading electric charges for each pixel obtained by the exposure, and when the evaluation level is smaller than the predetermined level, reading the electric charges for each pixel obtained by the exposure on a pixel by pixel basis.

* * * * *